United States Patent
Fox et al.

(10) Patent No.: US 10,716,292 B1
(45) Date of Patent: Jul. 21, 2020

(54) DRONE-ENABLED WILDLIFE MONITORING SYSTEM

(71) Applicant: Hana Resources, Inc., Lake Forest, CA (US)

(72) Inventors: Andrew John Fox, Irvine, CA (US); Michelle Caruana, Laguna Hills, CA (US)

(73) Assignee: Hana Research, Inc., Lake Forest, CA (US)

( * ) Notice: Subject to any disclaimer, the term of this patent is extended or adjusted under 35 U.S.C. 154(b) by 183 days.

(21) Appl. No.: 15/921,245

(22) Filed: Mar. 14, 2018

Related U.S. Application Data

(60) Provisional application No. 62/515,367, filed on Jun. 5, 2017, provisional application No. 62/545,273, filed on Aug. 14, 2017, provisional application No. 62/563,276, filed on Sep. 26, 2017.

(51) Int. Cl.
| | |
|---|---|
| *B64C 39/02* | (2006.01) |
| *A01K 29/00* | (2006.01) |
| *H04R 1/02* | (2006.01) |
| *H04R 1/04* | (2006.01) |
| *H04R 1/08* | (2006.01) |
| *F16M 13/02* | (2006.01) |

(52) U.S. Cl.
CPC .......... *A01K 29/005* (2013.01); *B64C 39/024* (2013.01); *F16M 13/02* (2013.01); *H04R 1/028* (2013.01); *H04R 1/04* (2013.01); *H04R 1/08* (2013.01); *B64C 2201/024* (2013.01); *B64C 2201/12* (2013.01); *B64C 2201/141* (2013.01)

(58) Field of Classification Search
CPC .............. B64C 39/24; B64C 2201/108; B64C 2201/12; B64C 2201/123; B64C 2201/126; B64C 2201/024; B64C 2201/141; B64C 2201/127; A01K 29/005
See application file for complete search history.

(56) References Cited

U.S. PATENT DOCUMENTS

| | | | |
|---|---|---|---|
| 6,535,131 B1 * | 3/2003 | Bar-Shalom ......... | A01K 11/008 340/573.1 |
| 2011/0082574 A1 * | 4/2011 | Pachet ................... | A01K 15/02 700/94 |
| 2016/0063987 A1 * | 3/2016 | Xu ........................ | B64C 39/024 381/71.12 |

(Continued)

*Primary Examiner* — Andrew C Flanders
(74) *Attorney, Agent, or Firm* — Knobbe Martens Olson & Bear LLP

(57) ABSTRACT

An unmanned aerial vehicle is configured to fly along a flight path and capture audio signals produced by animal species or emitted by collars coupled to animals. For example, the unmanned aerial vehicle may include a rail mount to which various attachments can be coupled. One such attachment may be a rail attachment coupled to a support that carries a microphone, a recording device, and/or a radio frequency (RF) transceiver. The microphone can capture audio signals and transmit the captured audio signals to the recording device for storage. The RF transceiver can receive signals emitted by collars and forward the signals to a remote receiver. A remote system can compare the captured audio signals with animal species audio signatures or expected data payloads to identify which animal species are present along the flight path and/or the location at which the animal species are present.

23 Claims, 40 Drawing Sheets

(56) References Cited

U.S. PATENT DOCUMENTS

| | | | |
|---|---|---|---|
| 2016/0101855 A1* | 4/2016 | Stefani | G08G 5/0008 |
| | | | 701/2 |
| 2016/0376004 A1* | 12/2016 | Claridge | A63H 27/12 |
| | | | 701/3 |
| 2018/0033421 A1* | 2/2018 | Yamagishi | B64C 39/024 |
| 2018/0050800 A1* | 2/2018 | Boykin | H04N 5/23206 |
| 2018/0146312 A1* | 5/2018 | Kono | H04Q 9/00 |
| 2019/0166420 A1* | 5/2019 | Paulsen | H04R 3/005 |
| 2019/0297438 A1* | 9/2019 | Miyawaki | G05D 1/0038 |

\* cited by examiner

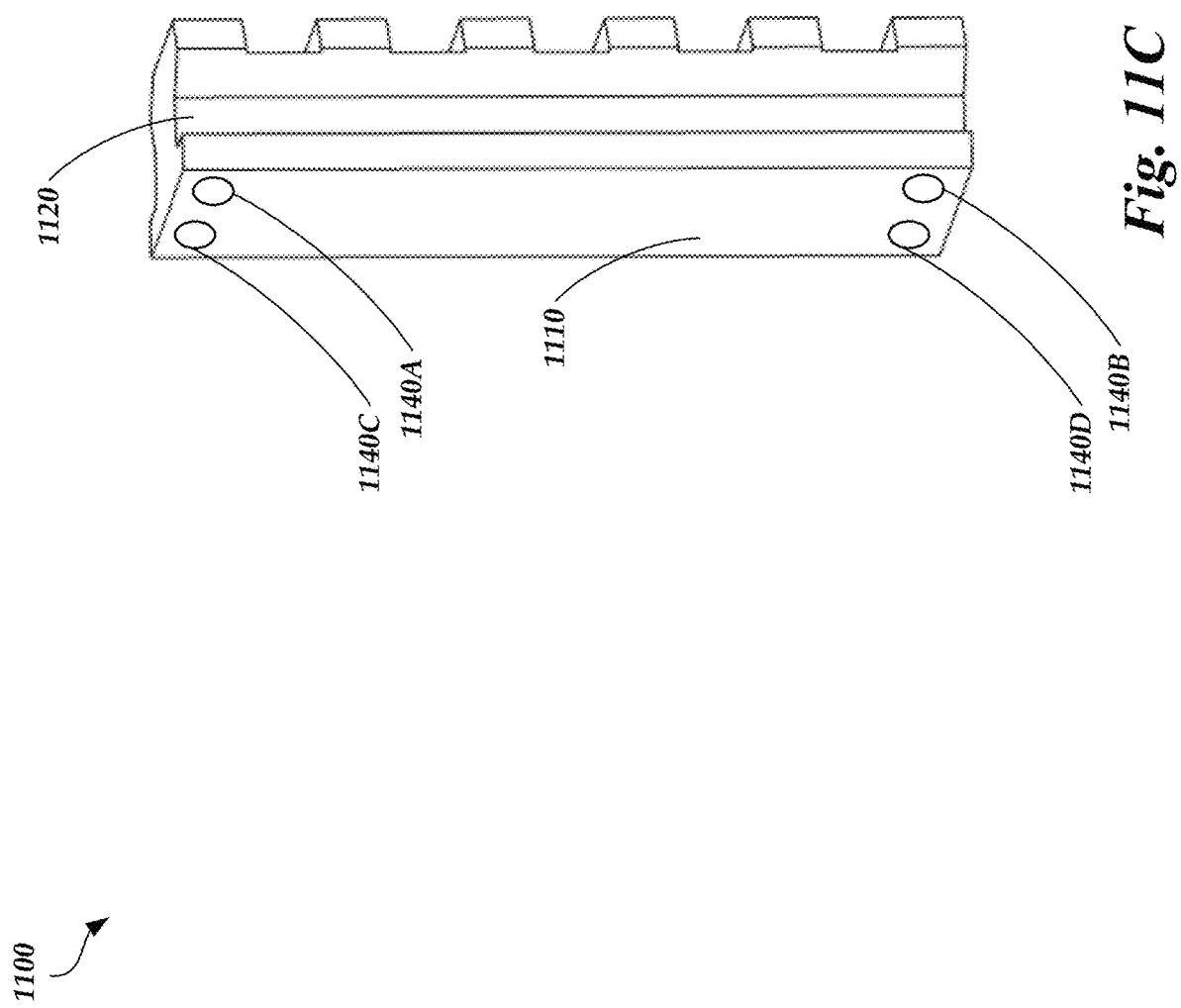

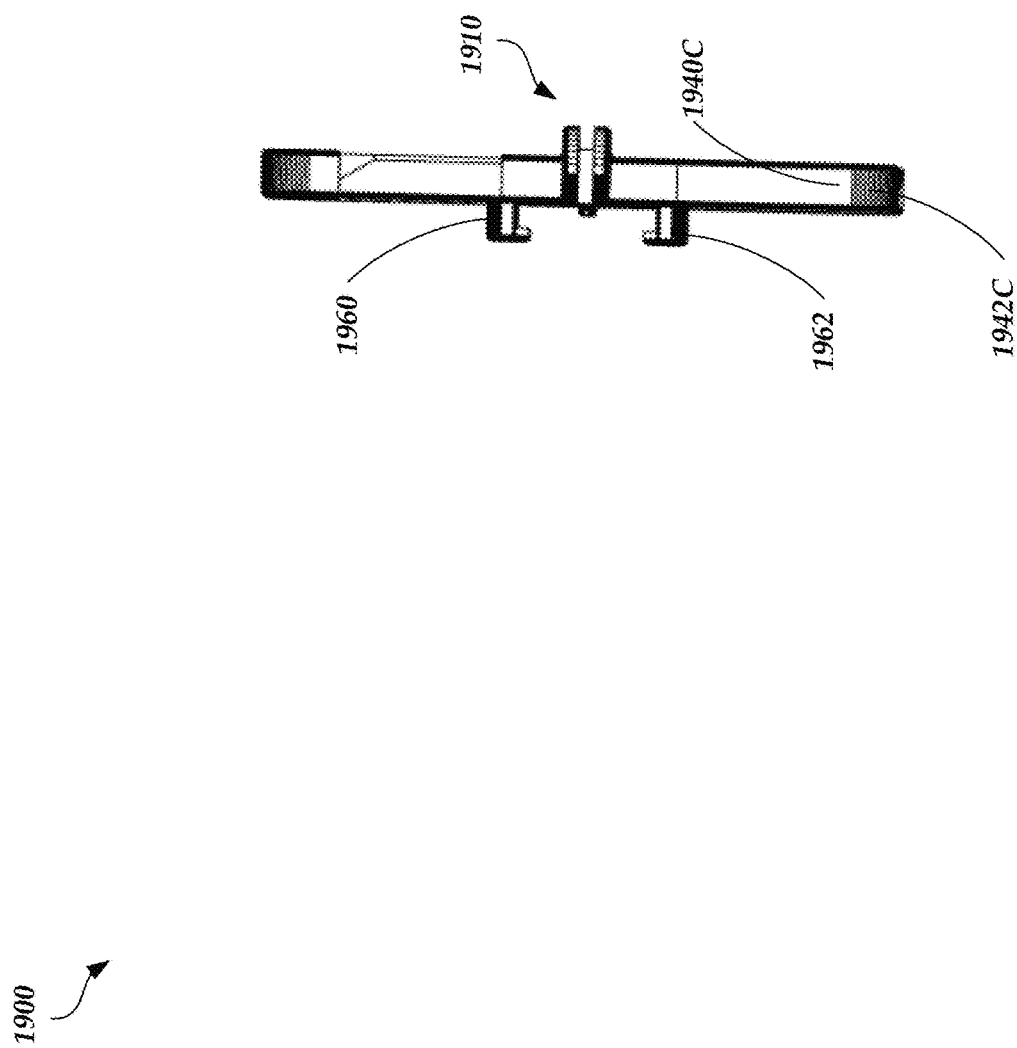

DRONE-ENABLED WILDLIFE MONITORING SYSTEM

CROSS-REFERENCE TO RELATED APPLICATIONS

This application claims priority under 35 U.S.C. § 119(e) to U.S. Provisional Patent Application No. 62/515,367, entitled "ORGANISM GROWTH PREDICTION SYSTEM USING DRONE-CAPTURED IMAGES" and filed on Jun. 5, 2017, to U.S. Provisional Patent Application No. 62/545,273, entitled "ORGANISM GROWTH PREDICTION SYSTEM USING DRONE-CAPTURED IMAGES" and filed on Aug. 14, 2017, and to U.S. Provisional Patent Application No. 62/563,276, entitled "ORGANISM GROWTH PREDICTION SYSTEM USING DRONE-CAPTURED IMAGES" and filed on Sep. 26, 2017, each of which is hereby incorporated by reference herein in its entirety.

BACKGROUND

Occasionally, land becomes damaged or degraded due to human actions, such as construction, contamination, the introduction of invasive species, and/or the like. This damage or degradation can negatively affect the health of native vegetation and/or the population of endangered species. In fact, such damage or degradation can negatively impact humans. For example, disturbing the natural habitat of the land can increase the risk of flooding, reduce access to clean water, or reduce recreational opportunities. Thus, a land owner or a government entity may attempt to restore the land to its natural habitat by reintroducing native vegetation, reintroducing animal species, decontaminating bodies of water, attempting to recreate the original native vegetation coverage, and/or the like.

As part of the habitat restoration process, it may be important to monitor the health of bodies of water over time. Currently, this task is performed by a biologist or oceanographer. For example, a biologist may visit the site, collect water samples from a specific area or portion of the site (e.g., along a transect), analyze the samples in a lab to identify current contamination levels (e.g., by visually inspecting the features of the collected samples), and estimate a status of the decontamination process based on the analysis. Often, however, sites of interest are in remote locations and it is difficult for the biologist to access the proper area to take samples.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a system comprising an unmanned aerial vehicle comprising a battery, a housing that at least partially encloses the battery, and a plate affixed to an exterior of the housing. The system further comprises a rail mount configured to couple to the plate; a rail attachment comprising a first portion and a second portion, where the first portion of the rail attachment is configured to couple to the rail mount; a support comprising a first end and a second end, where the first end of the support is configured to couple to the second portion of the rail attachment; a flexible structure having a first end and a second end, where the first end of the flexible structure is configured to couple to the second end of the support; a canister configured to couple to the second end of the flexible structure; and a computing system comprising one or more computing devices, where the computing system is configured to communicate with the unmanned aerial vehicle and configured with specific computer-executable instructions to instruct the unmanned aerial vehicle to fly along a flight path and collect a substance in the canister at a first geographic location.

The system of the preceding paragraph can include any sub-combination of the following features: where the rail mount comprises a first rail and a second rail, where the first portion of the rail attachment comprises a first protrusion and a second protrusion, and where the first protrusion is configured to interface with the first rail and the second protrusion is configured to interface with the second rail; where the second portion of the rail attachment comprises a first clevis, and where the first end of the support comprises a second clevis; where the first clevis is configured to couple to the second clevis via one of a screw, a bolt, a pin, or a snap; where the first clevis, when coupled to the second clevis, allows the support to rotate about an axis passing through a hole in the second clevis; where the second end of the support comprises a first clevis, and where the first end of the flexible structure is configured to couple to the first clevis; where the flexible structure comprises one of a chain, a cable, a rope, or a string; where the system further comprises a mechanical component comprising a gear that is configured to retract or extend the flexible structure; where the unmanned aerial vehicle comprises a first rotor and a second rotor, and where the plate is positioned in a horizontal plane between the first rotor and the second rotor; where an edge of a radius of the first rotor closest to the second rotor is a first distance from an edge of a radius of the second rotor closest to the first rotor; where a width of a combination of the rail mount and the rail attachment in a transverse direction, when the rail mount is coupled to the plate and the rail attachment is coupled to the rail mount, is less than the first distance; where the substance comprises one of a liquid, a solid, or a gas; and where the system further comprises a canister lid coupled to the canister, where the canister lid comprises a diaphragm that allows the substance to enter the canister.

Another aspect of the disclosure provides an unmanned aerial vehicle comprising a battery; a housing that at least partially encloses the battery; a plate affixed to an exterior of the housing; a rail mount configured to couple to the plate; a rail attachment comprising a first portion and a second portion, where the first portion of the rail attachment is configured to couple to the rail mount; a support comprising a first end and a second end, where the first end of the support is configured to couple to the second portion of the rail attachment; a structure having a first end and a second end, where the first end of the structure is configured to couple to the second end of the support; and a substance-carrying component configured to couple to the second end of the structure.

The unmanned aerial vehicle of the preceding paragraph can include any sub-combination of the following features: where the rail mount comprises a first rail and a second rail, where the first portion of the rail attachment comprises a first protrusion and a second protrusion, and where the first protrusion is configured to interface with the first rail and the second protrusion is configured to interface with the second rail; where the second portion of the rail attachment comprises a first clevis, and where the first end of the support comprises a second clevis; where the first clevis is configured to couple to the second clevis via one of a screw, a bolt, a pin, or a snap; where the structure comprises one of a chain, a cable, a rope, a string, a rod, or a beam; where the unmanned aerial vehicle further comprises a lid coupled to the substance-carrying component, where the lid comprises a diaphragm that allows the substance to enter the substance-carrying component; and where the unmanned aerial vehicle further comprises a first rotor and a second rotor, where the plate is positioned in a horizontal plane between the first rotor and the second rotor, where an edge of a radius of the first rotor closest to the second rotor is a first distance from an edge of a radius of the second rotor closest to the first rotor, and where a width of a combination of the rail mount and the rail attachment in a transverse direction, when the rail mount is coupled to the plate and the rail attachment is coupled to the rail mount, is less than the first distance.

Another aspect of the disclosure provides a method comprising, as implemented by an unmanned aerial vehicle comprising a rail mount, flying along a flight path from a first geographic location toward a second geographic location; descending, at the second geographic location, from a first height to a second height, where the descent causes a substance to enter a canister, where the canister is coupled to a first component removably coupled to the rail mount; ascending, a threshold time period after descending, to a height above the second height; and flying toward the first geographic location.

Another aspect of the disclosure provides method for retrofitting an unmanned aerial vehicle. The method comprises attaching a rail mount to a front surface of a plate of the unmanned aerial vehicle, where a rear surface of the plate couples to a frame housing a battery of the unmanned aerial vehicle; attaching a rail attachment to the rail mount, where the rail attachment comprises a clevis; coupling a clevis of a support to the clevis of the rail attachment; coupling a flexible structure to the support; and coupling a canister to the flexible structure.

The method of the preceding paragraph can include any sub-combination of the following features: where the method further comprises instructing the unmanned aerial vehicle to collect a sample using the canister; where coupling a flexible structure to the support further comprises running the flexible structure through a second clevis of the support; and where coupling a canister to the flexible structure further comprises running the flexible structure through an opening in a lid of the canister.

Another aspect of the disclosure provides a system comprising an unmanned aerial vehicle comprising a battery, a housing that at least partially encloses the battery, and a plate affixed to an exterior of the housing. The system further comprises a rail mount configured to couple to the plate; a rail attachment comprising a first portion and a second portion, where the first portion of the rail attachment is configured to couple to the rail mount; a support comprising a first end and a second end, where the first end of the support is configured to couple to the second portion of the rail attachment; a microphone configured to couple to the support; a recording device configured to couple to the support, where the recording device is configured to supply electrical power to the microphone and receive audio signals captured by the microphone; and a computing system comprising one or more computing devices, where the computing system is configured to communicate with the unmanned aerial vehicle and configured with specific computer-executable instructions to instruct the unmanned aerial vehicle to fly along a flight path such that the recording device can record the audio signals captured by the microphone along the flight path.

The system of the preceding paragraph can include any sub-combination of the following features: where the rail mount comprises a first rail and a second rail, where the first portion of the rail attachment comprises a first protrusion and a second protrusion, and where the first protrusion is configured to interface with the first rail and the second protrusion is configured to interface with the second rail; where the second portion of the rail attachment comprises a first clevis, and where the first end of the support comprises a second clevis; where the first clevis is configured to couple to the second clevis via one of a screw, a bolt, a pin, or a snap; where the first clevis, when coupled to the second clevis, allows the support to rotate about an axis passing through a hole in the second clevis; where the system further comprises a recording device holder configured to at least partially enclose the recording device; where the second end of the support comprises a first clevis, where the recording device holder comprises a second clevis, and where the first clevis is configured to couple with the second clevis via one of a screw, a bolt, a pin, or a snap; where the unmanned aerial vehicle comprises a first rotor and a second rotor, and where the plate is positioned in a horizontal plane between the first rotor and the second rotor; where an edge of a radius of the first rotor closest to the second rotor is a first distance from an edge of a radius of the second rotor closest to the first rotor; where a width of a combination of the rail mount and the rail attachment in a transverse direction, when the rail mount is coupled to the plate and the rail attachment is coupled to the rail mount, is less than the first distance; and where the computing system is further configured with computer-executable instructions to: obtain a first audio signal recorded by the recording device and an indication of a geographic location at which the first audio signal is captured by the microphone, compare the first audio signal to one or more animal species audio signatures, determine that the first audio signal corresponds to a first animal species based on the comparison, and cause a user device to display a user interface indicating that the first animal species is present at the geographic location.

Another aspect of the disclosure provides an unmanned aerial vehicle comprising a battery; a housing that at least partially encloses the battery; a plate affixed to an exterior of the housing; a rail mount configured to couple to the plate; a rail attachment comprising a first portion and a second portion, where the first portion of the rail attachment is configured to couple to the rail mount; a support comprising a first end and a second end, where the first end of the support is configured to couple to the second portion of the rail attachment; a microphone configured to couple to the support; and a recording device configured to couple to the support, where the recording device is configured to supply electrical power to the microphone and receive audio signals captured by the microphone.

The unmanned aerial vehicle of the preceding paragraph can include any sub-combination of the following features: where the rail mount comprises a first rail and a second rail, where the first portion of the rail attachment comprises a first protrusion and a second protrusion, and where the first protrusion is configured to interface with the first rail and the second protrusion is configured to interface with the second rail; where the second portion of the rail attachment comprises a first clevis, and where the first end of the support comprises a second clevis; where the first clevis is configured to couple to the second clevis via one of a screw, a bolt, a pin, or a snap; where the unmanned aerial vehicle further comprises a microphone holder configured to interface with the microphone; where the second end of the support comprises a first clevis, and where the microphone holder comprises an opening through which one of a screw, a bolt, a pin, or a snap can couple the microphone holder to the first clevis; and where the unmanned aerial vehicle further comprises a first rotor and a second rotor, where the plate is positioned in a horizontal plane between the first rotor and the second rotor, where an edge of a radius of the first rotor closest to the second rotor is a first distance from an edge of a radius of the second rotor closest to the first rotor, and where a width of a combination of the rail mount and the rail attachment in a transverse direction, when the rail mount is coupled to the plate and the rail attachment is coupled to the rail mount, is less than the first distance.

Another aspect of the disclosure provides an unmanned aerial vehicle comprising a battery; a housing that at least partially encloses the battery; a plate affixed to an exterior of the housing; a rail mount configured to couple to the plate; a rail attachment comprising a first portion and a second portion, where the first portion of the rail attachment is configured to couple to the rail mount; a support comprising a first end and a second end, where the first end of the support is configured to couple to the second portion of the rail attachment; and a radio frequency (RF) transceiver configured to couple to the support, where the RF transceiver is further configured to receive a signal emitted by a collar coupled to an animal species and transmit the signal to a remote receiver.

The unmanned aerial vehicle of the preceding paragraph can include any sub-combination of the following features: where the unmanned aerial vehicle further comprises a first rotor and a second rotor, where the plate is positioned in a horizontal plane between the first rotor and the second rotor, where an edge of a radius of the first rotor closest to the second rotor is a first distance from an edge of a radius of the second rotor closest to the first rotor, and where a width of a combination of the rail mount and the rail attachment in a transverse direction, when the rail mount is coupled to the plate and the rail attachment is coupled to the rail mount, is less than the first distance.

Another aspect of the disclosure provides a method for retrofitting an unmanned aerial vehicle. The method comprises: attaching a rail mount to a front surface of a plate of the unmanned aerial vehicle, where a rear surface of the plate couples to a frame housing a battery of the unmanned aerial vehicle; attaching a rail attachment to the rail mount, where the rail attachment comprises a clevis; coupling a clevis of a support to the clevis of the rail attachment; and coupling a device to the support for capturing audio signals.

The method of the preceding paragraph can include any sub-combination of the following features: where the method further comprises instructing the unmanned aerial vehicle to collect the audio signals; where the device comprises a microphone, where the method further comprises coupling a recording device to the microphone; where coupling a recording device to the microphone further comprises coupling a cord from the recording device to the microphone to supply electrical power to the microphone; and where the device comprises a radio frequency (RF) transceiver.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIGS. 11A-11C illustrate an exemplary rail mount.

FIGS. 19A-19C illustrate an exemplary recording device holder.

DETAILED DESCRIPTION OF SPECIFIC EMBODIMENTS

Figure 1:
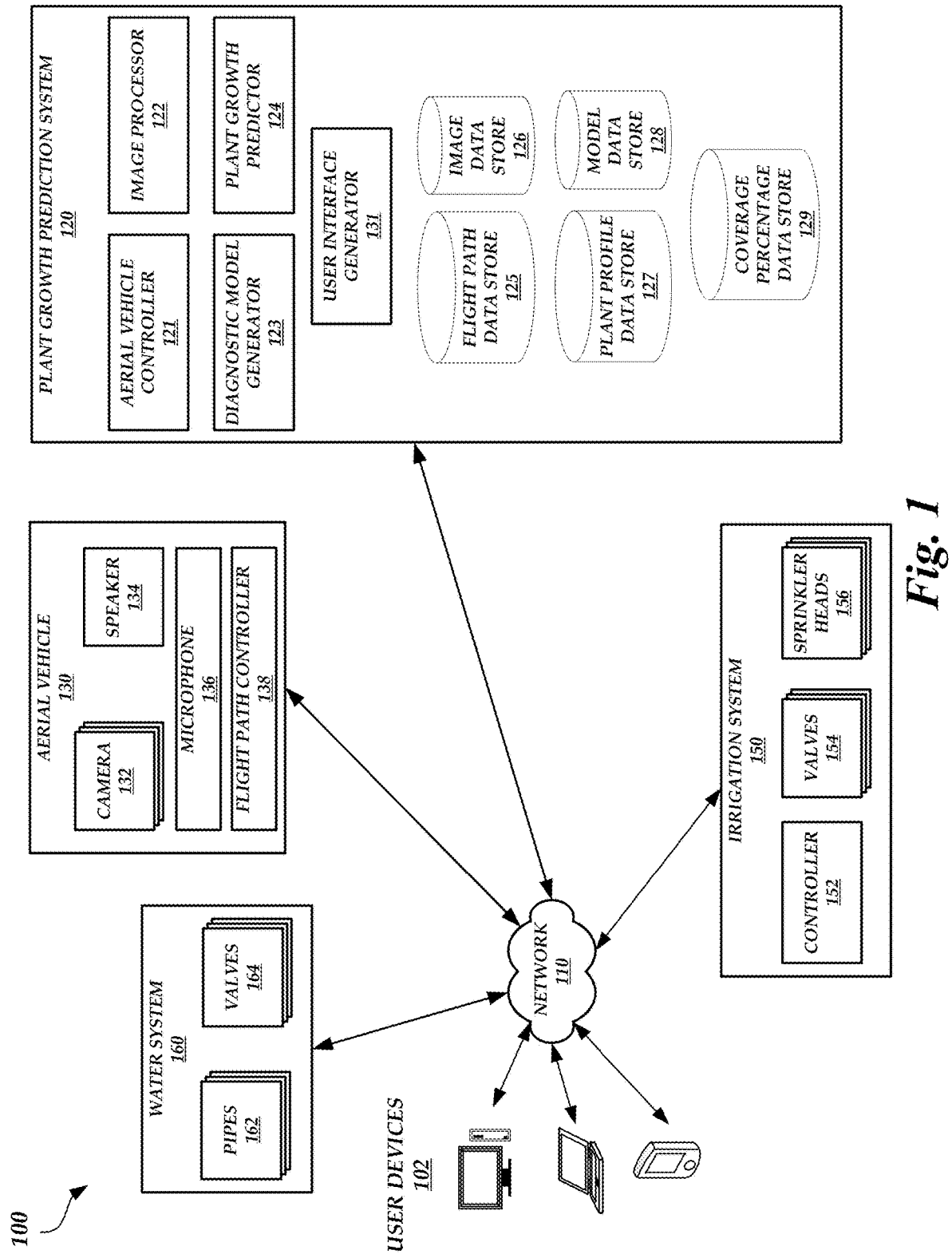
FIG. 1 is a block diagram of an illustrative operating environment in which a plant growth prediction system uses images captured by an aerial vehicle to determine current and/or predict future plant growth.

A plant growth prediction system will initially be described herein with reference to FIGS. 1 through 10B, and a rail mount and corresponding components that can be used to retrofit an unmanned aerial vehicle for collecting and/or carrying a sample and/or for monitoring wildlife will then be described herein with reference to FIGS. 11A through 20. In some embodiments, the plant growth prediction system and the retrofitted unmanned aerial vehicle described herein can be used in conjunction with each other. In other embodiments, the plant growth prediction system and the retrofitted unmanned aerial vehicle described herein can be used independently of each other.

As described above, it may be difficult for a biologist to access the proper area to take samples of a desired substance. In addition, the current process of estimating plant growth at a site (e.g., a parcel or plot of land) is subjective and imprecise. For example, portions of a site may be inaccessible by a human due to the terrain, plant species that are present, and/or animal species that are present. In some cases, portions of a site may be accessed. However, if such portions are accessed, this may cause a disturbance in the site and result in inaccurate measurements and/or damage to the native vegetation and/or animal species. Thus, biologists often take samples from just a transect of the site and generate decontamination estimates and/or plant growth estimates based on an extrapolation of the data collected from the transect. Conventional computing systems could be used to identify levels of contamination and/or to generate plant growth estimates based on samples collected by biologists. However, these conventional computing systems do not resolve inaccuracies that may result from the samples being collected in just a transect of a site.

In particular, a biologist may analyze the collected samples to identify the plant species that were present in the transact (e.g., by visually inspecting the features of the collected samples and comparing those features to the features of known plant species, by running a DNA test and comparing the results to the DNA of known plant species, etc.) and estimate a status of the growth of a particular plant species in the entire site based on the analysis. However, a site generally will not have a uniform distribution of plant species. For example, the terrain of the site, the amount of available sunshine, the level of the water table, and/or other factors may affect whether a particular plant species will be present in a specific transect of the site. Thus, the estimation then may greatly depend on the transect from which the biologist collected samples. Given the subjectivity and variability of this estimation, it may be important to implement techniques for analyzing the plant growth across an entire site.

Accordingly, aspects of the present disclosure provide a plant growth measurement and prediction system that uses drone-captured images to measure the current growth of particular plant species and/or to predict future growth of the plant species. For example, a user, via a user device, may communicate with the plant growth prediction system to set the flight path of a drone or another aerial vehicle. The drone may be equipped with one or more cameras, such as a thermal imaging camera, a high-resolution camera (e.g., 4K, 8K, etc.), and/or the like. In an embodiment, the flight path is set such that the drone will capture images covering an entire site. Once the flight path is set, the plant growth prediction system can transmit flight path data to the drone over a network (or a wired or wireless point-to-point link) and instruct the drone to conduct a series of flights over a period of time, where each flight follows the same flight path. For example, flights may take place once ever few weeks, months, years etc. The drone may communicate with a satellite system (e.g., a global positioning system (GPS)) and/or terrestrial system to fly according to the received flight path data. As the drone flies along the provided flight path, the drone may periodically capture images of the land underneath the drone. For example, the drone can capture images directly underneath the drone (e.g., the camera(s) may be positioned such that a lens is approximately parallel with the land) and/or at an angle (e.g., the camera(s) may be positioned such that a lens deviates from being parallel with the land by a certain angle). The drone may capture images using one or more of the cameras and transmit such images to the plant growth prediction system in real-time and/or after the flight is complete.

The plant growth prediction system may stitch the received images together to form a single stitched image. For example, each image (e.g., the boundaries of the image, edges of the image, vertices of the image, individual pixels within the image, etc.) may correspond with one or more geographic coordinates (e.g., GPS coordinates). The plant growth prediction system can stitch the received images using the geographic coordinates as a guide (e.g., the plant growth prediction system can append an edge of one image to a portion of another image if the edge and portion each correspond to the same geographic coordinate or range of geographic coordinates). As described above, the flight path may be set such that the drone captures images covering an entire site. Thus, the stitched image may be an image that captures an entire site. If the drone includes different types of cameras, the plant growth prediction system can segregate images corresponding to a particular type of camera and stitch together those images that originated from a particular type of camera. Thus, the plant growth prediction system may form multiple stitched images. The plant growth prediction system can then combine the multiple stitched images to form an orthomosaic image.

As an illustrative example, if the drone captures both thermographic images (e.g., using a thermal camera) and high-resolution images (e.g., using a high-resolution camera), then the plant growth prediction system can generate a thermographic stitched image by stitching the thermographic images and a high-resolution stitched image by stitching the high-resolution images. Given that thermal cameras generally produce an image that identifies a brightness temperature of various objects captured within the image, the thermographic stitched image may then be an image that identifies the brightness temperature of various objects captured within each of the stitched thermographic images. The plant growth prediction system can then process the two stitched images by overlaying the thermographic stitched image over the high-resolution stitched image and identifying, for each pixel in the high-resolution stitched image, a brightness temperature level. The result of processing the stitched images may be an orthomosaic image.

Note that while the distribution of pixels within an image describes the spatial structure of the image, the radiometric characteristics of the pixels describe the actual content depicted in the image. For example, the sensitivity of a film or a sensor of the camera 132 to the magnitude of the electromagnetic energy present in the environment may determine the radiometric resolution of the film or sensor. The radiometric resolution of the film or sensor may describe the film or sensor's ability to discriminate very slight differences in the electromagnetic energy present in the environment. As an illustrative example, the higher the radiometric resolution of a sensor, the more sensitive the sensor is to detecting small differences in the intensity or reflectivity of the electromagnetic energy. Thus, the values of the brightness temperatures depicted within the thermographic images and the differences in brightness temperature values between different pixels may depend on the radiometric resolution of the film or sensor of the camera 132 that captured the thermographic images.

The first time a drone captures images for a particular site, the resulting orthomosaic image may be stored for future use. Once one or more additional flights take place, the plant growth prediction system can form orthomosaic images for each of these additional flights and use the orthomosaic images along with the initial orthomosaic image to identify current plant growth and/or predict future plant growth.

For example, given a known set of conditions, a plant species may radiate its kinetic temperature at a certain brightness temperature. Thus, a mapping between brightness temperature and plant species can be generated and stored in a data store. In addition, other organic and inorganic matter, such as animals, organisms other than plants and animals, dirt, water, etc., may radiate their kinetic temperature at certain brightness temperatures and mappings can be generated and stored for these types of matter as well. The plant growth prediction system can retrieve the mappings for processing each orthomosaic image. In particular, the plant growth prediction can, for each pixel in each orthomosaic image, use the mappings to identify a plant species (or animal species, other organisms, dirt, water, etc.) that maps to the brightness temperature of the respective pixel. A user, via the user device, may have specified certain plant species that are of interest. For example, in the context of habitat restoration, the user may be interested in monitoring the growth of a native plant species at a site. In addition, the user may be interested in monitoring the amount of fill present at the site (e.g., open space, dirt areas, and/or other areas that were damaged or regraded and need to be filled in), the growth of invasive species (e.g., weeds, non-native animals, and/or other objects blown in from surrounding areas), and/or plant diversity (e.g., the number of different types of plant species that are present in the site). The plant growth prediction system can then, for each orthomosaic image, use the identified plant species to determine, for a time corresponding to the respective orthomosaic image, a percentage of the site that is covered by the native species, a percentage of the site that is covered by fill, a percentage of the site that is covered by an invasive species, a count representing the plant diversity in the site, and/or the like. A percentage of a site that is covered by a particular object is referred to herein as a "coverage percentage."

Using the coverage percentages determined for a native species over a period of time, the plant growth prediction system can generate a diagnostic model. The diagnostic model can be used to predict future native species growth (e.g., represented by a coverage percentage). For example, the plant growth prediction system can perform a linear regression analysis of the coverage percentages, a cubic polynomial regression analysis of the coverage percentages, and/or the like to generate the diagnostic model. The plant growth prediction system can further generate a diagnostic model for fill, an invasive species, and/or plant diversity using the same techniques.

The diagnostic model(s) may each output a coverage percentage or plant diversity count as a function of time. Thus, the plant growth prediction system may then use the diagnostic model(s) to predict future coverage percentages and/or a plant diversity count at various times in the future. For example, the plant growth prediction system can use the diagnostic model corresponding to a native species to predict a time at which the native species will have a coverage percentage corresponding to a desired coverage percentage (e.g., a coverage percentage that indicates that the habitat restoration is complete). The plant growth prediction system can package the predictions into a report and transmit the report to a user device. In addition, the plant growth prediction system can modify one or more orthomosaic images to indicate certain information. For example, the plant growth prediction system can annotate a latest orthomosaic image to indicate areas where a native species is growing and areas in which the native species needs to grow (e.g., in fill areas) to meet a desired coverage percentage. The plant growth prediction system can also send the modified orthomosaic image(s) to the user device.

Thus, unlike the subjective estimations performed by a biologist, the techniques implemented by the plant growth prediction system described herein can result in an objective analysis of current and future plant growth. For example, a drone or other aerial vehicle can reach areas of a site that otherwise may be inaccessible or should not be accessed due to the potential damage that may be incurred. Thus, the drone can measure data for an entire site, rather than just a transect, and provide such data to the plant growth prediction system. The plant growth prediction system then can use the data for an entire site to determine an accurate representation of the current plant growth and predict future plant growth. The plant growth prediction system, therefore, determines a more accurate representation of the current plant growth and/or predicts future plant growth using techniques that previously could not even be performed by biologists.

In addition, because the drone is not necessarily capturing physical samples for later analysis (although this may occur in certain embodiments, as described below), the plant growth prediction system implements different techniques and rules than a biologist in identifying the presence of plant species for the purpose of determining current plant growth. For example, while a biologist may visit a site, retrieve physical vegetation samples, and conduct tests on the physical vegetation samples in a lab, the plant growth prediction system instead controls a drone and implements image processing techniques to identify certain characteristics of objects present in the drone-captured images (e.g., brightness temperature). Such image processing techniques include stitching images, merging stitched images, identifying the brightness temperature of a pixel in the merged image, and comparing the identified brightness temperature to plant species-brightness temperature mappings to determine a plant species that is present at the pixel. In fact, a biologist would not even be able to perform these image processing techniques (e.g., by visually inspecting the physical vegetation samples) because the brightness temperatures analyzed by the plant growth prediction system are derived from drone-captured thermal images, which are images depicting light that is invisible to humans (e.g., infrared light).

Accordingly, the plant growth prediction system described herein provides an improvement in computer-related technology (e.g., by allowing computing devices to produce more accurate determinations of current plant growth at a site and/or more accurate predictions of future plant growth at the site) using specific techniques that are not used and cannot be used by humans, who instead rely on subjective determinations in estimating current plant growth.

While the primary use case for the plant growth prediction system described herein is monitoring of habitat restoration at a site, this is merely for illustrative purposes and is not meant to be limiting. Given that organic and inorganic matter produce a certain brightness temperature under known conditions, some or all of the techniques described herein as being implemented by the plant growth prediction system can be applied to other diverse use cases. For example, some or all of the techniques described herein can be implemented for inspecting golf courses (e.g., determining current and/or predicting future plant growth), water management (e.g., the brightness temperature of soil may change as the water table rises and falls, so the techniques described herein can be used to evaluate water table levels; evaluating the surface area covered by a body of water over time for flood management purposes, for irrigation purposes, etc.; etc.), inspecting trees (e.g., determining current levels of and/or predicting future levels of the amount of cover or shade provided by trees, determining current and/or predicting future tree health given that the brightness temperature changes as trees dry out and/or die, etc.), inspect plant health (e.g., determining current levels of and/or predicting future levels of plant health given that the brightness temperature changes as plants become sick or healthier), monitoring animals (e.g., determining current and/or predicting future bird counts, determining current and/or predicting future endangered species counts, identifying the presence of certain species, etc.), monitoring invasive species (e.g., determining current and/or predicting future weed growth), mapping fire fuel (e.g., determining current and/or predicting future growth of plants susceptible to extending the life of a fire), inspecting erosion (e.g., different soil layers may correspond to different brightness temperatures, so the movement or appearance of soil layers over time can be determined and/or predicted), evaluating common areas (e.g., for a homeowners association or park to determine and/or predict plant growth), inspecting mining operations (e.g., determining current and/or predicting future water movement, determining current and/or predicting future growth of reintroduced plants, etc.), landscaping (e.g., determining current and/or predicting future plant growth), monitoring a waste reclamation site (determining current and/or predicting future plant growth), monitoring vineyards (e.g., determining current and/or predicting future grapevine growth, determining current and/or predicting future invasive plant and/or animal species growth, etc.), monitoring nurseries (determining current and/or predicting future plant growth), substance collection (e.g., collecting liquid, such as water, solid objects, like rocks or soil, gas, like $CO_2$, etc.), and/or for any other use cases in which it may be beneficial to measure and/or predict plant growth.

The foregoing aspects and many of the attendant advantages of this disclosure will become more readily appreciated as the same become better understood by reference to the following detailed description, when taken in conjunction with the accompanying drawings.

Example Plant Growth Prediction Environment

FIG. 1 is a block diagram of an illustrative operating environment 100 in which a plant growth prediction system 120 uses images captured by an aerial vehicle 130 to determine current plant growth and/or predict future plant growth. The operating environment 100 further includes various user devices 102 that may communicate with the plant growth prediction system 120 via a network 110 to provide flight path parameters, to receive generated reports, and/or to receive modified images indicating current and/or predicted plant growth. In addition, the operating environment 100 may further include an irrigation system 150 and a water system 160 that can be controlled directly or indirectly by the plant growth prediction system 120.

The aerial vehicle 130 may be an unmanned aerial vehicle. For example, the aerial vehicle 130 may be four or six rotor drone. Alternatively, the aerial vehicle 130 can be a manned aerial vehicle. In some embodiments, two or more unmanned aerial vehicles may be used concurrently at a given site to perform the functionality described herein with respect to a single aerial vehicle 130. The aerial vehicle 130 may include one or more cameras 132. For example, each camera 132 may be a different type of camera, such as a thermal imaging camera, a high-resolution camera (e.g., 4K, 8K, etc.), and/or the like. Alternatively or in addition, one camera 132 may include multiple lenses such that the camera 132 can capture different types of images. The camera(s) 132 may be mounted to a bottom and/or side surface of the aerial vehicle 130 such that the camera(s) 132 can capture images of the land underneath the aerial vehicle 130. In some embodiments, one or more of the cameras 132 are mounted to a gimbal that mounts to a bottom and/or side surface of the aerial vehicle 130 to allow for camera 132 rotation. One or more of the cameras 132 may include a network interface (e.g., a universal serial bus (USB) port, an Ethernet port, a wireless transceiver, etc.) to communicate with the plant growth prediction system 120 via the network 110 (or via a wired or wireless point-to-point link). Alternatively, the cameras 132 may transmit data (e.g., captured images) to a network interface (e.g., a universal serial bus (USB) port, an Ethernet port, a wireless transceiver, etc., not shown) of the aerial vehicle 130 for eventual transmission to the plant growth prediction system 120.

The aerial vehicle 130 may further include a flight path controller 138. The flight path controller 138 may communicate with the plant growth prediction system 120 to receive flight path parameters. For example, flight path parameters may include a flight path (e.g., one or more geographic coordinates, waypoints, flight length, flight time, speed, altitude, flight course mode, a front overlap ratio (e.g., a front overlap of the defined boundaries of a capture site that is necessary for the one or more cameras 132 to fully capture the capture site, represented as a percentage), a side overlap ratio (e.g., a side overlap of the defined boundaries of a capture site that is necessary for the one or more cameras 132 to fully capture the capture site, represented as a percentage), a course angle, etc.), a shooting angle (e.g., an angle at which one or more cameras 132 is positioned to capture images), a capture mode (e.g., a setting indicating when the one or more cameras 132 capture images), a gimbal pitch angle (e.g., an angle of a lens of the one or more cameras 132), an end-mission action (e.g., hover, return to start, etc.), camera resolution, and/or the like. Alternatively, the flight path controller 138 can communicate directly with a user device 102, such as a user device 102 present at a site with the aerial vehicle 130.

Upon receiving flight path parameters, the flight path controller 138 can control the operation of the aerial vehicle 130 according to the flight path parameters. For example, the flight path controller 138 can transmit instructions to various components of the aerial vehicle 130 to cause the aerial vehicle 130 to take off from a current location, follow a certain flight path, instruct the camera(s) 132 to capture images at the appropriate time and at the appropriate angle, and land once the flight is complete. Commercially available drones, such as the DJI PHANTOM 3 or INSPIRE 1 PRO unmanned aerial vehicles, and associated code (e.g., such as the live view application provided with the DJI PHANTOM 3 unmanned aerial vehicle) may provide such features. In some embodiments, the plant growth prediction system 120 can transmit updated flight path parameters to the flight path controller 138 while the aerial vehicle 130 is in flight. When updated flight path parameters are received in flight, the flight path controller 138 can transmit instructions to various components of the aerial vehicle 130 to cause the aerial vehicle 130 to adjust flight according to the updated flight path parameters.

The flight path controller 138 may further include instructions that, when executed, cause the aerial vehicle 130 to deviate from the selected flight path at the instruction of a user and/or automatically. For example, as described below, the aerial vehicle 130 can transmit captured images in real-time (e.g., as the images are captured) to the plant growth prediction system 120. The plant growth prediction system 120 (e.g., the image processor 122 described below) may provide one or more user devices 102 with access to the captured images as they are received during a flight. For example, the plant growth prediction system 120 (e.g., the user interface generator 131 described below) may generate user interface data that is transmitted to a user device 102 and that causes the user device 102 to display a user interface showing the images as the images are captured by the one or more cameras 132. A user viewing the user interface and captured images may notice an object of interest and can use controls provided by the user interface to transmit instructions to the aerial vehicle 130 via the plant growth prediction system 120 that causes the aerial vehicle 130 to return to the location where the object of interest was noticed. As another example, the plant growth prediction system 120 (e.g., the image processor 122) and/or the flight path controller 138 can be configured to process captured images as the camera(s) 132 captures such images to identify certain objects and, if such objects are identified, instruct the aerial vehicle 130 or otherwise cause the aerial vehicle 130 to deviate from the flight path to revisit the identified object (e.g., to capture additional images). The plant growth prediction system 120 and/or flight path controller 138 can use data indicating the shape and/or brightness temperature of specific objects to process a captured image and determine whether an object with the same shape and/or brightness temperature is present. Note that the flight path controller 138 may intercept and/or receive images captured by the camera(s) 132 in order to perform the processing.

Optionally, the aerial vehicle 130 includes a speaker 134 and/or microphone 136. For example, the aerial vehicle 130 may be instructed to capture images for the purpose of monitoring an animal population (e.g., birds, rodents, deer, endangered species, etc.). The speaker 134 may output a sound that resembles a sound produced by the subject animal species (e.g., a bird call). The microphone 136 may be enabled to listen for sounds that are produced in response to the sound output by the speaker 134. The aerial vehicle 130 can transmit the sounds picked up by the microphone 136 along with the geographic coordinates at which the sounds were received to the plant growth prediction system 120 for analysis. In particular, the plant growth prediction system 120 may store a mapping of sounds to specific animal species. Thus, the plant growth prediction system 120 can process the received sounds to identify whether the sounds resemble sounds associated with a known animal species. If a match occurs, then the plant growth prediction system 120 can determine that at least one animal of the animal species was present in the vicinity of a location at which the sound was picked up by the microphone 136. This audio processing can supplement the image processing described herein to provide a more accurate determination of a current animal population and/or a more accurate prediction of a future animal population. In addition, the audio data may help the plant growth prediction system 120 provide accurate determinations of a current animal population and/or accurate predictions of a future animal population even if the particular animal species is not visible in the captured images.

In further embodiments, not shown, the aerial vehicle 130 includes a mechanical and/or pneumatic attachment (e.g., a mechanical and/or pneumatic arm) configured to obtain and hold items, collect samples, and/or the like. Examples of the components that may comprise a mechanical and/or pneumatic attachment, including a rail mount 1100, a rail attachment 1200, a support 1300, a canister holder 1500, a flexible structure, a canister, a canister lid, a support 1700, a recording device holder 1900, a microphone holder, a radio frequency (RF) transceiver holder, a recording device, a microphone, and/or an RF transceiver, are described in greater detail below. During flight, the aerial vehicle 130 can use the mechanical attachment to perform such actions and record, using the current geographic coordinates of the aerial vehicle 130, a location at which such actions were performed. The location information may then be used in determining current and/or predicted plant growth and/or for modifying an orthomosaic image to indicate a location where an action was performed.

In further embodiments, the aerial vehicle 130 may include sensors, not shown, to perform obstacle avoidance. For example, the aerial vehicle 130 may be flying at a low altitude (e.g., 8-9 meters). Tree branches, terrain, and/or other objects may therefore impede the flight path of the aerial vehicle 130. The aerial vehicles 130 (e.g., the flight path controller 138) can therefore use the sensors to detect objects to the front and/or side of the aerial vehicle 130, adjust a flight path of the aerial vehicle 130 to avoid the detected objects, and then return to the flight path set by the flight path parameters once the aerial vehicle 130 is clear of the detected objects.

The plant growth prediction system 120 can be a computing system configured to periodically instruct the aerial vehicle 130 to capture images along a flight path above a site and use the captured images to determine current plant growth and/or predict future plant growth at the site. For example, the plant growth prediction system 120 may be a single computing device, or it may include multiple distinct computing devices, such as computer servers, logically or physically grouped together to collectively operate as a server system, or independent components or devices that are or are not networked together, but that are used in combination to perform the operations described herein. As an illustrative example, one computing device in the plant growth prediction system 120 may perform the operations described below with respect to aerial vehicle controller 121, while another, separate computing device in the plant growth prediction system 120 may perform the operations described below with respect to the plant growth predictor 124. The components of the plant growth prediction system 120 can each be implemented in application-specific hardware (e.g., a server computing device with one or more ASICs) such that no software is necessary, or as a combination of hardware and software. In addition, the modules and components of the plant growth prediction system 120 can be combined on one server computing device or separated individually or into groups on several server computing devices. In some embodiments, the plant growth prediction system 120 may include additional or fewer components than illustrated in FIG. 1.

In some embodiments, the features and services provided by the plant growth prediction system 120 may be implemented as web services consumable via the communication network 110. In further embodiments, the plant growth prediction system 120 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The plant growth prediction system 120 may include various modules, components, data stores, and/or the like to provide the plant growth measurement and prediction functionality described herein. For example, the plant growth prediction system 120 may include an aerial vehicle controller 121, an image processor 122, a diagnostic model generator 123, a plant growth predictor 124, a flight path data store 125, an image data store 126, a plant profile data store 127, a model data store 128, a coverage percentage data store 129, and a user interface generator 131.

The aerial vehicle controller 121 may receive flight path parameters from the user device 102 via the network 110. In an embodiment, the user device 102 sets the flight path such that the aerial vehicle 130 captures images covering an entire site. As described in greater detail below with respect to FIGS. 5A-5B, the user device 102 may present a user interface that allows a user to visually set the flight path and one or more flight path parameters. The user device 102 may additional provide the aerial vehicle controller 121 with a set of times or phases at which the aerial vehicle 130 should conduct flights. For example, the user device 102 may indicate that a first flight should occur before any impact to the site has occurred, a second flight should occur once impact to the site has commenced (e.g., a portion of the site is under construction, plant material has been removed, surface lines have been installed, trenches have been dug, etc.), a third flight should occur once plants are being installed, a fourth flight should occur as plant material begins to mature, and/or any times after the plant material has begun to mature. Time intervals between flights may be in the minutes, hours, days, weeks, months, years, etc. In an embodiment, the aerial vehicle controller 121 stores the flight path parameters in the flight path data store 125 in an entry associated with the site such that the flight path parameters can be retrieved and reused for each subsequent flight (e.g., each flight may occur according to the same flight path parameters).

Once the aerial vehicle controller 121 determines that the aerial vehicle 130 should conduct a flight at a current time, a project member may bring the aerial vehicle 130 to the site (e.g., based on a reminder provided by the plant growth prediction system 120). The aerial vehicle controller 121 can transmit the flight path parameters to the aerial vehicle 130 over the network 110 and instruct the aerial vehicle 130 (e.g., the flight path controller 138) to begin the flight. The aerial vehicle 130 (e.g., the flight path controller 138) may communicate with a satellite system (e.g., a GPS system) and/or terrestrial system to fly according to the received flight path parameters. As the aerial vehicle 130 travels along the indicated flight path, the aerial vehicle 130 captures images of the land underneath the aerial vehicle 130 at an interval determined by the capture mode and in a manner determined by the shooting angle and/or the gimbal pitch angle using the one or more cameras 132. For example, the one or more cameras 132 can capture images directly underneath the aerial vehicle 130 (e.g., the camera(s) 132 may be positioned such that a lens is approximately parallel with the land, facing straight down) and/or at an angle (e.g., the camera(s) 132 may be positioned such that a lens deviates from being parallel with the land by a certain angle). The camera(s) 132 and/or a network interface (not shown) may transmit captured images to the image processor 122 in real-time (e.g., as the images are captured) and/or after the flight is complete.

The image processor 122 may stitch the received images together to form a single stitched image. For example, the aerial vehicle 130 may transmit metadata associated with each image. The metadata may indicate portions of the image (e.g., the boundaries of the image, edges of the image, vertices of the image, individual pixels within the image, etc.) that correspond to particular geographic coordinates (e.g., as determined by the aerial vehicle 130 via communications with the GPS system). The image processor 122 can stitch the received images using the geographic coordinates provided in the metadata as a guide. For example, the image processor 122 can append an edge of one image to an edge of another image if the edges each correspond to the same geographic coordinate or range of geographic coordinates. As another example, the image processor 122 can append an edge of one image to a portion of another image if the edge and portion each correspond to the same geographic coordinate or range of geographic coordinates. As described above, the flight path may be set such that the aerial vehicle 130 captures images covering an entire site. Thus, the stitched image may be an image that captures an entire site.

If the aerial vehicle 130 includes different types of cameras 132, then the image processor 122 can segregate images corresponding to a particular type of camera 132 and stitch together those images that originated from a particular type of camera 132. Thus, the image processor 132 may form multiple stitched images. The image processor 122 can then combine the multiple stitched images to form an orthomosaic image. For example, the image processor 122 may use a digital elevation model (DEM) of the site to combine the multiple stitched images using orthorectification techniques such that the stitched images are geometrically corrected to have a uniform scale. In other words, the image processor 122 may form an orthomosaic image that has the same lack of distortion as a map and can be used to measure true distances.

As an illustrative example, if the aerial vehicle 130 captures both thermographic images (e.g., using a thermal camera 132) and high-resolution images (e.g., using a high-resolution camera 132), then the image processor 122 can generate a thermographic stitched image by stitching the thermographic images and a high-resolution stitched image by stitching the high-resolution images. Given that thermal cameras 132 generally produce an image that identifies a brightness temperature of various objects captured within the image, the thermographic stitched image may then be an image that identifies the brightness temperature of various objects captured within each of the stitched thermographic images. The image processor 122 can then process the two stitched images by overlaying the thermographic stitched image over the high-resolution stitched image and identifying, for each pixel in the high-resolution stitched image, a brightness temperature level. The result of processing the stitched images may be an orthomosaic image.

Given that different objects have different emissivity levels, the image processor 122 may adjust an emissivity sensitivity level of one or more of the thermographic images before the stitching is performed depending on the type of prediction that the plant growth prediction system 120 will eventually perform. For example, plant material may have high emissivity levels (e.g., between 0.94 and 0.96), whereas water may have lower emissivity levels (e.g., around 0.67). Thus, as an illustrative example, the image processor 122 may adjust the emissivity sensitivity level of the thermographic images to between 0.94 and 0.96 if determining current and/or predicting future plant growth and may adjust the emissivity sensitivity level of the thermographic images to around 0.67 if determining current and/or predicting future water table levels.

The pixels in an orthomosaic image may be labeled, shaded (e.g., with specific colors that indicate brightness temperature), or otherwise annotated to indicate the identified brightness temperature levels. Such labels, shading, or annotations may be visible or invisible when a device, such as the user device 102, displays the orthomosaic image. For example, a background of the orthomosaic image may be the geometrically-corrected high-resolution stitched image. The pixels of the orthomosaic image may then be shaded colors corresponding to the identified brightness temperature of the respective pixels. Alternatively, the orthomosaic image may be associated with metadata that identifies the brightness temperature levels of each pixel in the orthomosaic image.

The image processor 122 may store the orthomosaic image generated from images captured during a flight in the image data store 126. If a stored orthomosaic image corresponds to a first flight for a particular site, the plant growth prediction system 120 may take no further action. However, once one or more additional flights take place and the image processor 122 forms one or more additional orthomosaic images, the plant growth prediction system 120 can use the stored orthomosaic images to identify current plant growth and/or predict future plant growth at the site.

For example, given a known set of conditions, a plant species may radiate its kinetic temperature at a certain brightness temperature. Thus, mappings between brightness temperature and plant species can be generated and stored in the plant profile data store 127. In addition, other organic and inorganic matter, such as animals, organisms other than plants and animals, dirt, water, etc., may radiate their kinetic temperature at certain brightness temperatures and mappings can be generated and stored in the plant profile data store 127 for these types of matter as well.

In further embodiments, leaf, plant, and/or animal shape (e.g., detected via a pattern recognition process implemented by the image processor 122); leaf, plant, and/or animal color; leaf, plant, and/or animal size; and/or the like may be mapped to particular plant and/or animal species. Such mappings can also be stored in the plant profile data store 127 for use by the image processor 122 identifying plant and/or animal species.

The image processor 122 can retrieve one or more mappings from the plant profile data store 127 for individually processing each orthomosaic image. In particular, the image processor 122 can, for each pixel in each orthomosaic image, use the mappings to identify a plant species (or animal species, other organisms, dirt, water, etc.) that maps to the brightness temperature of the respective pixel.

Optionally, the image processor 122 can, for some or all of the pixels in each orthomosaic image, use the mappings to identify individual plants (or animals, other organisms, dirt, water, etc.). For example, a user, via the user device 102, may view one or more of the orthomosaic images and define one or more transects corresponding to the area of land depicted in the one or more orthomosaic images (e.g., in the habitat or site). The user can identify a number of transects that should be included in the area of land depicted in the one or more orthomosaic images, the shape of each of these transects, and/or a direction of the transects (e.g., if the habitat is along a coastline, the transect may begin at the coastline and the direction of the transect may be a certain distance inland from the coastline). The image processor 122 can then, for some or all of the pixels in each orthomosaic image that falls within a transect, use the mappings to identify a plant species (or animal species, other organisms, dirt, water, etc.) that maps to the brightness temperature of the respective pixel (e.g., to determine that the respective pixel corresponds to a plant species rather than other material). The image processor 122 can then identify the plant (or animal, other organism, dirt, water, etc.) at the respective pixel as a separate, individual plant of the identified plant species (or animal species, other organisms, dirt, water, etc.). Upon identifying individual plants (or animals, other organisms, dirt, water, etc.), the image processor 122 may annotate or label the corresponding pixel(s) (e.g., place a pinpoint at the corresponding pixel) such that the user can identify, within a user interface, individual plants (or animals, other organisms, dirt, water, etc.) and track the individual plants' growth (or lack of growth) over time (e.g., by viewing different orthomosaic images). Because portions of the orthomosaic images correspond to particular geographic coordinates, each individual plant (or animal, other organism, dirt, water, etc.) can be associated with geographic coordinates, a volume of the respective individual plant (or animal, other organism, dirt, water, etc.), a height of the respective individual plant (or animal, other organism, dirt, water, etc.), a width of the respective individual plant (or animal, other organism, dirt, water, etc.), and/or the like. The geographic coordinates, volume, height, width, and/or the like for individual plants (or animals, other organisms, dirt, water, etc.) can be stored in a data store of the plant growth prediction system 120 (e.g., the coverage percentage data store 129). The user interface generator 131 can retrieve this information to, for example, generate user interface data that, when rendered by the user device 102, causes the user device 102 to display the historical growth of one or more individual plants (or animals, other organisms, dirt, water, etc.).

A user, via the user device 102, may have provided the image processor 122 with a list of plant species that are of interest and/or a list of plant species that are not of interest. For example, in the context of habitat restoration, the user device 102 may transmit to the image processor 122 a list identifying one or more native plant species, fill (e.g., open space, dirt areas, and/or other areas that were damaged or regraded and need to be filled in), one or more invasive species (e.g., weeds, non-native animals, and/or other objects blown in from surrounding areas), and/or plant diversity (e.g., the number of different types of plant species that are present in the site) as items to monitor. Optionally, the user device 102 transmits to the image processor 122 a list of species to ignore. Thus, the image processor 122 can then, for each orthomosaic image, use the identified plant species (or animal species, other organisms, dirt, water, etc.) to determine a percentage of the site that is covered by the native species, a percentage of the site that is covered by fill, a percentage of the site that is covered by an invasive species, a count representing the plant diversity in the site, and/or the like. Because each orthomosaic image is associated with a flight that occurred at a particular time, the image processor 122 can associate the determined coverage percentages and/or plant diversity with the time (e.g., day) that the corresponding flight took place. The image processor 122 can store the determined coverage percentages and/or plant diversity in the coverage percentage data store 129 in an entry associated with the associated time and the site.

In further embodiments, the image processor 122 can use deduplication techniques to reduce the likelihood that a plant is double-counted when determining the coverage percentages. For example, the image processor 122 can use the geographic coordinates included within the metadata associated with an image taken during a first flight to establish a location of a plant. As an illustrative example, each pixel in the image may map to a set of geographic coordinates according to the metadata. The image processor 1222 can then map each pixel in the orthomosaic image to a set of geographic coordinates. The image processor 122 may then identify a plant species in a manner as described herein, where the image processor 122 maps a pixel to a plant species. Because the pixel also maps to a set of geographic coordinates, the image processor 122 can map the set of geographic coordinates to the plant species. When processing a new orthomosaic image generated as a result of an additional flight, the image processor 122 repeat the same process to identify a plant species location and determine a geographic coordinate-to-plant species mapping. Thus, by repeating the process, the image processor 122 can avoid double-counting a plant when determining the coverage percentages.

In further embodiments, the image processor 122 can implement techniques to remove objects from a generated orthomosaic image. For example, the image processor 122 may be instructed to ignore certain plant and/or animal species. Using the mappings stored in the plant profile data store 127, the image processor 122 can identify pixels that correspond to a plant or animal species to ignore and, for example, remove any labels, shading, or annotations that indicates a brightness temperature of those pixels.

While the aerial vehicle controller 121 and the image processor 122 are depicted as being located internal to the plant growth prediction system 120, this is not meant to be limiting. For example, the aerial vehicle controller 121 and/or the image processor 122 (or a component that implements at least a portion of the image processor 122 functionality described herein) may be internal to another computing device present at the site where the aerial vehicle 130 is located. Alternatively, the plant growth prediction system 120 (or one or more components of the plant growth prediction system 120) may itself be present at the site where the aerial vehicle 130 is located.

The diagnostic model generator 123 may then retrieve the native species coverage percentages of a site stored in the coverage percentage data store 129. For example, the diagnostic model generator 123 can retrieve the native species coverage percentages once the image processor 122 has determined the values, when a user device 102 transmits a request for a status report of the site (e.g., current plant growth levels and/or predicted future plant growth levels), when the plant growth prediction system 120 has a low CPU usage (e.g., less than 50%), etc. Using the retrieved native species coverage percentages, the diagnostic model generator 123 can generate a diagnostic model. The diagnostic model can be used to predict future native species growth (e.g., represented by a coverage percentage). For example, the diagnostic model generator 123 can perform a linear regression analysis of the native species coverage percentages, a cubic polynomial regression analysis of the native species coverage percentages, and/or the like to generate the diagnostic model.

As an illustrative example, the diagnostic model generator 123 may calculate an average of the native species coverage percentages and an average of the times associated with the native species coverage percentages. The diagnostic model generator 123 may define the linear regression as follows:

$$A = \bar{y} - B\bar{x} \quad (1)$$

where $\bar{y}$ represents an average percentage coverage, $\bar{x}$ represents an average time, and B is defined as follows:

$$B = \frac{S_{xy}}{S_{xx}} \quad (2)$$

where $S_{xx}$ is defined as follows:

$$S_{xx} = \frac{\sum x_t^2}{n} - \bar{x}^2 \quad (3)$$

and where $S_{xy}$ is defined as follows:

$$S_{xy} = \frac{\sum x_t y_t}{n} - \overline{xy} \quad (4)$$

The diagnostic model generator 123 can apply Equations (1) through (4) using the calculated average native species coverage percentages and the calculated average times to generate a linear regression diagnostic model.

The diagnostic model generator 123 can further generate a diagnostic model for fill, an invasive species, and/or plant diversity using the same techniques. The diagnostic model generator 123 can then store the diagnostic models in the model data store 128 in an entry associated with the site.

The diagnostic model(s) may each output a coverage percentage or plant diversity count as a function of time. Thus, the plant growth predictor 124 may then retrieve one or more diagnostic models corresponding to the site from the model data store 128 and use the diagnostic model(s) to predict future coverage percentages and/or a plant diversity count at various times in the future. For example, the plant growth predictor 124 can use the diagnostic model corresponding to a native species to predict a time at which the native species will have a coverage percentage corresponding to a desired coverage percentage (e.g., a coverage percentage that indicates that the habitat restoration is complete). As an illustrative example, the plant growth predictor 124 can identify a time value that corresponds with a value of the desired coverage percentage that falls along a trend line of the native species diagnostic model. Alternatively or in addition, the plant growth predictor 124 can use the native species diagnostic model to determine a predicted coverage percentage at set times in the future (e.g., 1 year from a current date, 5 years from a current date, etc.).

The plant growth predictor 124 can package the coverage percentage and/or plant diversity predictions (along with historical and/or current coverage percentages and/or plant diversity numbers) into a report and transmit the report to a user device 102 (e.g., either the same user device 102 that provided the flight path parameters or a different user device 102). The plant growth predictor 124 can transmit the report at the request of the user device 102.

In addition, the plant growth predictor 124 can modify one or more orthomosaic images to indicate certain information. For example, the plant growth indicator 124 can annotate a most-recent orthomosaic image to indicate areas where a native species is growing and areas in which the native species needs to grow (e.g., in fill areas) to meet a desired coverage percentage. As an illustrative example, the plant growth indicator 124 can retrieve current coverage percentages from the coverage percentage data store 129. The plant growth indicator 124 can then determine a difference between the current native species coverage percentage and a desired native species coverage percentage to identify a diagnostic variance (e.g., represented as a percentage). Thus, the diagnostic variance may represent a percentage of the site that needs to be filled with the native species to meet the desired native species coverage percentage. The plant growth indicator 124 can annotate a portion of the orthomosaic image corresponding to fill areas and/or invasive species that is a percentage of the site equal to the diagnostic variance, thereby indicating that the annotated portion needs to be filled with the native species instead to meet the desired native species coverage percentage. The plant growth indicator 124 can also transmit the modified orthomosaic image(s) to the user device 102.

Figure 5A:
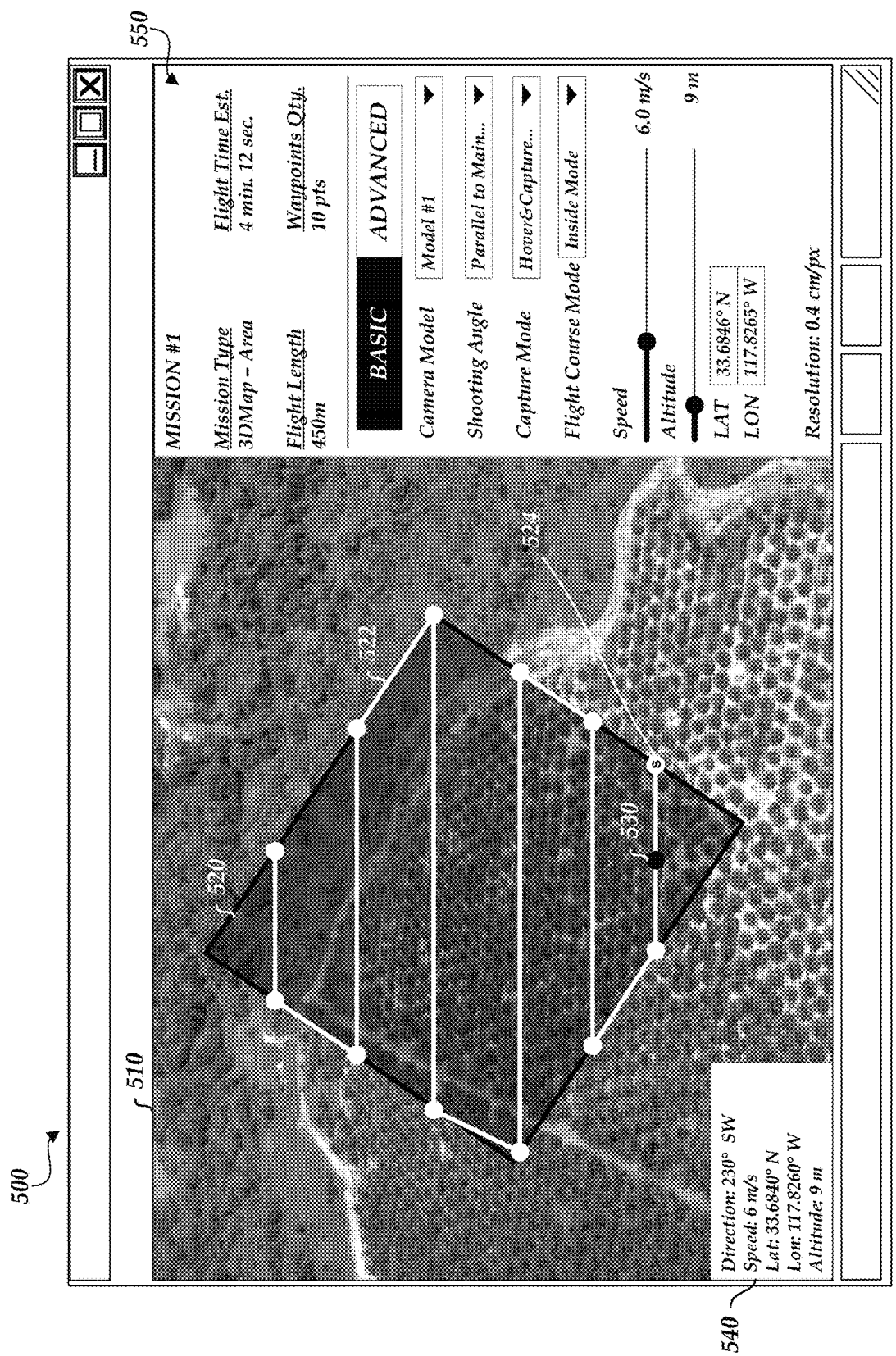
FIG. 5A illustrates a user interface displaying a site and a list of basic flight path parameters.
Figure 5B:
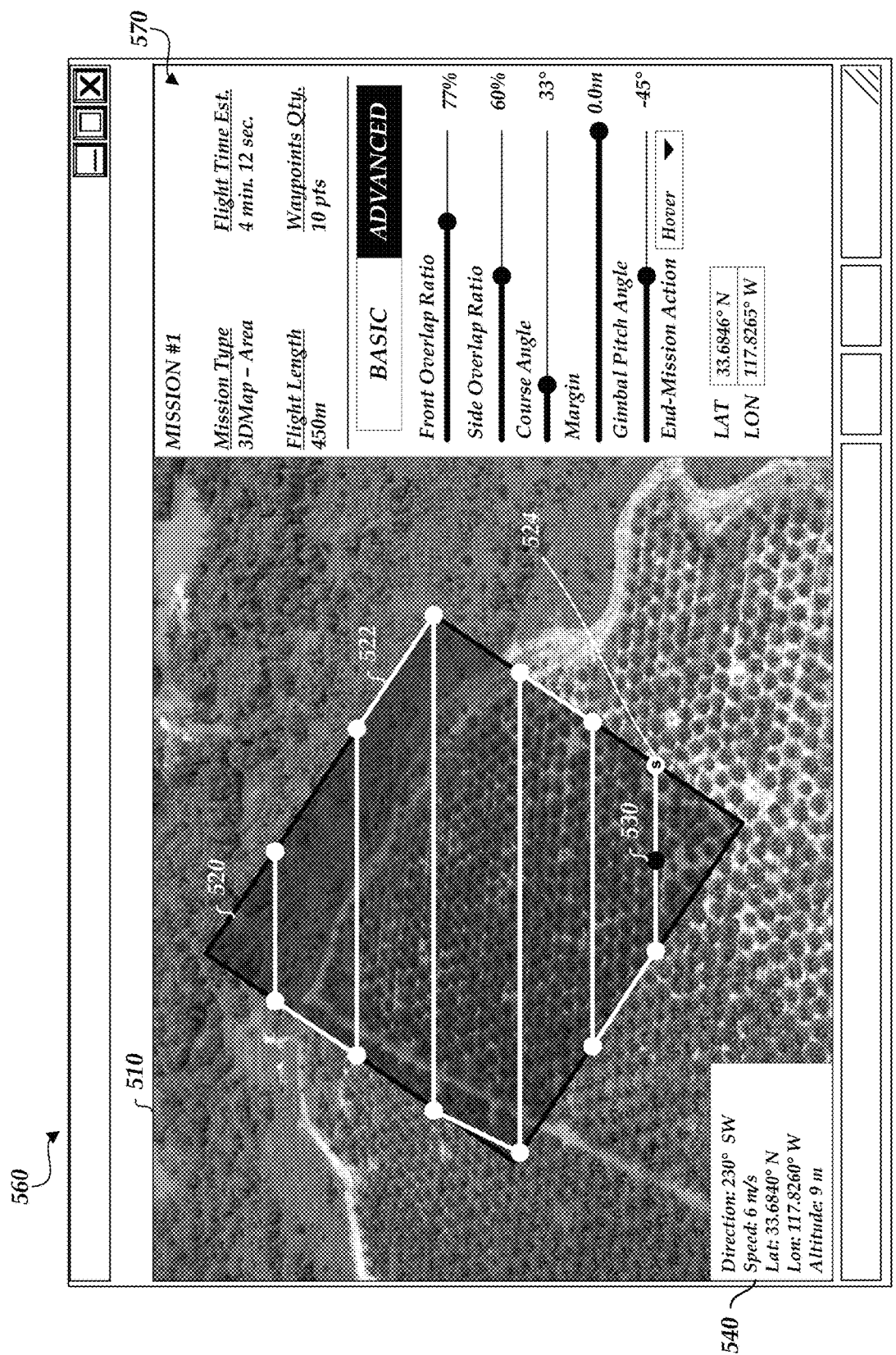
FIG. 5B illustrates a user interface displaying the site and a list of advanced flight path parameters.

The user interface generator 131 can generate user interface data and transmit the user interface data to a user device 102. The user interface data, when rendered by the user device 102, may cause the user device to display a site, navigation controls for controlling the flight of the aerial vehicle 130, and/or other selectable flight path parameters. Example user interfaces that may be displayed by the user device 102 based on the user interface data generated by the user interface generator 131 are depicted in FIGS. 5A-5B.

In further embodiments, the plant growth prediction system 120 may be instructed to determine current levels and/or predict future levels for two or more different types of objects. For example, the plant growth prediction system 120 may be instructed to determine current and/or predict future growth of a first plant species and may be instructed to determine current and/or predict future counts of a first bird species. It may be that the ideal altitude to measure such information may be different for each type of object. Thus, the user device 102 may provide flight path parameters that indicate two different altitudes for the same flight path. Thus, upon receiving instructions from the aerial vehicle controller 121, the aerial vehicle 130 may fly along the flight path at the lower altitude in a first pass and then fly along the flight path at the higher altitude in a second pass, or vice-versa. While the first pass may be for measuring levels for a first object, the image processor 122, the diagnostic model generator 123, and/or the plant growth predictor 124 may nonetheless use images captured at each altitude in order to form the orthomosaic image, generate the diagnostic model(s) and/or generate predictions, respectively.

In further embodiments, the plant growth prediction system 120 can control operation of the water system 160. For example, the water system 160 may be the water system for a municipality, state, or other geographic region. The water system 160 may include one or more pipes 162 that are controlled by one or more valves 164. The image processor 122 can process an orthomosaic images and/or a thermographic image to identify underground and/or above ground leaks originating from one or more of the pipes 162. As described herein, the thermographic image capture light, such as infrared light, invisible to humans. Thus, the thermographic image (and therefore the orthomosaic image) may depict objects present below the surface or other objects that are otherwise invisible to humans. In one example, such objects can include the flow of water below a sidewalk, below the pavement, and/or the like, that result from a leak or water main break. The image processor 122 may identify the flow of water based on comparing the shape and/or color of the pixels present in the thermographic or orthomosaic image with known shapes and/or colors of water (e.g., the shape may be a thin and snake-like, similar to a stream or river, and the color may be within the blue color spectrum or any other color representing the wavelength of light emitted by water). The image processor 122 may further recognize one or more pipes 162 in the thermographic or orthomosaic image (e.g., based on comparing objects in the image to known shapes and/or colors of pipes 162), thereby allowing the image processor 122 to identify the specific pipe 162 from which the water is flowing. Once the image processor 122 identifies the pipe 162 from which the water is flowing, the image processor 122 can generate and transmit a message to a valve 164 corresponding to the identified pipe 162 via the network 110, where receipt of the message causes the valve 164 to shut off the flow of water through the pipe 162. Accordingly, the plant growth prediction system 120 can automatically detect a leak and transmit instructions to cause the flow of water to stop such that the leak can be fixed.

The flight path data store 125 stores flight path parameters for various sites. While the flight path data store 125 is depicted as being located internal to the plant growth prediction system 120, this is not meant to be limiting. For example, not shown, the flight path data store 125 can be located external to the plant growth prediction system 120.

The image data store 126 stores images captured by the aerial vehicle 130 and/or orthomosaic images generated by the image processor 122. The images may be stored in entries associated with a site and a time and/or flight identification identifying when the images were captured. While the image data store 126 is depicted as being located internal to the plant growth prediction system 120, this is not meant to be limiting. For example, not shown, the image data store 126 can be located external to the plant growth prediction system 120.

The plant profile data store 127 stores mappings of plant species to brightness temperatures. The plant profile data store 127 may also store mappings of other organic and inorganic matter, such as animals, organisms other than plants and animals, dirt, water, etc., to brightness temperatures. The plant profile data store 127 may further store emissivity levels for various plant species, animal species, organisms other than plants and animals, dirt, water, etc. such that the emissivity levels could be used by the image processor 122 to adjust the emissivity sensitivity levels of captured thermographic images. While the plant profile data store 127 is depicted as being located internal to the plant growth prediction system 120, this is not meant to be limiting. For example, not shown, the plant profile data store 127 can be located external to the plant growth prediction system 120.

The model data store 128 stores diagnostic models generated by the diagnostic model generator 123. Each diagnostic model may be stored in an entry associated with a site. While the model data store 128 is depicted as being located internal to the plant growth prediction system 120, this is not meant to be limiting. For example, not shown, the model data store 128 can be located external to the plant growth prediction system 120.

The coverage percentage data store 129 stores coverage percentages and/or plant diversity determined by the image processor 122. The coverage percentages may be stored in entries associated with a site and a time. Optionally, the coverage percentage data store 129 may also store plant material data, such as the geographic coordinates, volume, height, width, and/or the like of individual plants. The plant material data may be stored in entries associate with a site and/or time. While the coverage percentage data store 129 is depicted as being located internal to the plant growth prediction system 120, this is not meant to be limiting. For example, not shown, the coverage percentage data store 129 can be located external to the plant growth prediction system 120.

Example Plant Health Determination Use Case

As described herein, the plant growth prediction system 120 may be configured to determine current and/or predict future plant health instead of or in addition to predicting future plant growth. For example, the aerial vehicle controller 121 may receive flight path parameters from the user device 102 via the network 110. Once the aerial vehicle controller 121 determines that the aerial vehicle 130 should conduct a flight at a current time, a project member may bring the aerial vehicle 130 to the site (e.g., based on a reminder provided by the plant growth prediction system 120). The aerial vehicle controller 121 can transmit the flight path parameters to the aerial vehicle 130 over the network 110 and instruct the aerial vehicle 130 (e.g., the flight path controller 138) to begin the flight. The camera(s) 132 and/or a network interface (not shown) of the aerial vehicle 130 may transmit captured images to the image processor 122 in real-time (e.g., as the images are captured) and/or after the flight is complete.

The image processor 122 may implement a process to convert the captured images into plant health images. For example, the image processor 122 can process a captured image pixel by pixel. Each pixel may have an RGB color represented by a red value, a green value, and a blue value. For each pixel, the image processor 122 can identify the green value of the RGB color. The green value of the RGB color may indicate a relative health of a plant and/or whether the pixel depicts a portion of a plant or another object. Based on the magnitude of the green value, the image processor 122 can assign another RGB color to the pixel and convert the pixel from the original RGB color to the newly assigned RGB color. In an embodiment, the assigned RGB color may be a color within a color spectrum between red (e.g., RGB hexadecimal color # FF0000) and green (e.g., RGB hexadecimal color #00FF00), where orange (e.g., RGB hexadecimal color # FFA500) represents a middle color between red and green in the color spectrum. The higher the original green value of the pixel, the closer the newly assigned RGB color will be to green (e.g., RGB hexadecimal color #00FF00) and the farther the newly assigned RGB color will be from red (e.g., RGB hexadecimal color # FF0000). As an illustrative embodiment, if the original RGB color of the pixel is RGB hexadecimal color #340067, then the newly assigned RGB color may be RGB hexadecimal color # FF0000. If the original RGB color of the pixel is RGB hexadecimal color #1EFFB0, then the newly assigned RGB color may be RGB hexadecimal color #00FF00. The image processor 122 can use other similar techniques, such as visible atmospherically resistant index (VARI) or normalized difference vegetation index (NDVI), to convert the pixels of the captured images. Thus, the image processor 122 may normalize the RGB color of each pixel of a captured image to an RGB color within the color spectrum described above. By normalizing the RGB color of each pixel of a captured image, the image processor 122 may produce a converted image that indicates plant health and/or a chemical composition of various plants (e.g., chlorophyll levels of a plant, nitrogen levels of a plant, etc.).

Alternatively, the image processor 122 can transmit the captured images to an external system (not shown) and the external system can process the captured images to convert the pixels using the same or similar process. The external system can then transmit the converted images to the image processor 122.

Figure 6A:
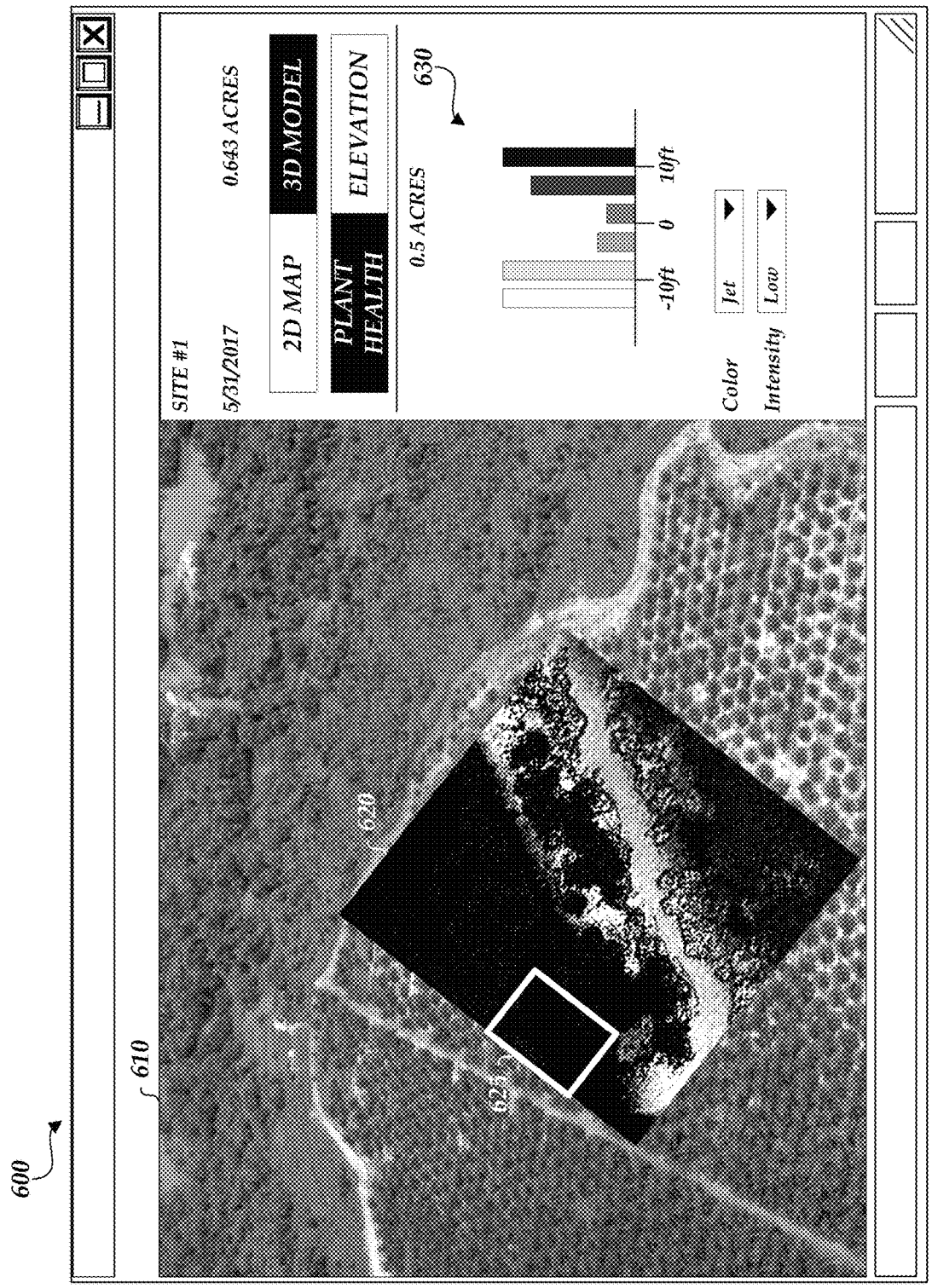
FIG. 6A illustrates a user interface displaying plant health of a site overlaid over a high-resolution image of the site depicted in a window.

The captured images that have pixels converted by the image processor 122 and/or external system may be referred to herein as plant health images. FIG. 6A depicts an example of a plant health image (shown as plant health data 620). The image processor 122 may further process the plant health images. For example, the image processor 122 can identify geographic coordinates corresponding to portions of the plant health image in which it appears that plants are unhealthy. An unhealthy plant may be any plant corresponding to one or more pixels that have a value less than a threshold value (e.g., less than RGB hexadecimal color # ADFF2F, less than RGB hexadecimal color # FFA500, etc.) within the above-described color spectrum. In some embodiments, sprinkler heads 156 of the irrigation system 150 or the irrigation system 150 itself may be located at specific geographic coordinates. Thus, the image processor 122 can transmit a message to a controller 152 of the irrigation system 150 (or an external network-based system, not shown, that manages the irrigation system 150) via the network 110 indicating the geographic coordinates corresponding to unhealthy plants. The controller 152 may manage the activation and deactivation of valves 154 controlling the flow of water to the sprinkler heads 156 and/or may control the activation of the sprinkler heads 156 themselves using a watering schedule. Thus, receipt of the message (either from the image processor 122 or the external network-based system) may cause the controller 152 of the irrigation system 150 to adjust its watering schedule such that the sprinkler heads 156 corresponding to the received geographic coordinates and/or the valves 154 controlling the flow of water to the sprinkler heads 156 corresponding to the received geographic coordinates are activated more frequently, may cause the controller 152 of the irrigation system 150 to automatically activate at least the sprinkler heads 156 corresponding to the received geographic coordinates and/or the valves 154 controlling the flow of water to the sprinkler heads 156 corresponding to the received geographic coordinates such that the sprinkler heads 156 spray water, and/or the like. Accordingly, the processing of the plant health images performed by the image processor 122 may result in an irrigation system 150 watering unhealthy plants more often.

Alternatively or in addition, the image processor 122 may process the plant health images to identify the height, width, volume, area, and/or canopy percentages of plants. For example, the image processor 122 can use object recognition techniques to identify individual plants (e.g., the image processor 122 can identify individual plants by identifying pixels that have a similar color, such as colors that are within a threshold value of each other). Once a plant is identified, the image processor 122 determines a width, volume, and/or area of the plant (e.g., based on the scale of the plant health image). For example, the image processor 122 can identify a boundary of the plant based on the pixel colors (e.g., a difference in pixel colors above a threshold value indicates a boundary of the plant) to determine the width, volume, and/or area of the plant. The image processor 122 can further determine a canopy percentage of the plant by measuring the area of the plant as a percentage of the total area of the site.

In addition, as the aerial vehicle 130 captures images, the aerial vehicle 130 may track an altitude of the aerial vehicle 130 (e.g., relative to the ground) and use a RADAR detector or other similar device to identify a distance between the aerial vehicle 130 and an object (e.g., a plant, the ground, water, etc.) below the aerial vehicle 130. At each location, the aerial vehicle 130 can subtract the identified distance from the tracked altitude to identify a height of an object below the aerial vehicle 130. Alternatively, the aerial vehicle 130 can transmit the tracked altitude and the identified distance to the image processor 122 and the image processor 122 can subtract the identified distance from the tracked altitude to identify a height of an object below the aerial vehicle 130 at various locations. In this way, the aerial vehicle 130 and/or image processor 122 can determine a height or heights (e.g., branches and leaves may be at different heights) of plants.

The image processor 122 can compare the determined height, width, volume, area, and/or canopy percentage of a plant or a group of plants within a geographic area to threshold heights, widths, volumes, areas, and/or canopy percentages to adjust lighting and/or lighting schedules, to adjust watering and/or watering schedules, and/or to identify when plants need to be pruned. For example, the image processor 122 can compare the height, width, volume, area, and/or canopy percentage of one plant (or one group of plants) against a threshold height, width, volume, area, and/or canopy percentage. If one or more of the height, width, volume, area, and/or canopy percentage values is greater than one or more of the threshold height, width, volume, area, and/or canopy percentage values by a threshold value or percentage, then this may indicate that the area beneath this plant (or group of plants) is generally dark. Thus, the image processor 122 can transmit a message to a lighting system (or an external network-based system, not shown, that manages the lighting system) via the network 110 indicating the geographic coordinates of this plant (or group of plants). Receipt of the message (either from the image processor 122 or the external network-based system) may cause the lighting system to adjust its schedule such that lights corresponding to the received geographic coordinates are activated earlier in the day and/or for a longer period of time, may cause the lighting system to automatically activate at least the lights corresponding to the received geographic coordinates, and/or the like. The image processor 122 may also generate a notification for transmission to a user device 102 via the network 110 (e.g., a push notification) indicating that the plant (or group of plants) need to be pruned.

Conversely, if one or more of the height, width, volume, area, and/or canopy percentage values is less than one or more of the threshold height, width, volume, area, and/or canopy percentage values by a threshold value or percentage, then this may indicate that the area beneath this plant (or group of plants) is generally light and the image processor 122 can transmit no message or a message to the lighting system (or the external network-based system) to perform the opposite operation (e.g., turn on the lights later and/or for a shorter period of time, automatically turn off the lights, etc.). Thus, the processing performed by the image processor 122 can be used to conserve energy via the efficient use of lighting. The image processor 122 may also generate a notification for transmission to a user device 102 via the network 110 (e.g., a push notification) indicating that the plant (or group of plants) do not need to be pruned, the plant (or group of plants) should be pruned later than scheduled, and/or additional plants should be planted in the corresponding geographic area. In addition, as described above, the image processor 122 can generate and transmit a message to cause the irrigation system 150 to water the plant (or group of plants) automatically and/or more frequently.

Figure 8A:
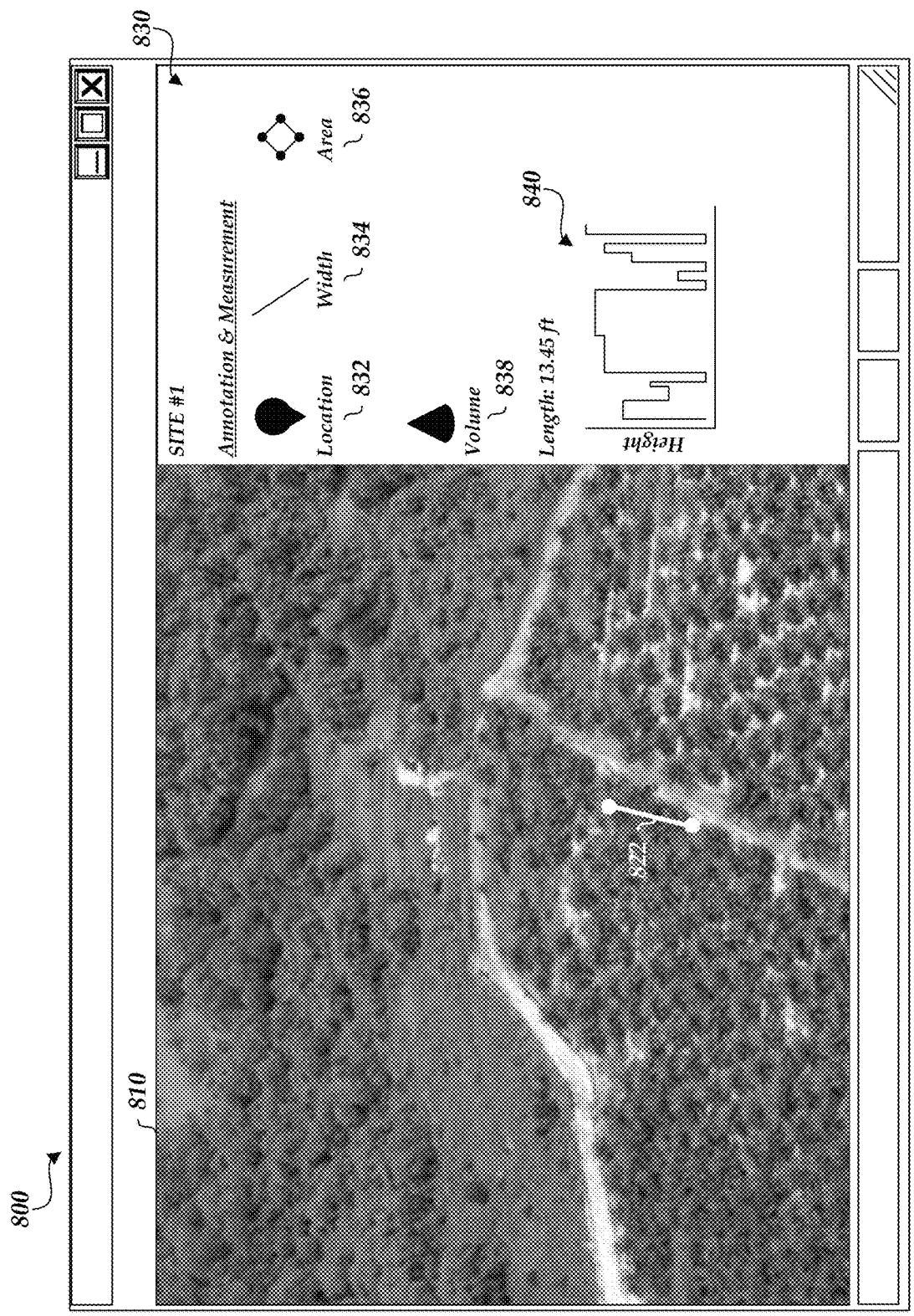
FIGS. 8A-8B illustrate a user interface 800 displaying tools for analyzing plants at a site depicted in a window 810.
Figure 8B:
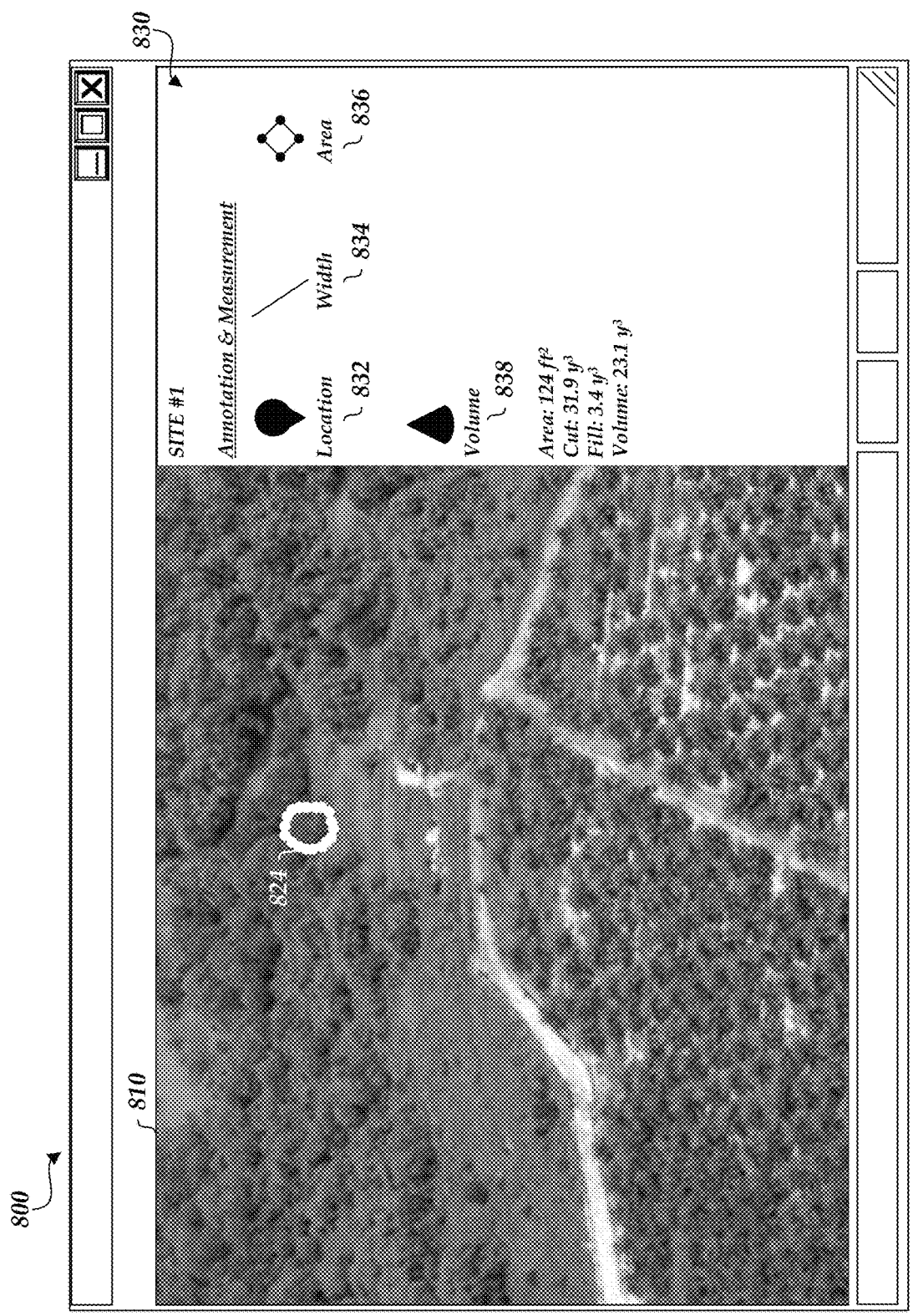

In some cases, the user interface generator 131 can generate user interface data that, when rendered by the user device 102, causes the user device 102 to display a user interface providing information on plant height, width, volume, area, and/or canopy percentage and/or tools for allowing a user to manually measure such information. For example, the user interface generator 131 may receive the captured images and/or the plant health images from the image processor 122 for display. Example user interfaces are depicted in FIGS. 8A-8B and are described in greater detail below.

Furthermore, the plant growth prediction system 120 can use similar techniques as described above with respect to predicting plant growth to predict plant health. For example, the diagnostic model generator 123 may receive, for a specific plant, the health of the plant (e.g., as represented by RGB hexadecimal colors) determined over a period of time via various images captured over a period of time. Using the plant health information, the diagnostic model generator 123 can generate a diagnostic model. The diagnostic model can be used to predict future plant health for that plant (e.g., represented by an RGB hexadecimal color). For example, the diagnostic model generator 123 can perform a linear regression analysis of the plant health, a cubic polynomial regression analysis of the plant health, and/or the like to generate the diagnostic model. The diagnostic model generator 123 may generate a different diagnostic model for each plant or for different sets of plants (e.g., plants that are within proximity of each other). The diagnostic model generator 123 can store the diagnostic models in the model data store 128.

The diagnostic models may output a plant health value as a function of time. Thus, the plant growth predictor 124 may then retrieve a diagnostic model for each plant at a site from the model data store 128 and use the diagnostic models to predict future plant health for one or more plants at various times in the future. The plant growth predictor 124 can package the predicted future plant health values into a report and/or provide the predicted future plant health values to the user interface generator 131 such that the user interface generator 131 can generate user interface data that, when rendered by the user device 102, causes the user device 102 to display the predicted future plant health values. As described above, the plant growth predictor 124 can also modify one or more captured images to indicate the predicted future plant health values. The plant growth indicator 124 can transmit the modified captured image(s) to the user device 102.

As described above, the image processor 122 can stitch the images received from the aerial vehicle 130 together to form a single stitched image. The image processor 122 can stitch the images before or after the images are converted into plant health images.

Example Block Diagrams for Determining and Predicting Plant Growth

Figure 2:
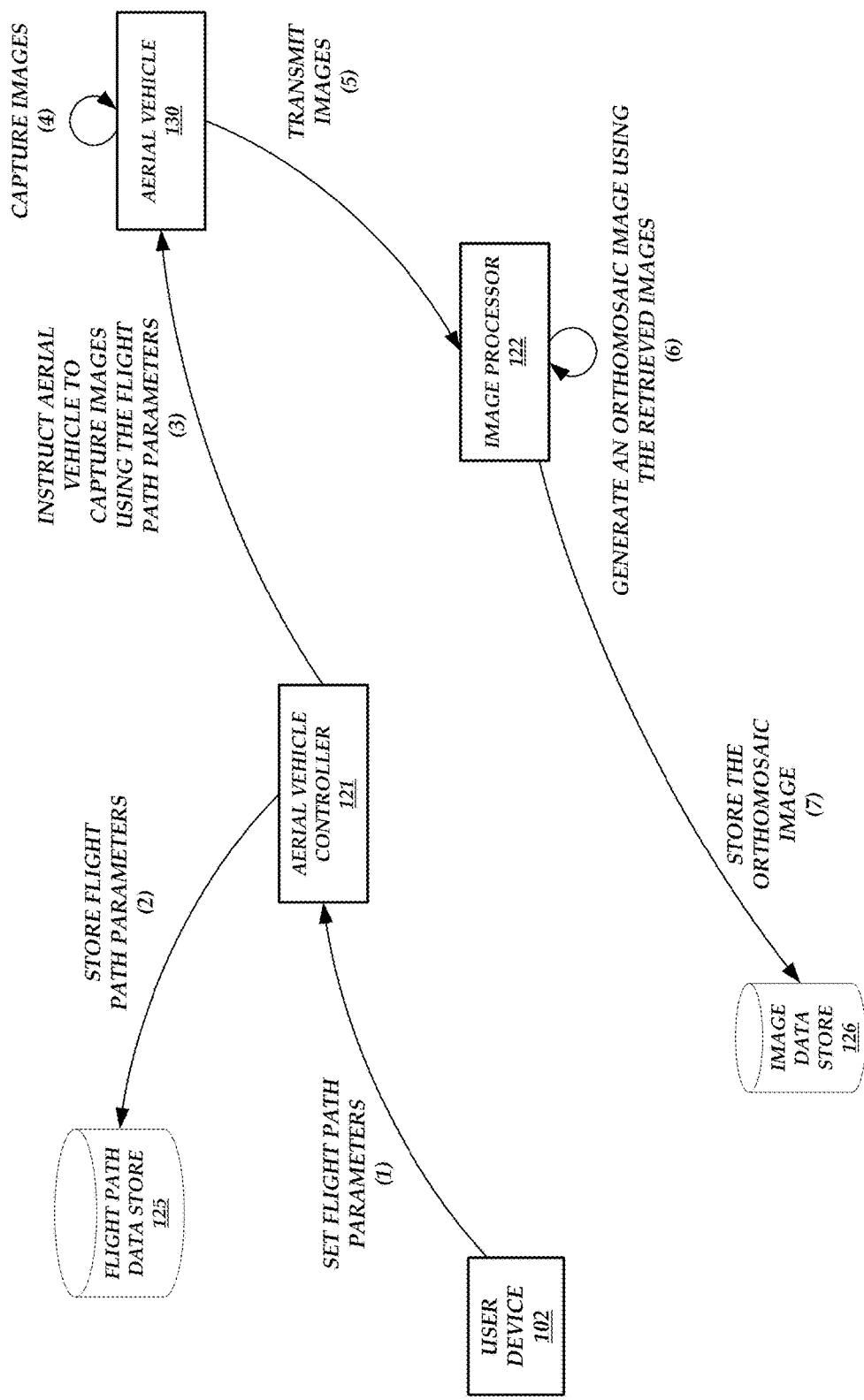
FIG. 2 is a flow diagram illustrating the operations performed by the components of the operating environment of FIG. 1 to generate an orthomosaic image for an initial flight, according to one embodiment.

FIG. 2 is a flow diagram illustrating the operations performed by the components of the operating environment 100 of FIG. 1 to generate an orthomosaic image for an initial flight, according to one embodiment. As illustrated in FIG. 2, the user device 102, based on input from a user, sets flight path parameters and transmits the flight path parameters to the aerial vehicle controller 121 at (1). The aerial vehicle controller 121 may then store the flight path parameters in the flight path data store 125 at (2). Before, during, or after storing the flight path parameters, the aerial vehicle controller 121 can instruct the aerial vehicle 130 at (3) to capture images using the flight path parameters.

In response to receiving the instruction to capture images, the aerial vehicle 130 can begin a flight and capture images at (4). As images are captured and/or after the flight is complete, the aerial vehicle 130 can transmit the captured images to the image processor 122 at (5).

The image processor 122 can generate an orthomosaic image using the retrieved images at (6). For example, the retrieved images may be both thermographic images and high-resolution images. The image processor 122 can stitch the thermographic images together and can stitch the high-resolution images together. The image processor 122 can then combine the stitched images to form an orthomosaic image in which the image is geometrically corrected with a uniform scale. The image processor 122 can then store the orthomosaic image in the image data store 126 at (7).

Figure 3A:
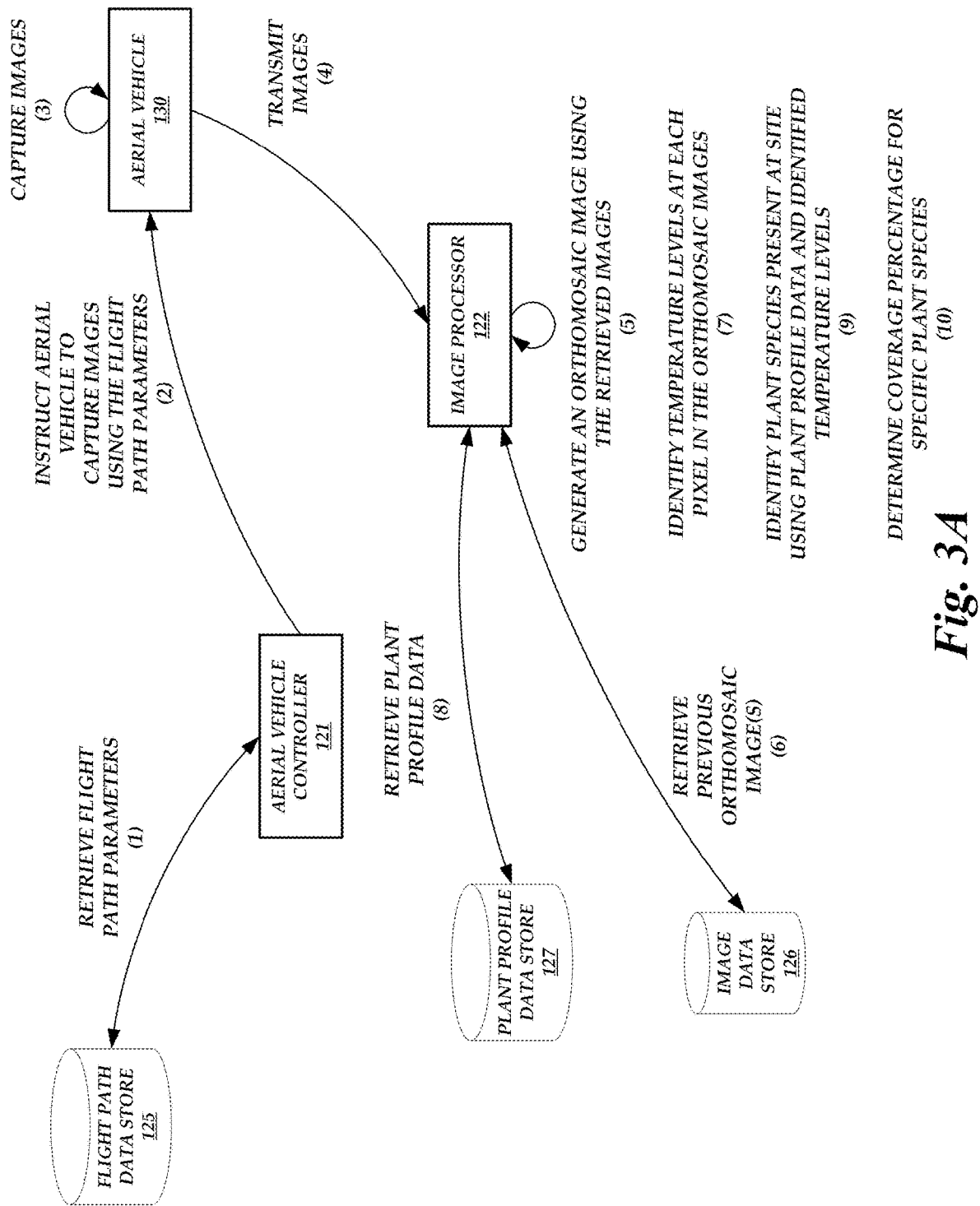
FIGS. 3A-3B are flow diagrams illustrating the operations performed by the components of the operating environment of FIG. 1 to predict plant growth after a flight that follows the initial flight, according to one embodiment.
Figure 3B:
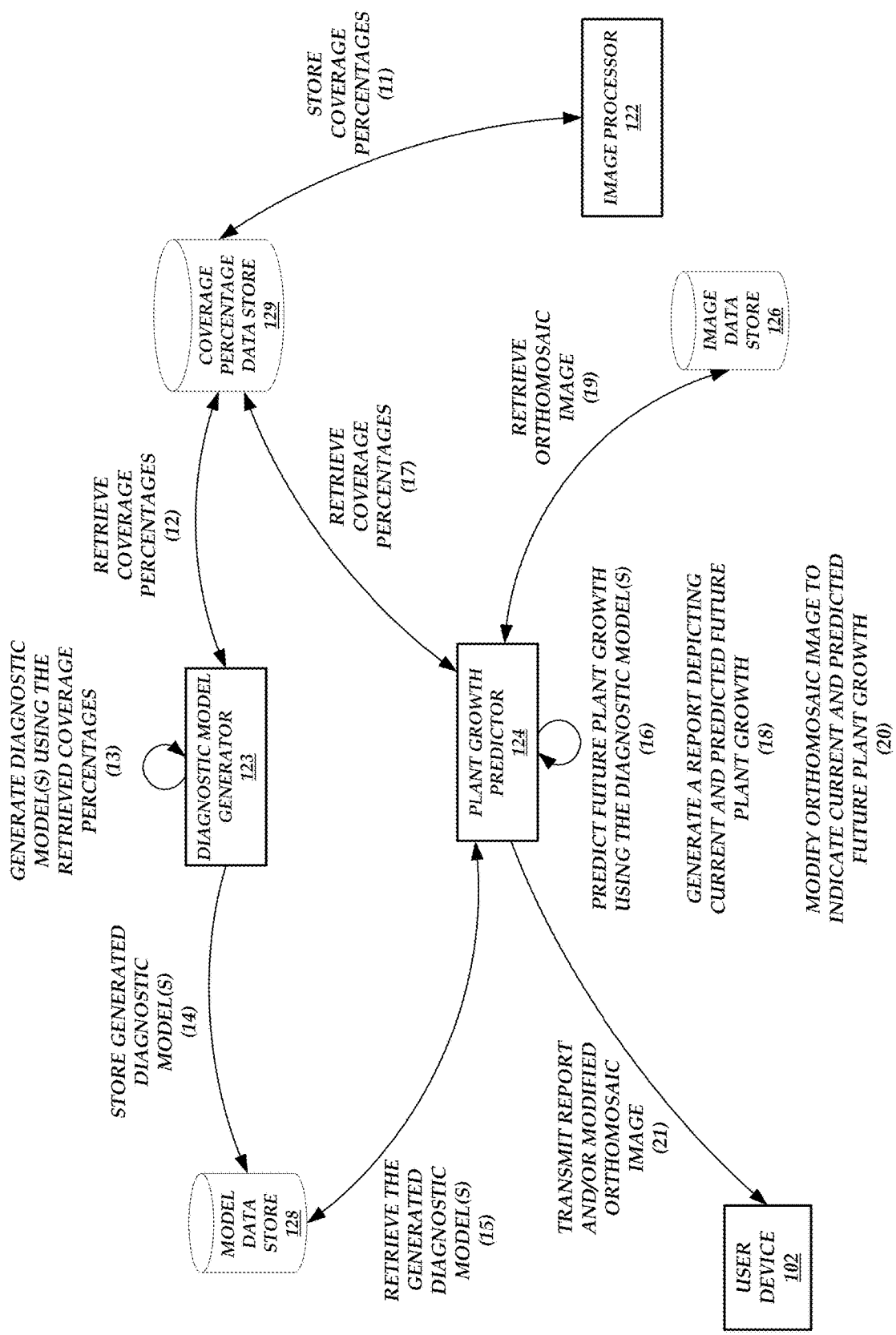

FIGS. 3A-3B are flow diagrams illustrating the operations performed by the components of the operating environment 100 of FIG. 1 to predict plant growth after a flight that follows the initial flight, according to one embodiment. As illustrated in FIG. 3A, the aerial vehicle controller 121 can retrieve flight path parameters from the flight path data store 125 at (1). For example, because this is a flight after the initial flight, the user device 102 may have already provided flight set parameters. The aerial vehicle controller 121 can then query the flight path data store 125 using an identification of the site to retrieve the appropriate flight path parameters. The aerial vehicle controller 121 may retrieve the flight path parameters at a time previously indicated by the user device 102 (e.g., the user device 102 may provide a set of times for using the aerial vehicle 130 to capture images and/or an indication when an event corresponding to a flight has commenced, such as when a site has been impacted). The aerial vehicle controller 121 may then instruct the aerial vehicle 130 at (2) to capture images using the flight path parameters.

In response to receiving the instruction to capture images, the aerial vehicle 130 can begin a flight and capture images at (3). As images are captured and/or after the flight is complete, the aerial vehicle 130 can transmit the captured images to the image processor 122 at (4).

The image processor 122 can generate an orthomosaic image using the retrieved images at (5). For example, the retrieved images may be both thermographic images and high-resolution images. The image processor 122 can stitch the thermographic images together and can stitch the high-resolution images together. The image processor 122 can then combine the stitched images to form an orthomosaic image in which the image is geometrically corrected with a uniform scale.

The image processor 122 can then retrieve previous orthomosaic images from the image data store 126 at (6). In each orthomosaic image, the image processor 122 can identify at (7) the brightness temperature levels of each pixel.

Before, during, or after identifying the brightness temperature levels, the image processor 122 can retrieve plant profile data from the plant profile data store 127 at (8). For example, the plant profile data may include mappings of plant species to brightness temperatures. Using the plant profile data, the image processor 122 can identify plant species corresponding to each pixel in each orthomosaic image and, therefore, the plant species that are present at the site at (9).

At a previous time, the user device 102 may provide the image processor 122 with a list of specific plant species to examine, such as an identification of native species, fill, and/or invasive species. The image processor 122 can use this information along with the identified plant species to determine at (10), in each orthomosaic image, a native species coverage percentage, a fill coverage percentage, and/or an invasive species coverage percentage. In addition, the image processor 122 can use the identified plant species information to determine, in each orthomosaic image, plant diversity at the site.

As illustrated in FIG. 3B, the image processor 122 stores the coverage percentages in the coverage percentage data store 129 at (11). At a later time, such as when the user device 102 requests a report, the diagnostic model generator 123 can retrieve the coverage percentages at (12). The diagnostic model generator 123 can use the coverage percentages to generate one or more diagnostic models at (13). For example, the diagnostic model generator 123 may generate a native species diagnostic model, a fill diagnostic model, an invasive species diagnostic model, and/or a plant diversity diagnostic model. The diagnostic model generator 123 can store the generated diagnostic model(s) in the model data store 128 at (14).

The plant growth predictor 124 can retrieve the generated diagnostic model(s) at (15) and use the diagnostic model(s) to predict future plant growth at the site at (16). For example, the plant growth predictor 124 can predict a time when a desired native species coverage percentage will be achieved. The plant growth predictor 124 can retrieve coverage percentages from the coverage percentage data store 129 at (17) and generate a report depicting the current and predicted future plant growth at (18) (e.g., where the current and predicted future plant growth is represented as a coverage percentage).

In further embodiments, the plant growth prediction system 120 can instruct other devices to perform actions in response to the results of the report. As an illustrative example, if the report generated for a current time period indicates that the current plant growth is 0%, whereas a previously generated report predicted that the plant growth during the current time period would be 10%, then the plant growth prediction system 120 can instruct a sprinkler system (e.g., the irrigation system 150) to modify a watering schedule such that the sprinklers (e.g., the sprinkler heads 156) in the sprinkler system water the site more often, instruct a vehicle or other like apparatus to release additional fertilizer in the site, transmit a notification to another device (e.g., the user device 102) instructing a user to add more water and/or fertilizer to the site or to otherwise adjust a plant growth plan, and/or the like.

In addition, the plant growth predictor 124 can retrieve an orthomosaic image from the image data store 126 at (19). For example, the plant growth predictor 124 may retrieve the latest orthomosaic image. The plant growth predictor 124 can then modify the orthomosaic image at (20) to indicate current and predicted future plant growth. For example, the orthomosaic image can be shaded with colors to differentiate between current and predicted future plant growth. The plant growth predictor 124 may then transmit the report and/or modified orthomosaic image to the user device 102 at (21).

Example Plant Growth Prediction Routine

Figure 4:
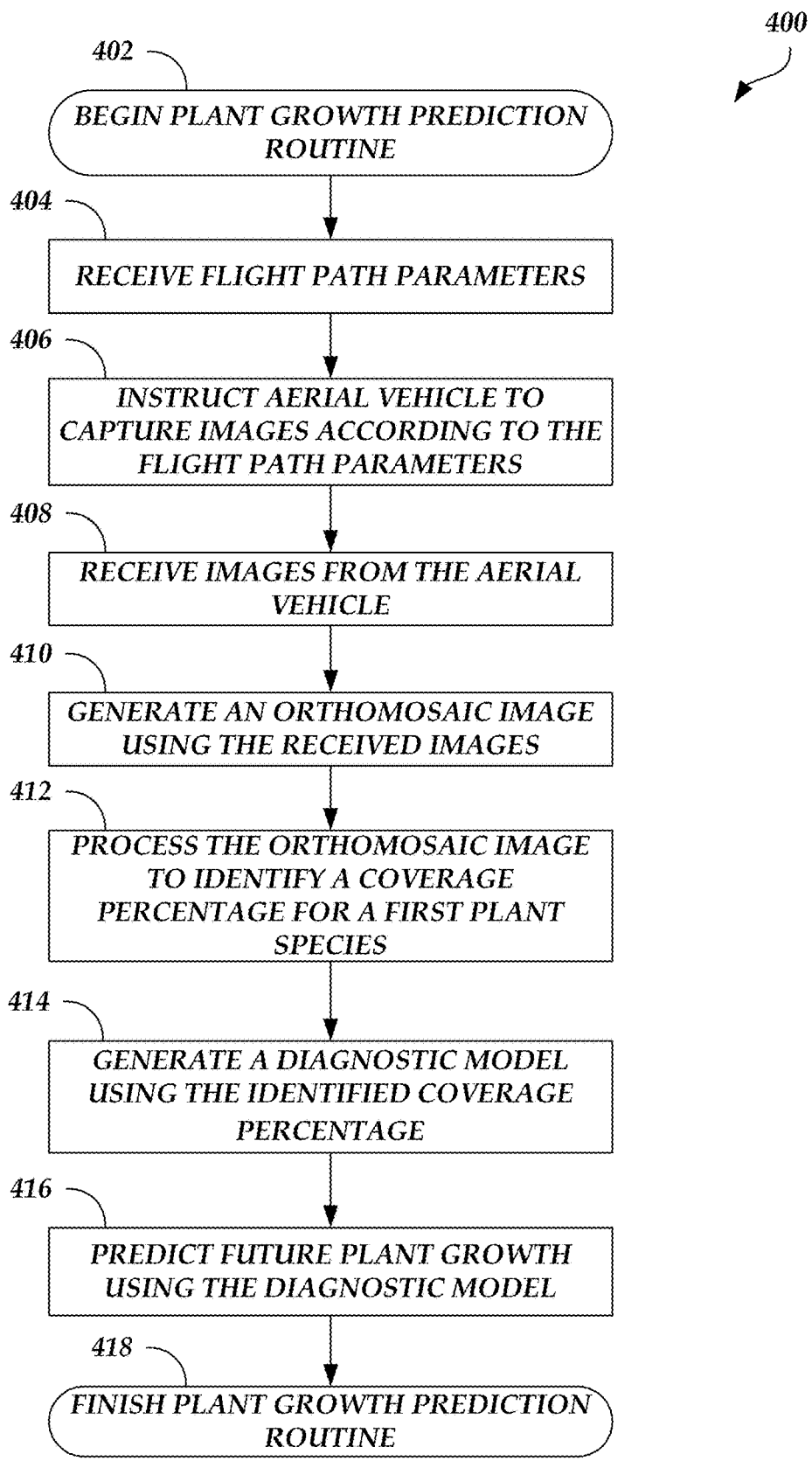
FIG. 4 is a flow diagram depicting a plant growth prediction routine illustratively implemented by a plant growth prediction system, according to one embodiment.

FIG. 4 is a flow diagram depicting a plant growth prediction routine 400 illustratively implemented by a plant growth prediction system, according to one embodiment. As an example, the plant growth prediction system 120 of FIG. 1 can be configured to execute the plant growth prediction routine 400. The plant growth prediction routine 400 begins at block 402.

At block 404, flight path parameters are received. For example, the flight path parameters can include a flight path, a shooting angle, a capture mode, a gimbal pitch angle, an end-mission action, and/or the like. The flight path parameters can be received from a user device 102 or the flight path data store 125.

At block 406, an aerial vehicle is instructed to captures images according to the flight path parameters. For example, the aerial vehicle may capture images using a thermal camera and a high-resolution camera.

At block 408, images are received from the aerial vehicle. For example, the images may be received in real-time and/or after the flight is complete.

At block 410, an orthomosaic image is generated using the received images. For example, the images captured by the thermal camera may be combined and the images captured by the high-resolution camera may be combined. The combined images may then be merged to form the orthomosaic image.

At block 412, the orthomosaic image is processed to identify a coverage percentage for a first plant species. For example the first plant species may be a native species of the site.

At block 414, a diagnostic model is generated using the identified coverage percentage. For example, the identified coverage percentage and one or more historical coverage percentages may be used to generate the diagnostic model.

At block 416, future plant growth is predicted using the diagnostic model. For example, a time when the plant growth reaches a desired coverage percentage may be predicted. After the future plant growth is predicted, the plant growth prediction routine 400 is complete, as shown at block 418.

Example User Interfaces

FIG. 5A illustrates a user interface 500 displaying a site 520 and a list 550 of basic flight path parameters. The user interface 500 may be displayed by a user device 102 based on a rendering of user interface data generated and provided by the plant growth prediction system 120 (e.g., the user interface generator 131).

As illustrated in FIG. 5A, the user interface 500 displays a window 510 that includes an image depicting the site 520. The depiction of the site 520 is modified with a flight path 522 of the aerial vehicle 130 that overlays the image of the site 520. As described herein, a user can generate the flight path 522 by, for example, dragging a cursor or touch input across the user interface 500. Alternatively or in addition, the user can enter in the user interface 500 a set of geographic coordinates and an order in which the geographic coordinates are to be reached, thereby forming the flight path 522. Each time a direction of the flight path 522 changes, a waypoint (e.g., represented by white circles) may be depicted in the flight path 522 at the point of the direction change. In addition, a starting position 524 of the flight path 522 may be indicated in the window 510 as well as a current location 530 of the aerial vehicle 130 if the aerial vehicle 130 is already in flight.

The window 510 may further include a box 540 indicating current parameters of the aerial vehicle 130. For example, the box 540 may include the direction, speed, latitude, longitude, and/or altitude of the aerial vehicle 130.

The list 550 of basic flight path parameters may include a mission type (e.g., 3DMap, 2DMap, etc.), an estimated flight time, a flight length (e.g., a length of the flight path 522), a number of waypoints in the flight path 522, a camera model, a shooting angle, a capture mode, a flight course mode, a aerial vehicle 130 speed, an aerial vehicle 130 altitude, geographic coordinates of a starting point (e.g., latitude and longitude), and/or a resolution of the camera.

There may be several types of shooting angles. For example, the parallel to main path shooting angle may cause a camera 132 to be positioned such that a lens of the camera 132 faces directly down (e.g., 90 degrees straight down) and is parallel with the ground and the vertical to main path shooting angle may cause a camera 132 to be positioned such that a lens of the camera 132 faces directly ahead or to the side of the aerial vehicle 130 and is perpendicular with the ground. In addition, the shooting angle may be selected to be an angle between parallel to main path and vertical to main path.

There may also be several types of capture modes. For example, the hover and capture at point capture mode results in a camera 132 capturing an image at each waypoint, the capture at equal time intervals capture mode results in a camera 132 capturing an image in set time intervals, and the capture at equal distance intervals results in a camera 132 capturing an image every threshold distance.

FIG. 5B illustrates a user interface 560 displaying the site 520 and a list 570 of advanced flight path parameters. The user interface 560 may be displayed by a user device 102 based on a rendering of user interface data generated and provided by the plant growth prediction system 120 (e.g., the user interface generator 131).

As illustrated in FIG. 5B, the list 570 of advanced flight path parameters can include some basic flight parameters (e.g., mission type, an estimated flight time, a flight length, a number of waypoints in the flight path 522, and geographic coordinates of a starting point), front overlap ratio, side overlap ratio, course angle, margin, gimbal pitch angle, and end-mission action.

If the user updates any of the basic or advanced flight path parameters in the user interfaces 500 or 560, this may cause the user device 102 to notify the aerial flight controller 121 of the update. The aerial flight controller 121 may then transmit an instruction to the flight path controller 138 to update the flight path according to the updated flight path parameter(s). Thus, the user may be able to update the flight path of the aerial vehicle 130 in real-time as the aerial vehicle 130 is in flight.

In further embodiments, not shown, the user interfaces 500 and/or 560 can display images captured by the aerial vehicle 130 as those images are captured. The images may be received by the user device 102 from the image processor 122.

FIG. 6A illustrates a user interface 600 displaying plant health data 620 of a site overlaid over a high-resolution image of the site depicted in a window 610. Thus, the combined images depicted in the window 610 may be an orthomosaic image. The user interface 600 may be displayed by a user device 102 based on a rendering of user interface data generated and provided by the plant growth prediction system 120 (e.g., the plant growth predictor 124). As an example, the plant growth prediction system 120 may be configured to determine current and/or predict future plant health for the purposes of the embodiment disclosed in FIG. 6A. The plant growth prediction system 120 may be configured to determine current and/or predict future plant health instead of or in addition to predicting future plant growth. The depicted plant health data 620 may be current plant health determined by the plant growth prediction system 120 and/or future plant health predicted by the plant growth prediction system 120.

As described herein, the plant growth predictor 124 can transmit a report and/or a modified orthomosaic image to the user device 102 to show current levels and/or predicted future levels. In further embodiments, the modified orthomosaic image can be appended with additional information that can be displayed in a user interface, such as the user interface 600. For example, as illustrated in FIG. 6A, the modified orthomosaic image can be appended with information identifying a size of the site (e.g., 0.643 acres), a date, a histogram 630, and options to modify the format in which the modified orthomosaic image is displayed (e.g., color options can be changed to jet, black and white, grayscale, etc.; intensity options can be changed to low, medium, high, etc.). The histogram 630 may show a quantity or percentage of plants in the site that have a particular health. Each health level may correspond to a shaded color (e.g., an RGB value, a grayscale value, etc.). The health levels can be absolute values or normalized (e.g., on a scale from −1 to 1, where −1 is the unhealthiest level and 1 is the healthiest level).

The orthomosaic image may be modified with box 625. Box 625 may be added to the orthomosaic image by the plant growth predictor 124 to indicate that if the plants in the portion of the site within box 625 become healthier (e.g., to a certain plant health level), then the desired coverage percentage will be reached.

Figure 6B:
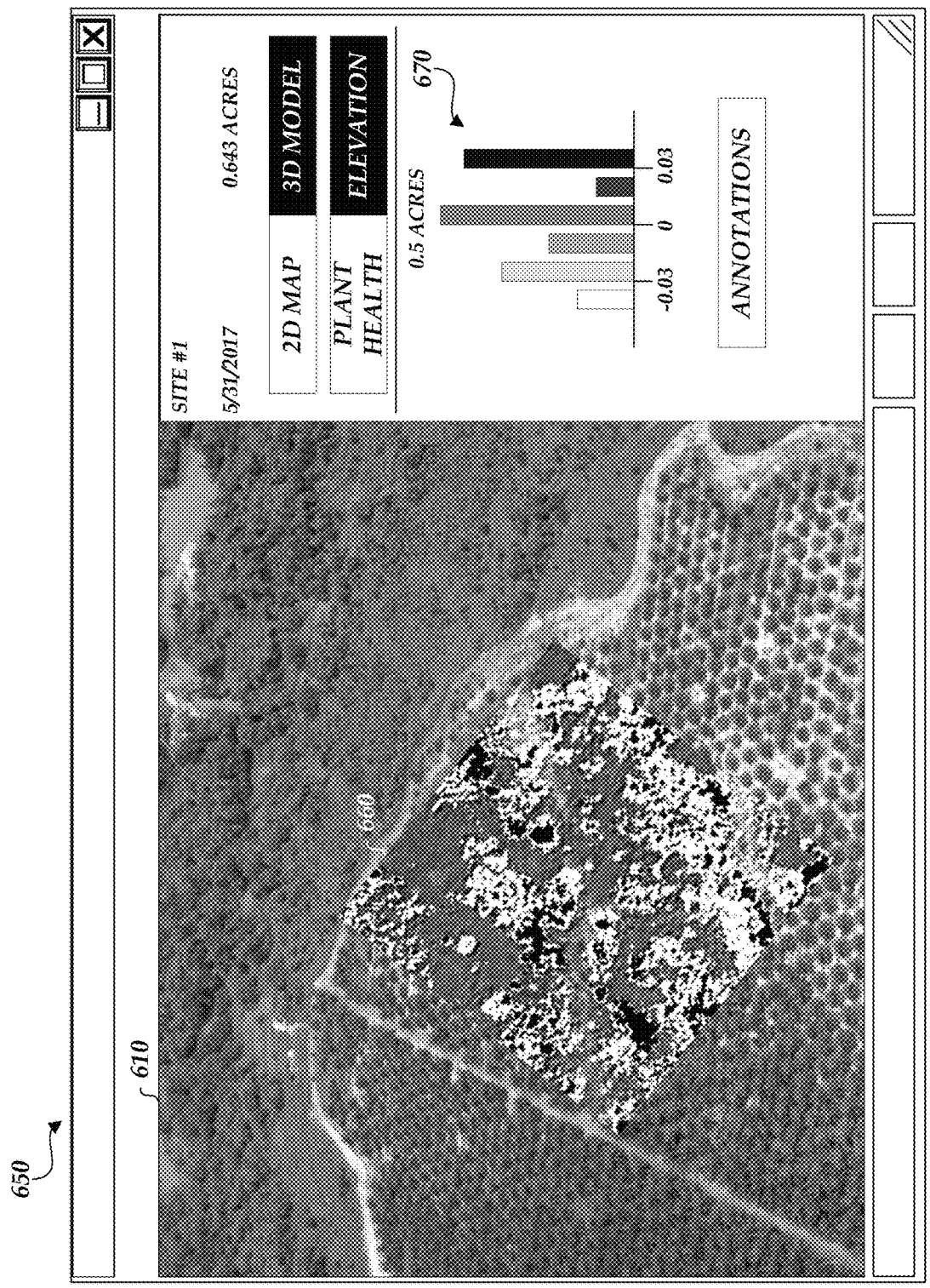
FIG. 6B illustrates a user interface displaying elevation of a site overlaid over a high-resolution image of the site depicted in the window.

FIG. 6B illustrates a user interface 650 displaying elevation 660 of a site overlaid over a high-resolution image of the site depicted in the window 610. Thus, the combined images depicted in the window 610 may also be an orthomosaic image. The user interface 650 may be displayed by a user device 102 based on a rendering of user interface data generated and provided by the plant growth prediction system 120 (e.g., the plant growth predictor 124). As an example, the plant growth prediction system 120 may be configured to determine current and/or predict future soil elevations (e.g., in light of possible erosion) for the purposes of the embodiment disclosed in FIG. 6B. The depicted elevation 620 may be current elevation determined by the plant growth prediction system 120 and/or future elevation predicted by the plant growth prediction system 120.

As illustrated in FIG. 6B, the orthomosaic image is appended with a size of the site (e.g., 0.643 acres), a date, a histogram 670, and options to annotate the orthomosaic image. The histogram 670 may show a quantity or percentage of terrain in the site that has a particular elevation. Each elevation level may correspond to a shaded color (e.g., an RGB value, a grayscale value, etc.).

Figure 7:
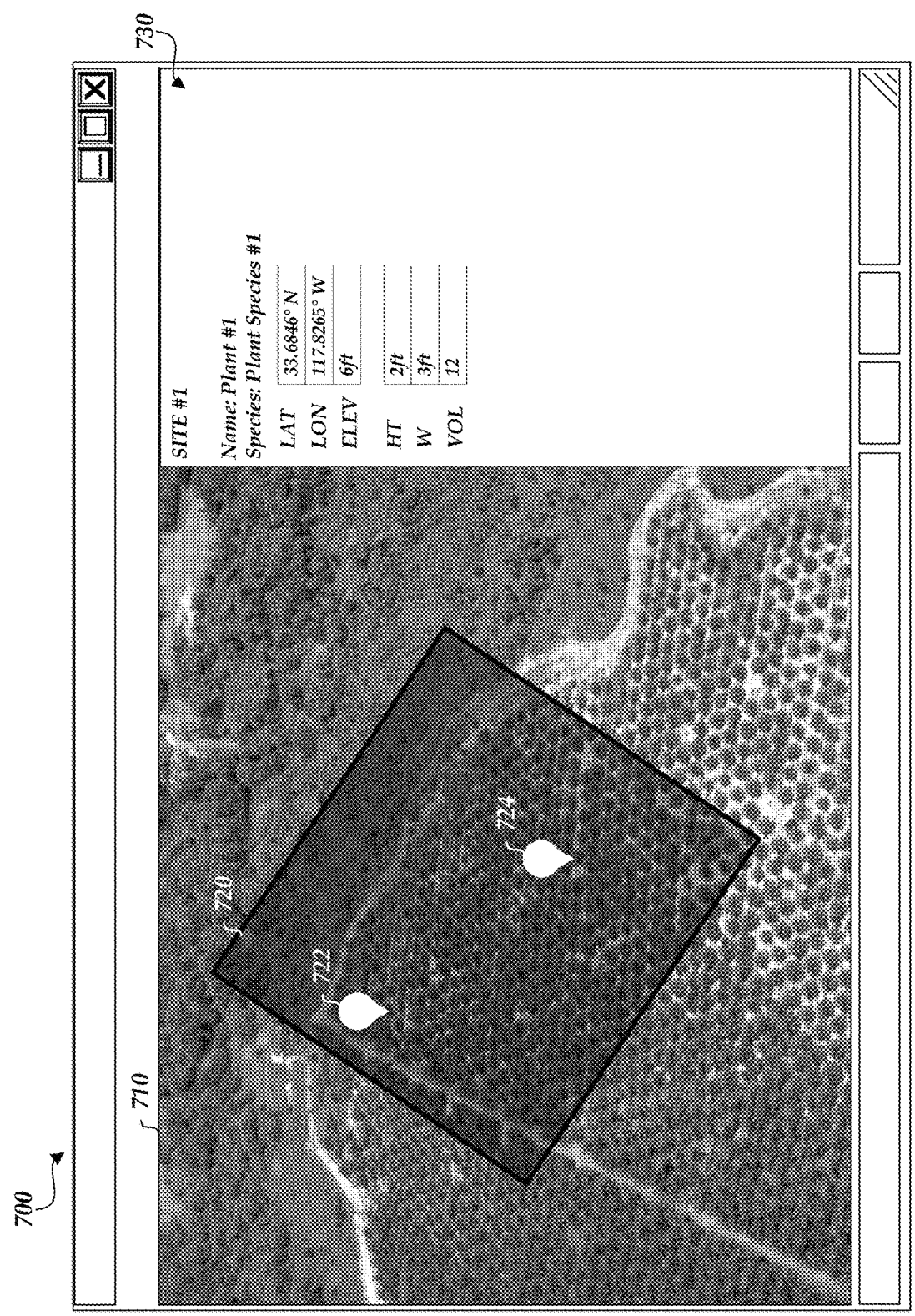
FIG. 7 illustrates a user interface 700 displaying individually identified plants in a site overlaid over a high-resolution image of the site depicted in a window.

FIG. 7 illustrates a user interface 700 displaying individually identified plants in a site overlaid over a high-resolution image of the site depicted in a window 710. The user interface 700 may be displayed by a user device 102 based on a rendering of user interface data generated and provided by the plant growth prediction system 120 (e.g., the user interface generator 131).

As illustrated in FIG. 7, the window 710 includes a transect 720 that may have been selected by a user. Within the transect 720, two individual plants are labeled: plant 722 and plant 724. The plants 722 and 724 may be labeled by the image processor 122 after the image processor 122 compares individual pixels of the high-resolution image to mappings between brightness temperature and plant species. The labeled plants 722 and 724 may be selectable.

In window 730, the user interface 700 may display information for a selected plant. For example, the window 730 may display a name of the selected plant, a species of the plant, geographic coordinates of the selected plant, an elevation at which the selected plant is situated, a height of the selected plant, a width of the selected plant, and/or a volume of the selected plant. The user may have the option, not shown, of viewing high-resolution images of the transect 720 taken at different times to view the change in plants 722 and/or 724 over time.

FIGS. 8A-8B illustrate a user interface 800 displaying tools for analyzing plants at a site depicted in a window 810. The user interface 800 may be displayed by a user device 102 based on a rendering of user interface data generated and provided by the plant growth prediction system 120 (e.g., the user interface generator 131).

As illustrated in FIG. 8A, the user interface 800 may include a window 830 that includes a location button 832, a width button 834, an area button 836, and a volume button 838. Selection of the location button 832 may allow a user to select a plant in the window 810. Selection of the width button 834 may allow a user to measure the width of a plant. For example, the user may be able to place a line 822 in the window 810. Creation of the line 822 causes the window 830 to indicate the length or distance covered by the line 822 (e.g., 13.45 ft). In addition, creation of the line 822 causes the window 830 to display a line graph 840 indicating a height of the plant or plants covered by the line 822. For example, plants may include branches, leaves, and/or the like location at various heights. The plants may also not completely cover a certain area (when looking at the plant from above) due to gaps between branches, leaves, and/or the like. Thus, the height of a plant may vary. The line graph 840 indicates, for each point along the line 822, the height of the plant or plants at the respective point along the line 822.

Selection of the area button 836 may allow a user to measure an area of a plant. For example, as illustrated in FIG. 8B, the user may be able to create a polygon 824 representing the outer boundaries of a plant. Creation of the polygon 824 causes the window 830 to indicate an area, cut, fill, and/or volume covered by the polygon 824 (e.g., 124 ft$^2$, 31.9 y$^3$, 3.4 y$^3$, and 23.1 y$^3$, respectively).

Example Plant Health Detection Routine

Figure 9:
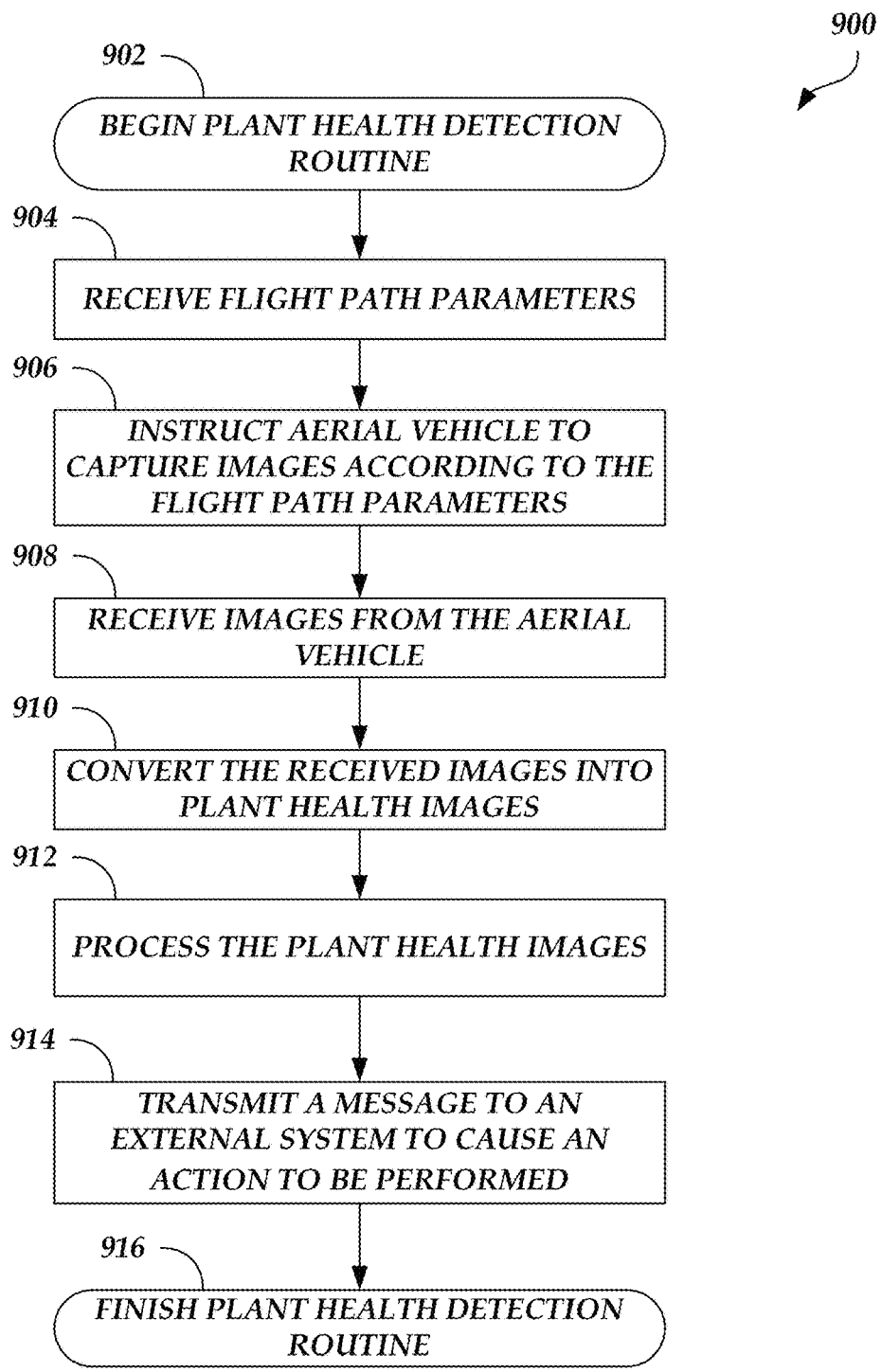
FIG. 9 is a flow diagram depicting a plant health prediction routine 900 illustratively implemented by a plant growth prediction system, according to one embodiment.

FIG. 9 is a flow diagram depicting a plant health prediction routine 900 illustratively implemented by a plant growth prediction system, according to one embodiment. As an example, the plant growth prediction system 120 of FIG. 1 can be configured to execute the plant health prediction routine 900. The plant health prediction routine 900 begins at block 902.

At block 904, flight path parameters are received. For example, the flight path parameters can include a flight path, a shooting angle, a capture mode, a gimbal pitch angle, an end-mission action, and/or the like. The flight path parameters can be received from a user device 102 or the flight path data store 125.

At block 906, an aerial vehicle is instructed to captures images according to the flight path parameters. For example, the aerial vehicle may capture images using a thermal camera and/or a high-resolution camera.

At block 908, images are received from the aerial vehicle. For example, the images may be received in real-time and/or after the flight is complete.

At block 910, the received images are converted into plant health images. For example, the image processor 122 can use the green value of the RGB color of a pixel to identify a new RGB color for the pixel and convert the pixel to the new RGB color.

At block 912, the plant health images are processed. For example, the image processor 122 can process the plant health images to identify the height, width, volume, area, and/or canopy percentages of plants. The image processor 122 can then compare the identified heights, widths, volumes, areas, and/or canopy percentages with threshold heights, widths, volumes, areas, and/or canopy percentages.

At block 914, a message is transmitted to an external system to cause an action to be performed. For example, based on the comparison performed by the image processor 122, the image processor 122 may prepare a message for transmission to an external system. The external system may be the irrigation system 150, a lighting system, and/or the like. Receipt of the message may cause the external system to perform an action, such as adjusting lighting and/or lighting schedules, adjusting watering and/or watering schedules, and/or notifying when plants need to be pruned. After the message is transmitted to the external system, the plant health detection routine 900 is complete, as shown at block 916.

Example Aerial Vehicle

Figure 10A:
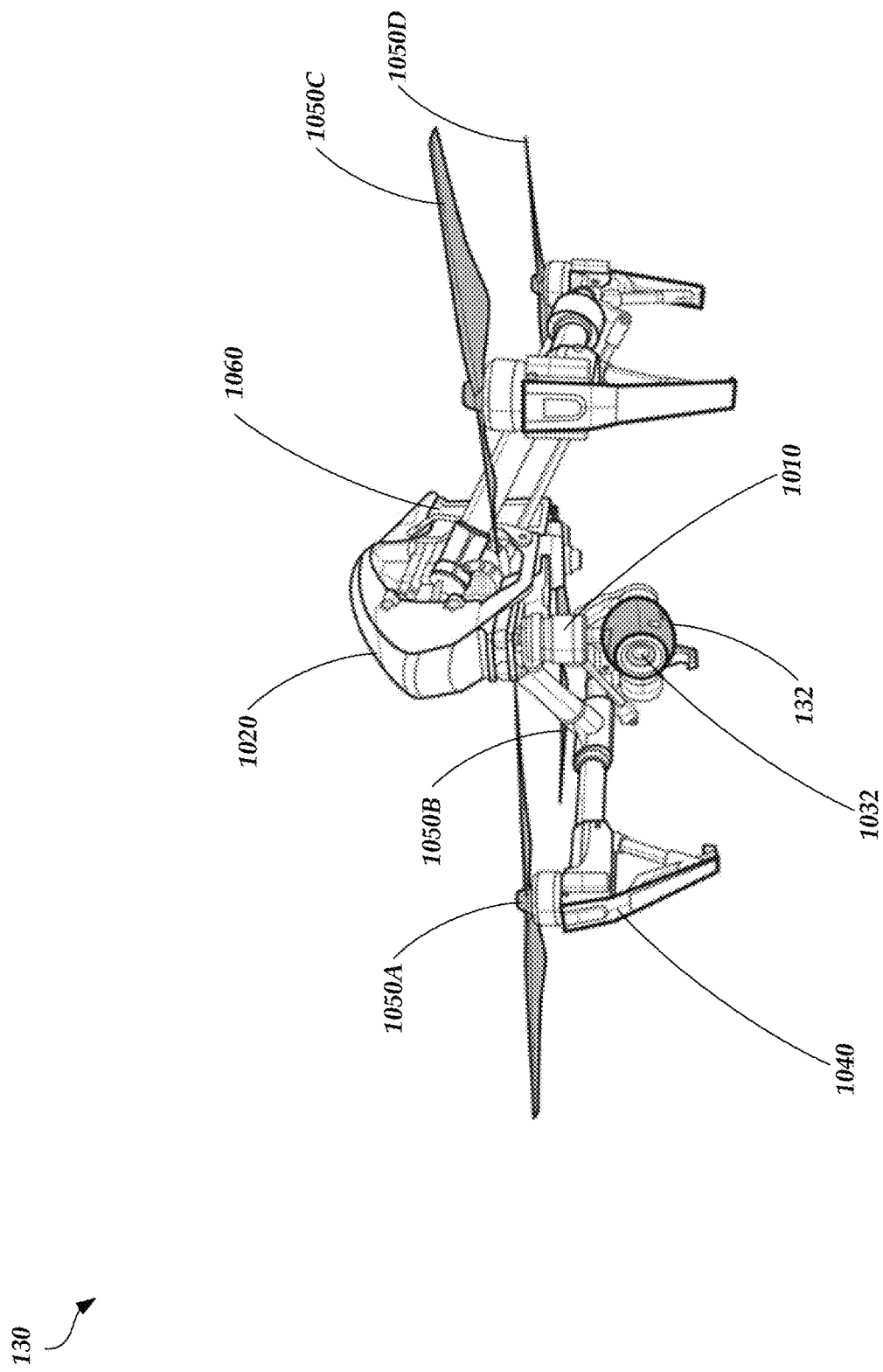
FIGS. 10A-10B illustrate an exemplary aerial vehicle, such as the aerial vehicle of FIG. 1.
Figure 10B:
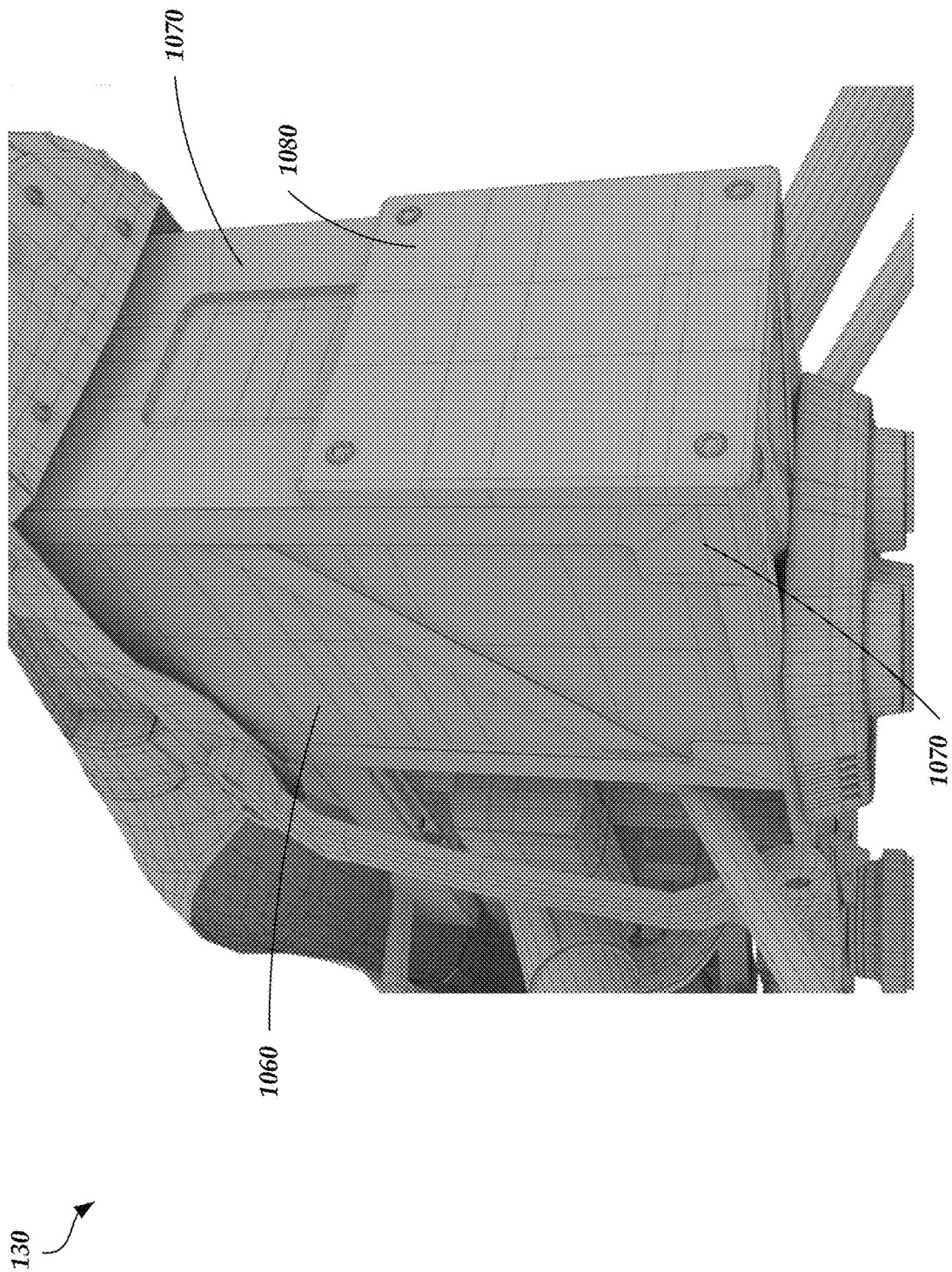

FIGS. 10A-10B illustrate an exemplary aerial vehicle 130. As illustrated in FIG. 10A, the aerial vehicle 130 is an unmanned aerial vehicle in which a camera 132 is coupled to a body 1020 of the aerial vehicle 130 via a gimbal 1010. The aerial vehicle 130 further includes four rotors 1050A-D. For example, the exemplary aerial vehicle 130 illustrated in FIGS. 10A-10B may be the INSPIRE 1 PRO drone. While the exemplary aerial vehicle 130 illustrated in FIG. 10A includes four rotors 1050A-D, this is not mean to be limiting. For example, the aerial vehicle 130 may include any number of rotors (e.g., six, eight, ten, twelve, etc.).

The gimbal 1010 may allow the camera 132 to rotate 360 degrees within a horizontal plane (e.g., a plane that extends from a left side of the aerial vehicle 130 to a right side of the aerial vehicle 130, a plane that extends from a back side of the aerial vehicle 130 to a front side of the aerial vehicle 130, etc.). As an illustrative example, the gimbal 1010 may allow the camera 132 to be positioned such that a lens 1032 of the camera 132 faces a right-front rotor apparatus 1040.

Similarly, the gimbal 1010 may allow the camera 132 to rotate at least 180 degrees within a vertical plane (e.g., a plane that extends from a top side of the aerial vehicle 130 to a bottom side of the aerial vehicle 130). As an illustrative example, the gimbal 1010 may allow the camera 132 to be positioned such that the lens 1032 faces a surface directly below the body 1020 of the aerial vehicle 130.

The aerial vehicle 130 further includes a battery 1060 located near the rear of the aerial vehicle 130. As illustrated in FIG. 10B, the battery 1060 is secured within a housing 1070 that at least partially encloses the battery 1060. A plate 1080 is affixed to an exterior of the housing 1070 (e.g., via screws or any type of adhesive material) to provide additional support to the housing 1070 securing the battery 1060. As discussed below, a rail mount 1100 can be coupled to the plate 1080 to provide additional substance collection and/or wildlife detection features.

Rail Mount

As described above, some or all of the techniques described herein can be implemented for substance collection. For example, the flight path controller 138 can control the operation of the aerial vehicle 130 according to received flight path parameters, causing the aerial vehicle 130 to take off from a current location, follow a current flight path to an area in which a desired substance (e.g., liquid, such as water, a solid object, such as rocks or soil, gas, such as $CO_2$, etc.) is located, and descend or otherwise remain stationary at the area in which a desired substance is located such that an optional attachment coupled to the aerial vehicle 130 can interact with the desired substance and collect a sample of the desired substance for further analysis.

In addition, as described above, some or all of the techniques described herein can be implemented to monitor animals. For example, the flight path controller 138 can control the operation of the aerial vehicle 130 according to received flight path parameters, causing the aerial vehicle 130 to take off from a current location carrying a mobile device and a microphone, follow a current flight path over an area in which a specific animal species may be present, and allow the mobile device to power the microphone and record audio signals captured and/or transduced by the microphone for further analysis.

It may be advantageous, however, to design the optional attachment such that the attachment does not interfere with the operation of the aerial vehicle 130. For example, the exemplary aerial vehicle 130 illustrated in FIGS. 10A-10B includes four rotors 1050A-D that each rotate in a horizontal plane and have a certain diameter of rotation. Any interference within the rotational diameter of any of the four rotors 1050A-D (e.g., a portion of the optional attachment colliding with a rotor 1050A-D as the rotor rotates) can damage the rotor 1050A-D, cause the aerial vehicle 130 to crash, cause the aerial vehicle 130 to drop or otherwise lose the collected substance, and/or the like. Thus, an optional attachment is described herein that is designed to allow the aerial vehicle 130 to carry components used for collecting and/or carrying substances and/or used for monitoring wildlife in a manner such that interference with the operation of the aerial vehicle 130 is significantly reduced or avoided.

Figure 11A:
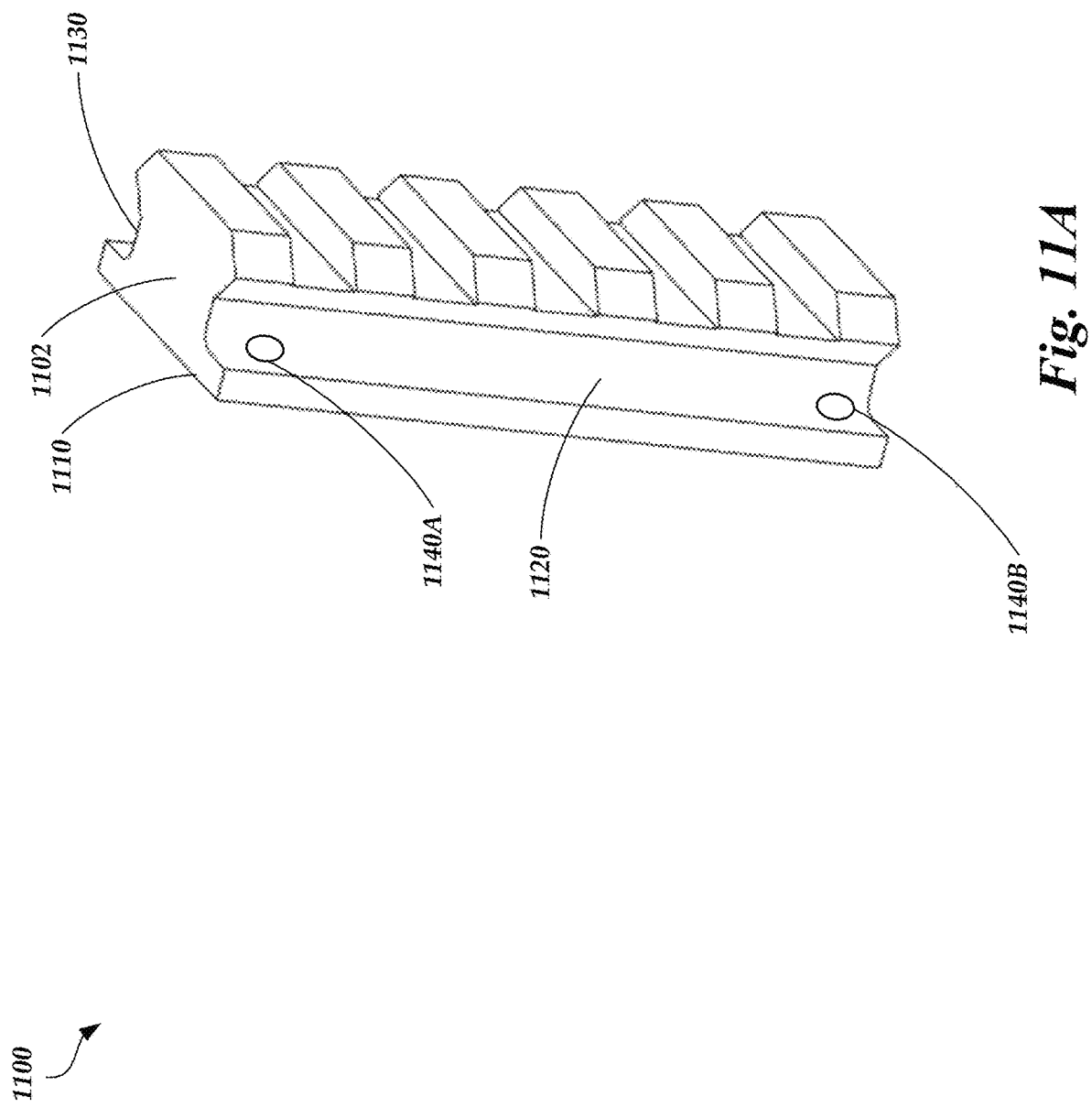
Figure 11B:
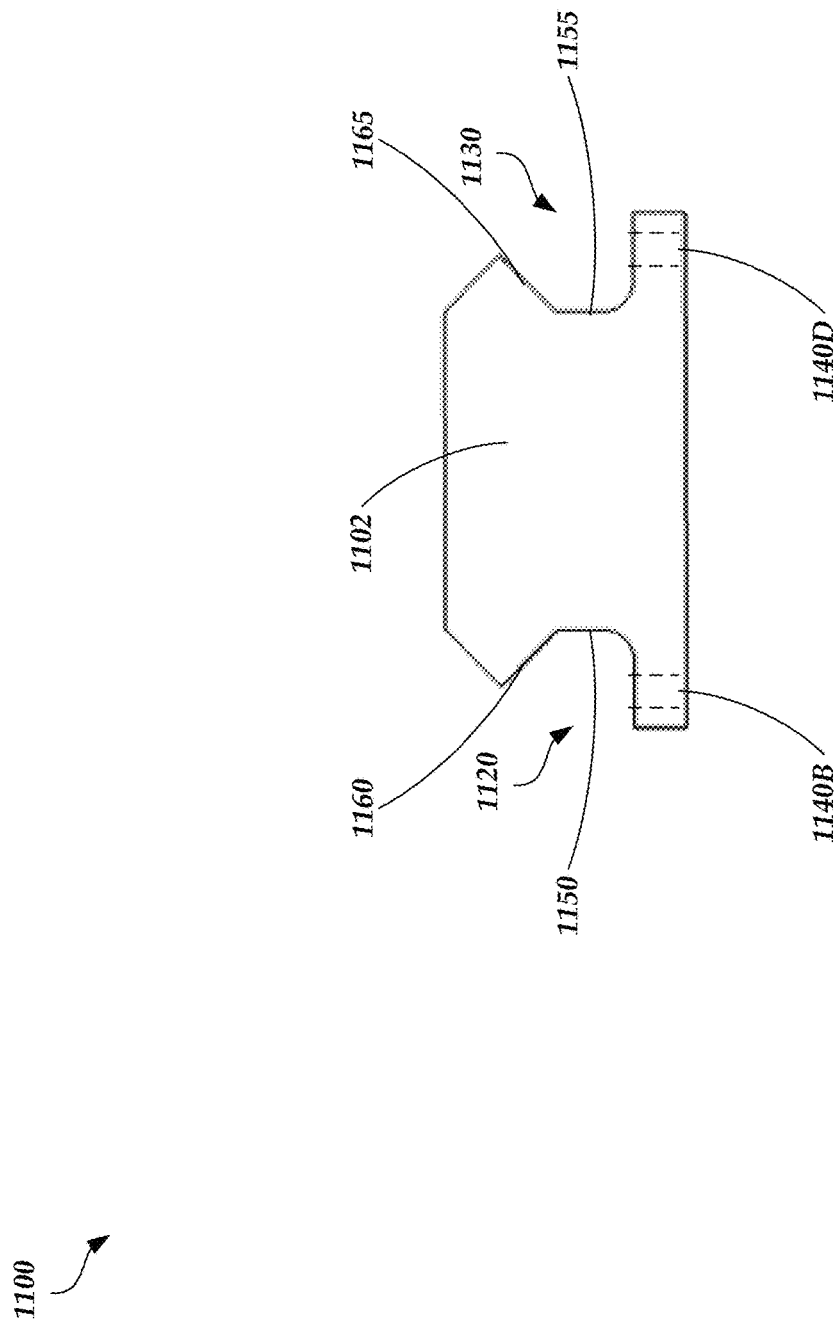

FIGS. 11A-11C illustrate an exemplary rail mount 1100. In particular, FIG. 11A illustrates a front, side view of the exemplary rail mount 1100, FIG. 11B illustrates a bottom view of the exemplary rail mount 110, and FIG. 11C a rear, side view of the exemplary rail mount 1100. The rail mount 1100 may be coupled to a surface of the plate 1080 of the aerial vehicle 130 shown in FIG. 10B that is opposite from a surface of the plate 1080 that is coupled to the housing 1070 of the aerial vehicle 130 shown in FIG. 10B. For example, the rail mount 1100 can be screwed, bolted, pinned, affixed via an adhesive material, etc. to the plate 1080. In some embodiments, the height of the rail mount 1100 may not exceed the height of the plate 1080 such that the rail mount 1100, when coupled to the plate 1080, does not couple to the housing 1070 or the battery 1060. Thus, the rail mount 1100, when coupled to the plate 1080, may not puncture, slice, cut, or otherwise damage the housing 1070 or the battery 1060. In addition, the rail mount 1100, when coupled to the plate 1080, may not prevent removal of the battery 1060 (e.g., for charging purposes).

As illustrated in FIG. 11A, the rail mount 1100 comprises a flat surface 1110 that couples to a surface of the plate 1080. The rail mount 1100 further comprises a pair of parallel, vertical rails 1120 and 1130. The rails 1120 and 1130 are formed via surfaces that extend into the body 1102 of the rail mount 1100. As illustrated in FIG. 11B, surfaces 1150 and 1155, which extend into the body 1102, and lips 1160 and 1165, which are protruding portions of the body 1102, form the rails 1120 and 1130, respectively.

Furthermore, as illustrated in FIG. 11C, the rail mount 1100 comprises openings or holes 1140A-D, which can be used to couple the rail mount 1100 to the plate 1080. For example, screws, bolts, pins, snaps, other types of fasteners, adhesive material, etc. can be inserted into the openings 1140A-D (e.g., in a direction from the rail 1120 and 1130 side to the flat surface 1110 side) to couple the rail mount 1100 to the plate 1080.

Any component or attachment with protrusions (e.g., tabs, appendages, lips, etc.) that are structured to abut, contact, and/or mate with the rails 1120 and 1130 (e.g., a protrusion with a shape that allows the protrusion to couple with, and remain coupled with, the surface 1150 or 1155 and the lip 1160 or 1165 when in a resting position) can be coupled to (or decoupled from) the rail mount 1100 quickly to provide various functionality. As illustrative examples, a component with protrusions that are structured to abut, contact, and/or mate with the rails 1120 and 1130 to provide substance collection functionality or animal monitoring functionality are described herein. The component described herein can be removably or permanently coupled to the rail mount 1100.

Figure 12A:
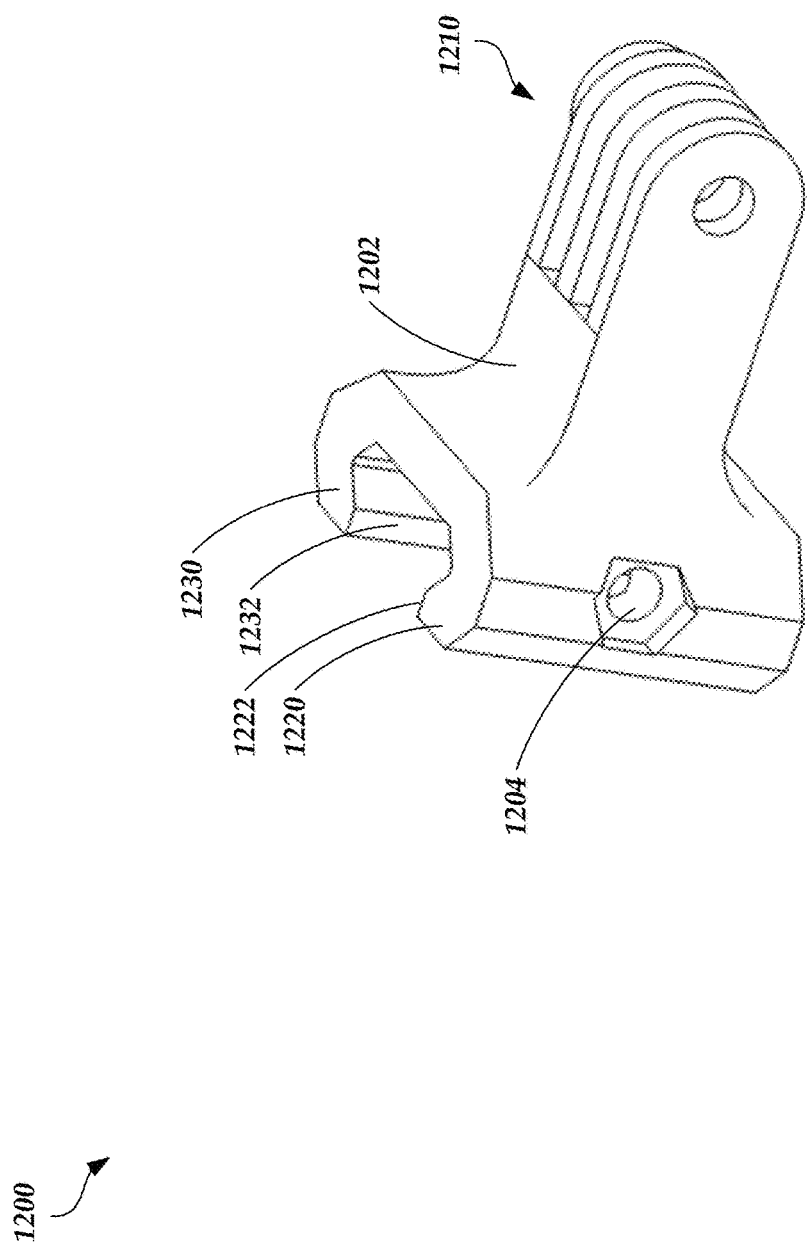
FIGS. 12A-12D illustrate an exemplary rail attachment that can couple to the rail mount of FIGS. 11A-11C.
Figure 12B:
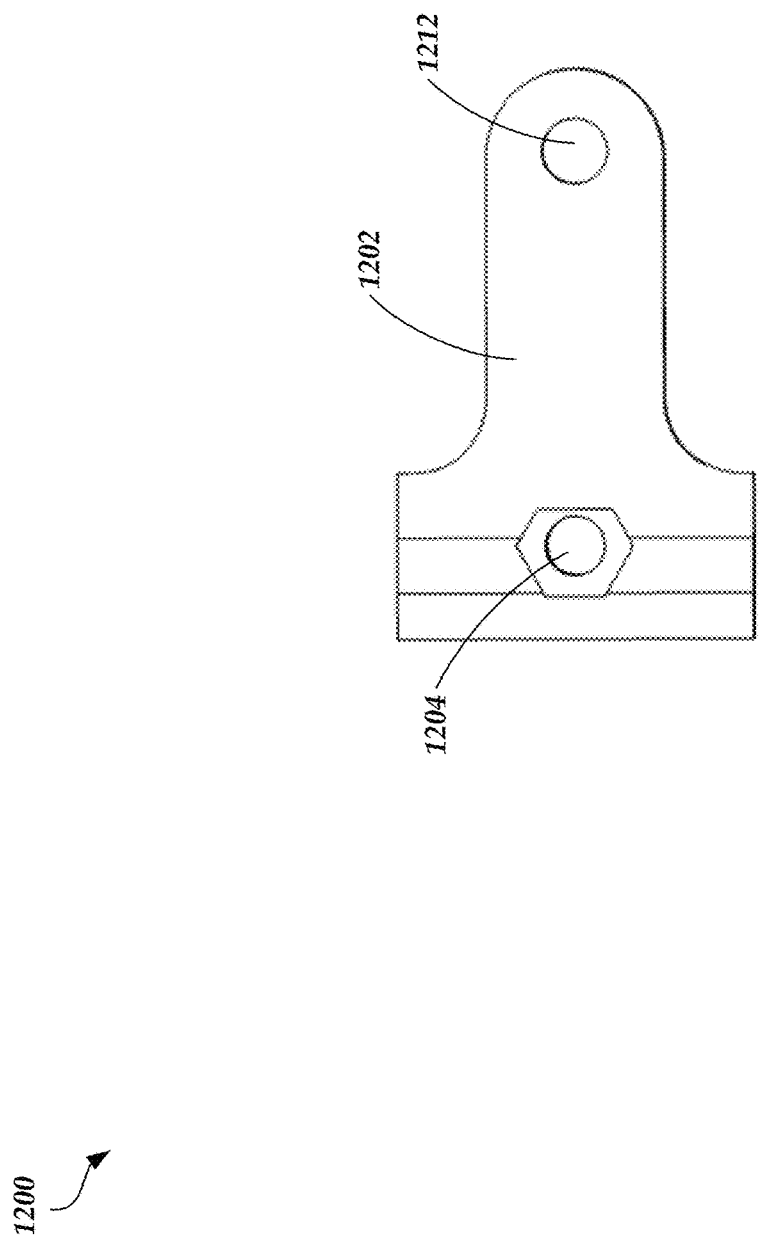
Figure 12C:
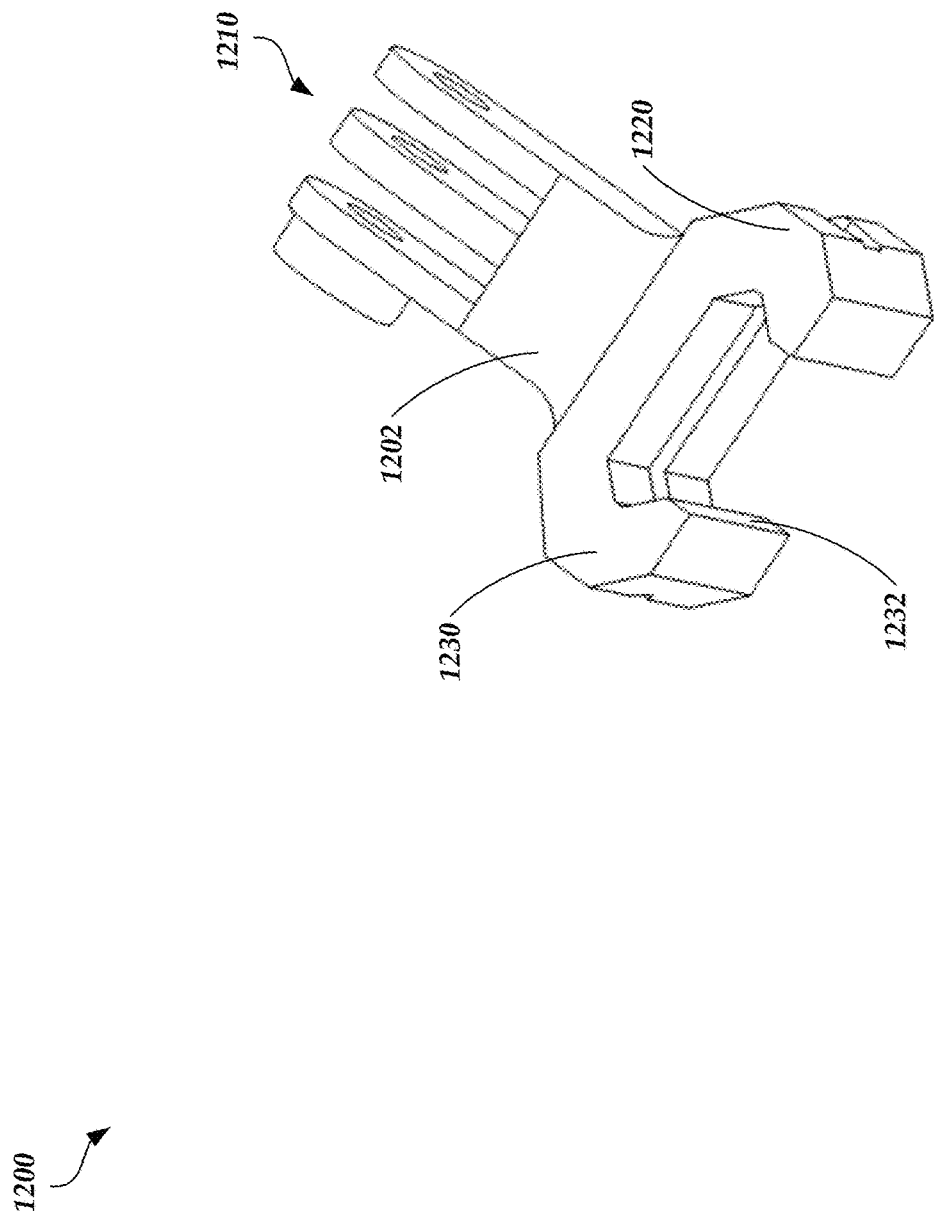
Figure 12D:
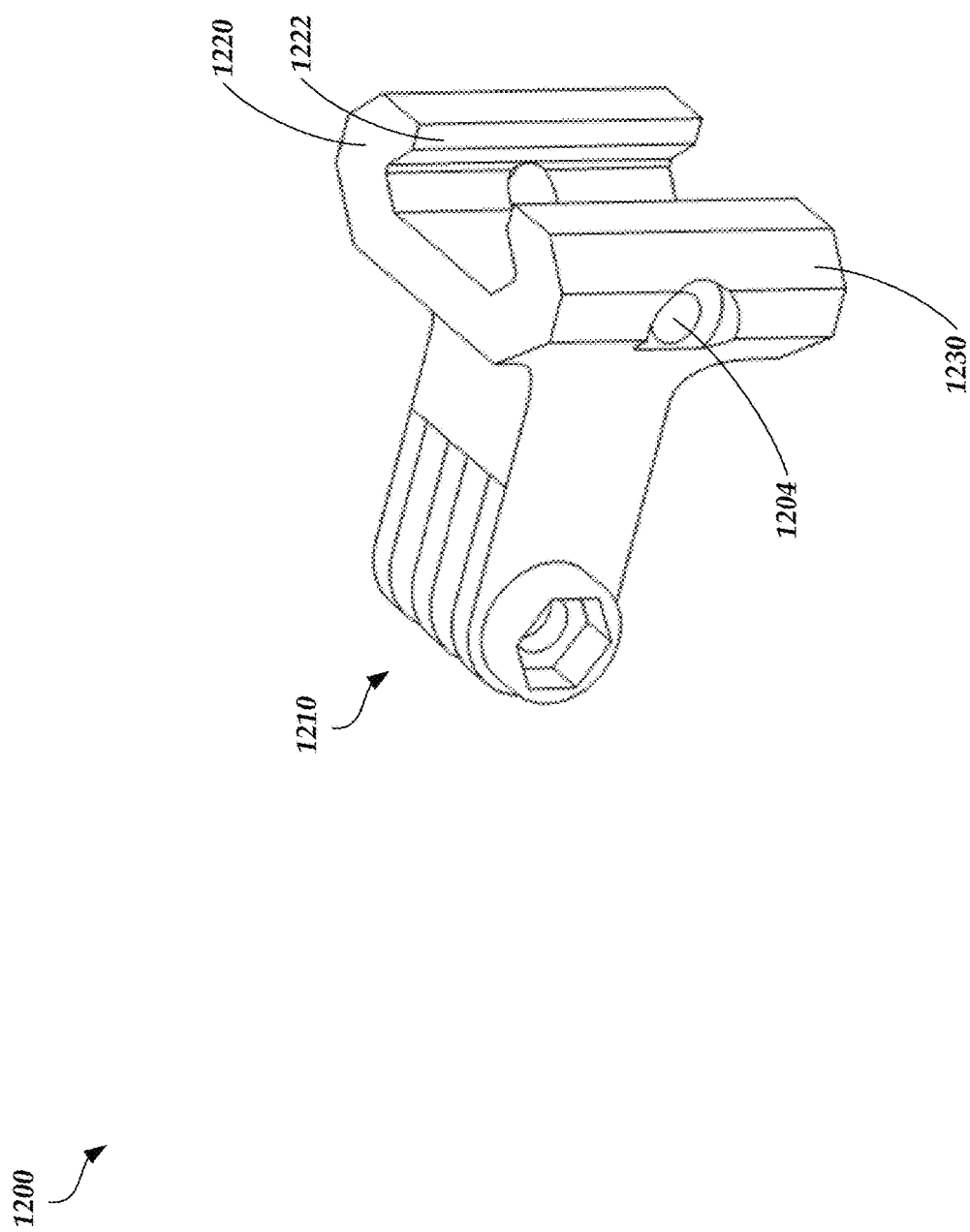

For example, FIGS. 12A-12D illustrate an exemplary rail attachment 1200 that can couple to the rail mount 1100. In particular, FIG. 12A illustrates a front, side view of the rail attachment 1200, FIG. 12B illustrates a side view of the rail attachment 1200, FIG. 12C illustrates a top view of the rail attachment 1200, and FIG. 12D illustrates a rear, side view of the rail attachment 1200. In an embodiment, the rail attachment 1200 couples to the rail mount 1100 by sliding along the rails 1120 and 1130 of the rail mount 1100.

As illustrated in FIG. 12A, the rail attachment 1200 includes protrusions 1220 and 1230 that extend from the body 1202 of the rail attachment 1200. The protrusions 1220 and 1230 may be structured such that the protrusion 1220 can interface with the rail 1120 of the rail mount 1100 and the protrusion 1230 can interface with the rail 1130 of the rail mount 1100. For example, edge 1222 of the protrusion 1220 can abut, contact, or mate with the surface 1150 when the rail attachment 1200 slides along the rails 1120 and 1130. Similarly, edge 1232 of the protrusion 1230 can abut, contact, or mate with the surface 1160 when the rail attachment 1200 slides along the rails 1120 and 1130. The rail attachment 1200 may include a hole 1204 through which a screw, bolt, pin, snap, or other type of fastener can be run to secure the rail attachment 1200 to the rail mount 1100 (e.g., to prevent the rail attachment 1200 from sliding off the rail mount 1100) when the aerial vehicle 130 is stationary or in motion.

The rail attachment 1200 can be configured to support various components. For example, the rail attachment 1200 includes a three-pronged clevis 1210 opposite from the protrusions 1220 and 1230, allowing the rail attachment 1200 to couple with, and allow rotational motion to, an apparatus that can be used to collect substances and/or an apparatus that can be used to monitor animals. For example, as illustrated in FIG. 12B, the three-pronged clevis 1210 includes a hole 1212 that allows a screw, bolt, pin, snap, or other type of fastener to run through to couple the clevis 1210 with another apparatus.

In an embodiment, a width of a combination of the rail mount 1100 and the rail attachment 1200 (e.g., in the transverse direction) is set such that neither the rail mount 1100 nor the rail attachment 1200 interfere with the operation of the rotors 1050B or 1050D (e.g., the rotors near the rear of the aerial vehicle 130). For example, the rail mount 1100 and the rail attachment 1200, when coupled to the rear of the aerial vehicle 130, may be located in a horizontal plane between the rotors 1050B and 1050D (e.g., as illustrated in FIG. 19) and the width of the combination of the rail mount 1100 and the rail attachment 1200 (e.g., the total width of the rail mount 1100 and the rail attachment 1200 in the transverse direction when both components are coupled to each other) may be less than the distance between (1) an edge of the radius of the rotor 1050B that is closest to the rotor 1050D and (2) an edge of the radius of the rotor 1050D that is closest to the rotor 1050B. In other words, if the distance between the center of rotation of the rotor 1050B and the center of rotation of the rotor 1050D is equal to the addition of the radius of rotor 1050B, a distance d, and the radius of rotor 1050D, then the width of the combination of the rail mount 1100 and the rail attachment 1200 may be less than distance d. Thus, the rail mount 1100 and the rail attachment 1200 can be coupled to the aerial vehicle 130 without affecting the battery 1060 operation or the operation of the rotors 1050B and 1050D.

In other embodiments, not shown, the rail mount 1100 and the rail attachment 1200 can be combined into a single component. For example, the protrusions 1220 and 1230 of the rail attachment 1200 may be permanently affixed to the rails 1120 and 1130. As another example, a single component may be constructed that includes one or more of the features present in the rail mount 1100 and/or the rail attachment 1200, such as the flat surface 1100 that couples to the plate 1080 of the aerial vehicle 130 via openings 1140A-D and the three-pronged clevis 1210.

Substance Collection

As described herein, the aerial vehicle 130 can be controlled to collect substances from a specific geographic location. For example, such substances can include liquid (e.g., water, oil, chemicals, etc.), objects (e.g., rocks, soil, plants, etc.), and/or the like. As an illustrative example, a canister can be used to collect the substance, carried by the aerial vehicle 130 via the rail mount 1100 and the rail attachment 1200. In particular, a support can couple to the rail attachment 1200, with the support used to suspend the canister below the aerial vehicle 130 via a narrow, long flexible structure (e.g., a chain, cable, rope, string, etc.) that is capable of supporting the weight of the canister and any collected substance when the aerial vehicle 130 is in the air. The aerial vehicle 130 can be directed to fly to a specific geographic location and descend and/or remain stationary at the specific geographic location such that the canister can be lowered to collect the desired substance. The aerial vehicle 130 can be controlled (e.g., via the flight path controller 138) to remain at the specific geographic location for a threshold period of time such that a sufficient amount of the desired substance can be collected. The aerial vehicle 130 may then follow a flight path back to the original departure location such that the collected substance can be analyzed The aerial vehicle 130 may follow the flight path based on data received from the aerial vehicle controller 121. Alternatively or in addition, the aerial vehicle 130 can be flown manually, following the flight path based on data received from a user-operated remote control.

Figure 13A:
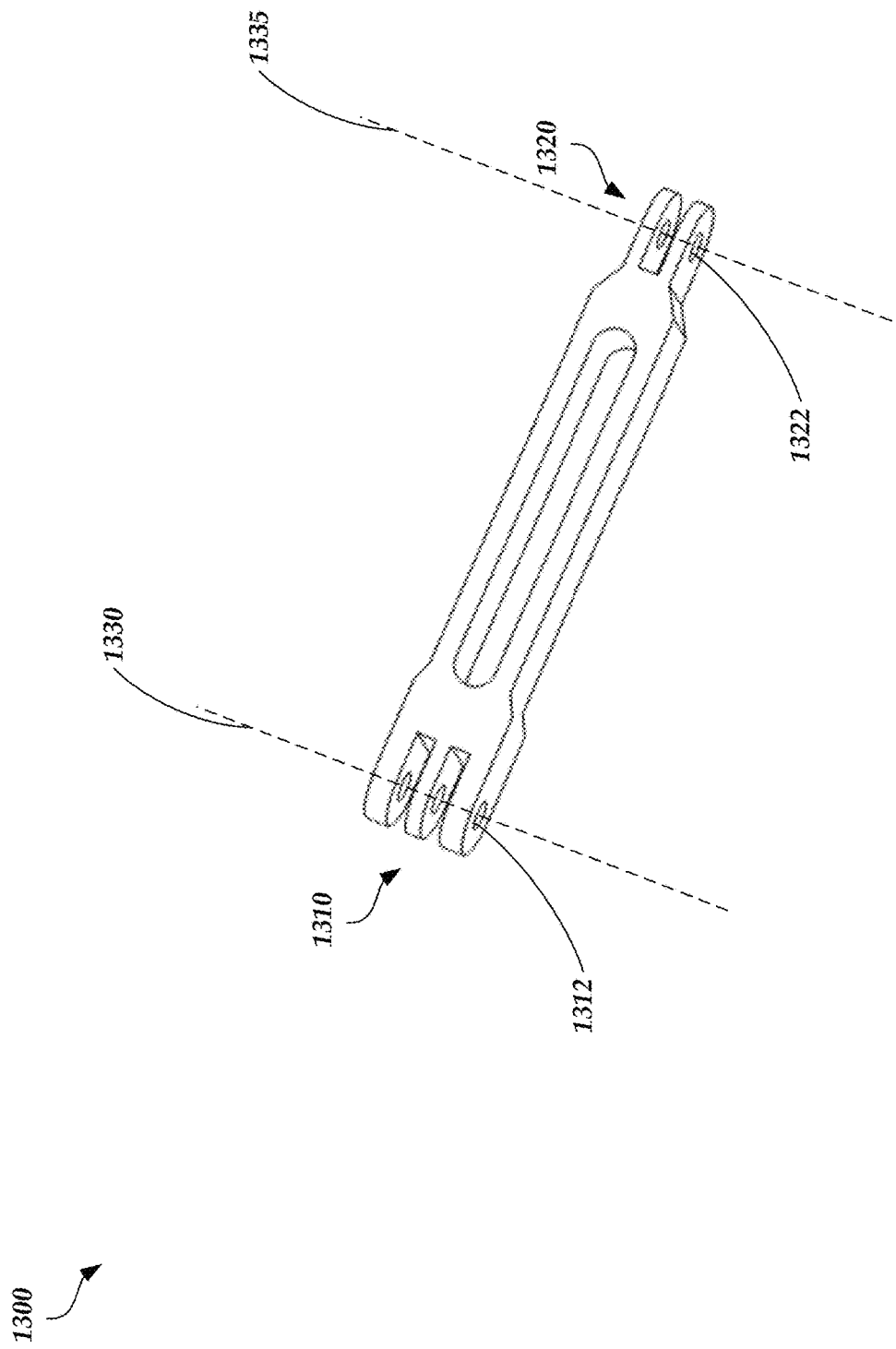
FIGS. 13A-13C illustrate an exemplary support.
Figure 13B:
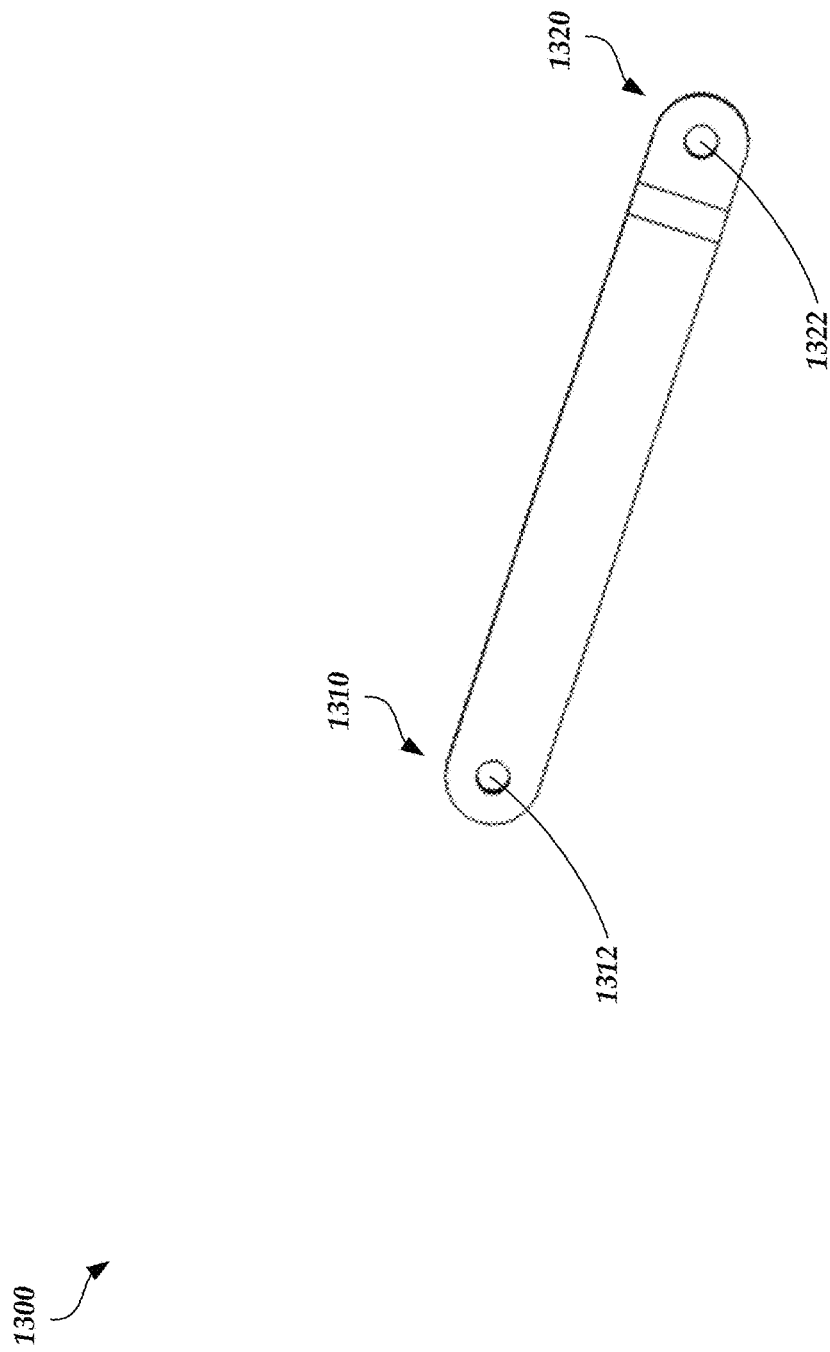
Figure 13C:
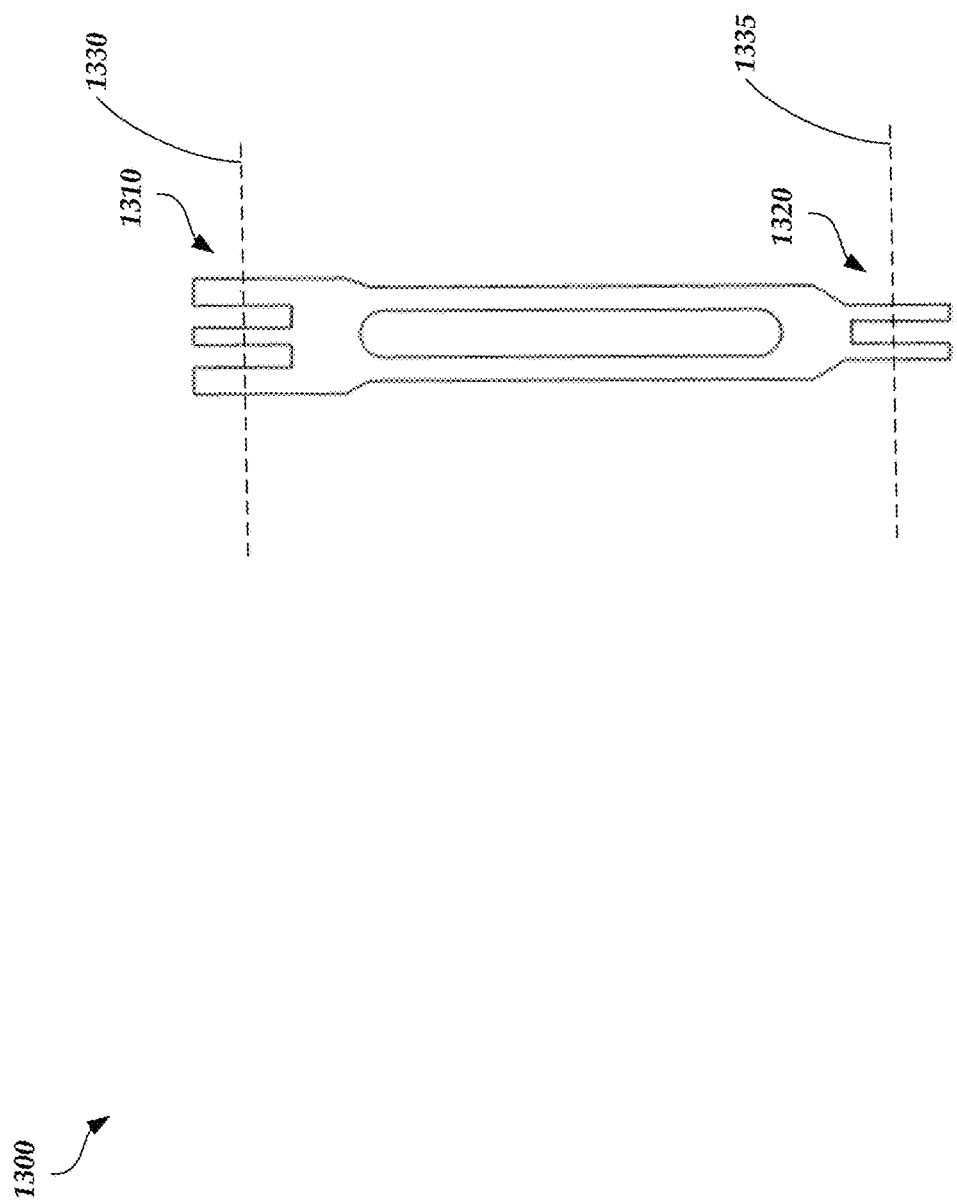

FIGS. 13A-13C illustrate an exemplary support 1300. In particular, FIG. 13A illustrates a top, side view of the support 1300, FIG. 13B illustrates a side view of the support 1300, and FIG. 13C illustrates a top view of the support 1300.

As illustrated in FIG. 13A, the support 1300 includes a three-pronged clevis 1310 and a two-pronged clevis 1320. In one embodiment, the three-pronged clevis 1310 couples to the three-pronged clevis 1210 of the rail attachment 1200 via a screw, bolt, pin, snap, or other type of fastener that runs through holes 1212 and 1312 such that the support 1300 can rotate about axis 1330 passing through hole 1312. In another embodiment, the two-pronged clevis 1320 couples to the three-pronged clevis 1210 of the rail attachment 1200 via a screw, bolt, pin, snap, or other type of fastener that runs through holes 1212 and 1322 such that the support 1300 can rotate about axis 1335 passing through hole 1322. By allowing the support 1300 to rotate, the canister, and therefore the aerial vehicle 130, can collect substances at different heights, angles, positions, etc. In either embodiment, the support 1300 may rotate counterclockwise until touching the aerial vehicle 130 or clockwise until touching the aerial vehicle 130 without interfering with the operation of the rotors 1050B or 1050D because the width of the widest portion of the support 1300 in the transverse direction (e.g., the three-pronged clevis 1310) may not exceed the distance between (1) an edge of the radius of the rotor 1050B that is closest to the rotor 1050D and (2) an edge of the radius of the rotor 1050D that is closest to the rotor 1050B. In other words, if the distance between the center of rotation of the rotor 1050B and the center of rotation of the rotor 1050D is equal to the addition of the radius of rotor 1050B, a distance d, and the radius of rotor 1050D, then the widest portion of the support 1300 may not exceed the distance d.

In embodiments in which the three-pronged clevis 1310 couples to the three-pronged clevis 1210, a flexible structure that can support a threshold weight, such as a rope, chain, cable, string, etc., can run through the hole 1322, with the flexible structure being used to suspend a canister when the aerial vehicle 130 is in the air. In embodiments in which the two-pronged clevis 1320 couples to the three-pronged clevis 1210, a flexible structure that can support a threshold weight, such as a rope, chain, cable, string, etc., can run through the hole 1312, with the flexible structure being used to suspend a canister when the aerial vehicle 130 is in the air.

Figure 14A:
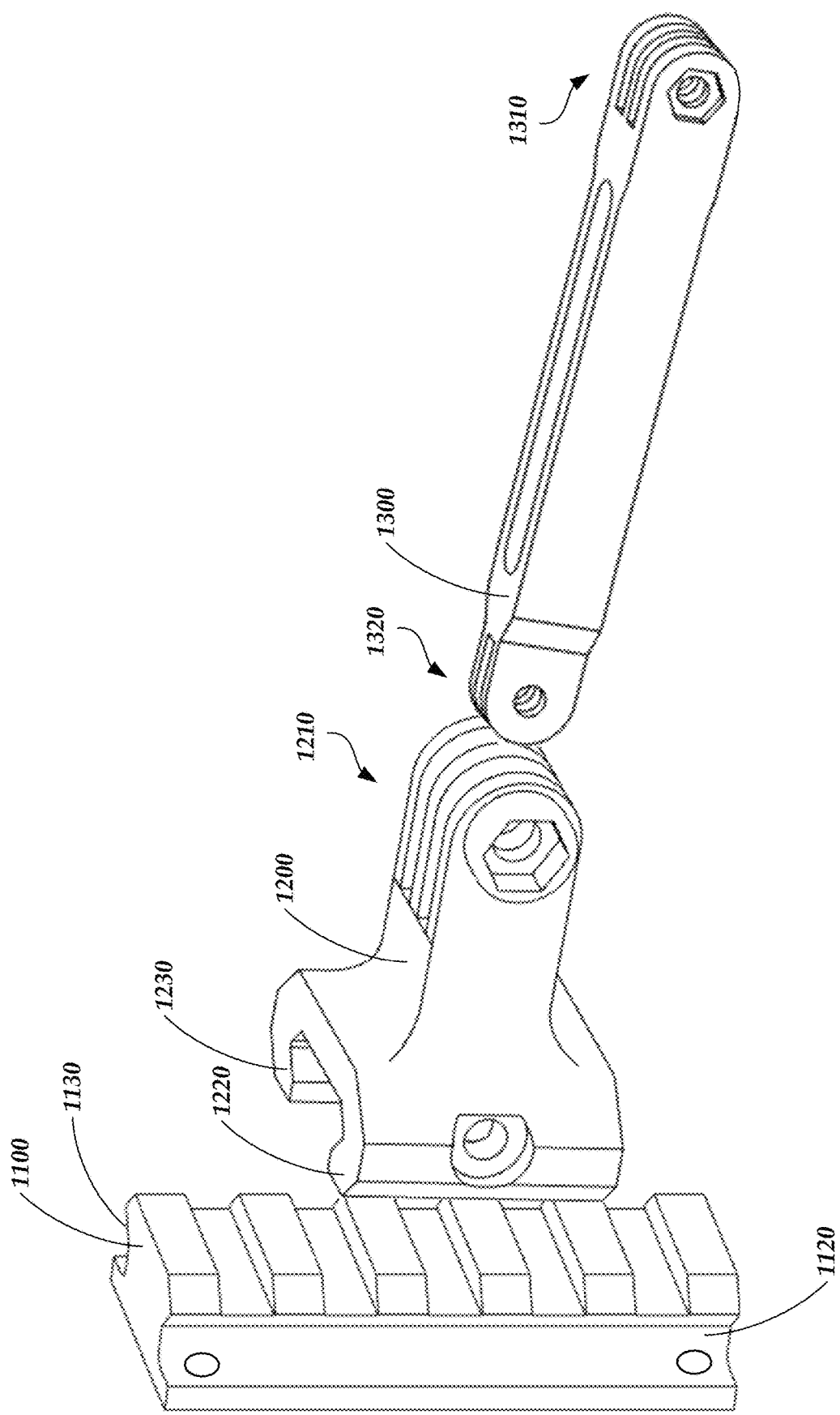
FIGS. 14A-14B illustrate an exploded view of the rail mount of FIGS. 11A-11C, the rail attachment of FIGS. 12A-12D, and the support of FIGS. 13A-13C.
Figure 14B:
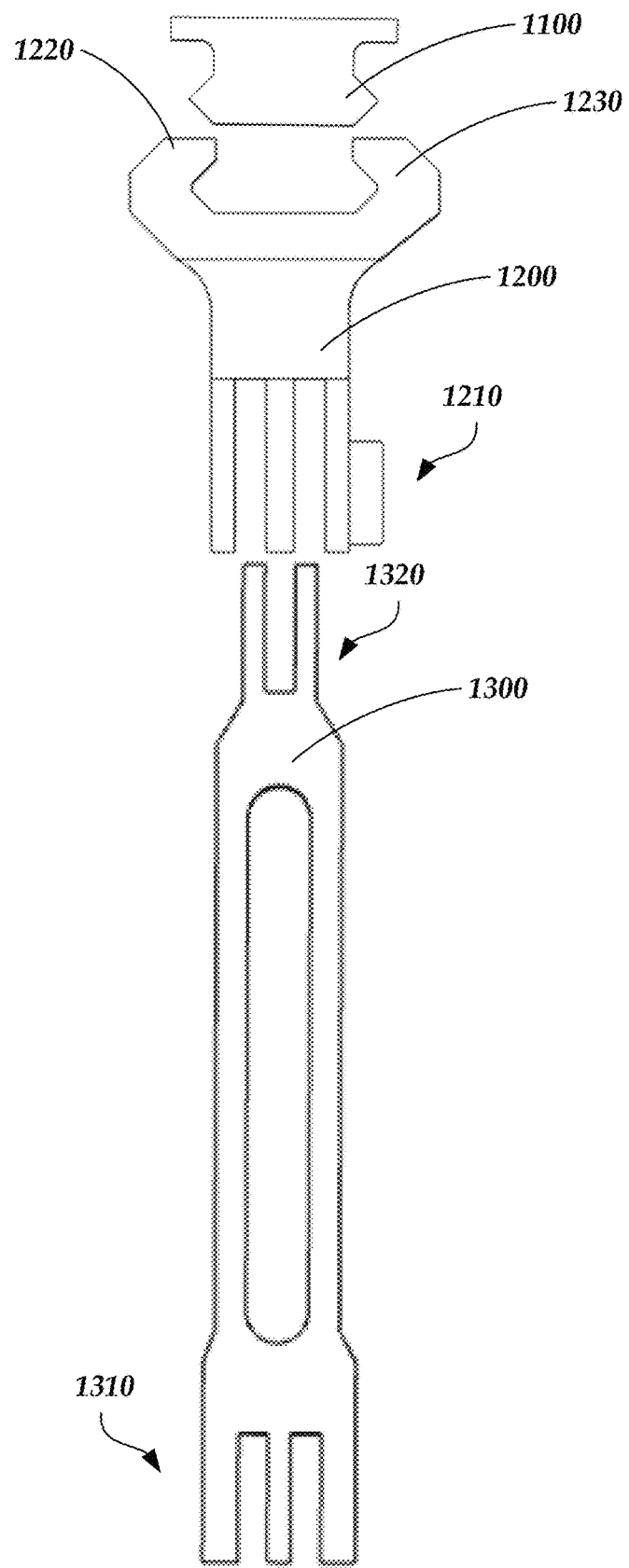

FIGS. 14A-14B illustrate an exploded view of the rail mount 1100, the rail attachment 1200, and the support 1300. In particular, FIG. 14A illustrates a side, exploded view of the rail mount 1100, the rail attachment 1200, and the support 1300, and FIG. 14B illustrates a top, exploded view of the rail mount 1100, the rail attachment 1200, and the support 1300.

As illustrated in FIGS. 14A-14B, the rail attachment 1200 couples to the rail mount 1100, and the support 1300 couples to the rail attachment 1200. For example, the protrusions 1220 and 1230 of the rail attachment 1200 can couple to the rails 1120 and 1130 of the rail mount 1100. The clevis 1320 (or the clevis 1310) of the support 1300 can also couple to the clevis 1210 of the rail attachment 1200. The flat surface 1110 of the rail mount 1100 can couple to a surface of the plate 1080.

Figure 15A:
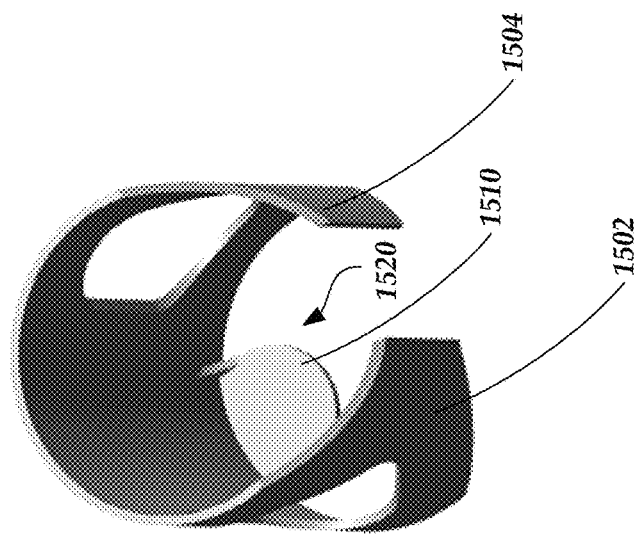
FIGS. 15A-15C illustrate an exemplary canister holder.
Figure 15B:
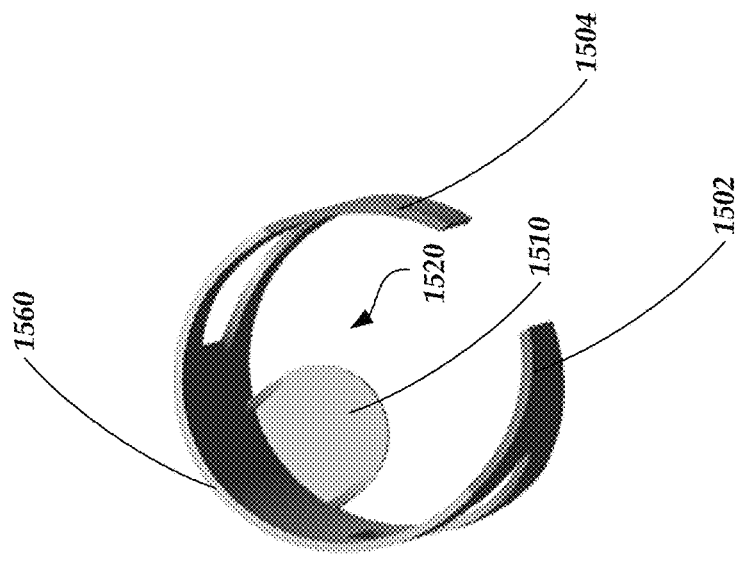
Figure 15B:
Figure 15C:
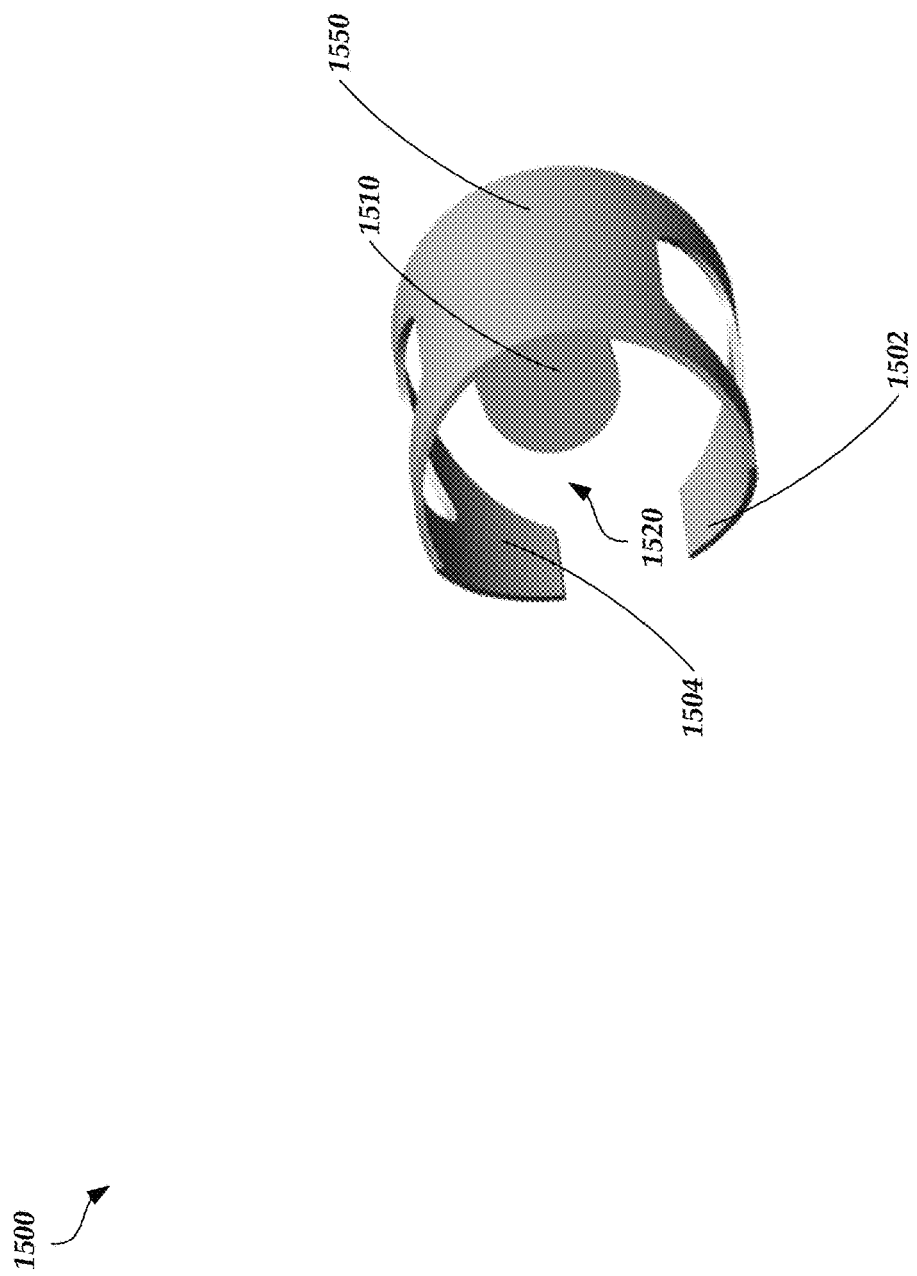

FIGS. 15A-15C illustrate an exemplary canister holder 1500. In particular, FIG. 15A illustrates a top, side view of the canister holder 1500, FIG. 15B illustrates a top view of the canister holder 1500, and FIG. 15C illustrates a bottom, side view of the canister holder 1500.

The canister holder 1500 can couple with the flexible structure and secure a canister (e.g., bottle, container, etc.). As illustrated in FIGS. 15A-15C, the canister holder 1500 may have a cylindrical or nearly cylindrical shape with a lip 1510 protruding into a cavity 1520 produced by the cylindrical shape at the bottom of the canister holder 1500. The lip 1510 may provide support for a canister and prevent the canister from passing through the cavity 1520 formed by the cylindrical shape and falling to the ground.

The canister holder 1500 may be formed using a flexible or bendable material such that the canister holder 1500 can support canisters of different sizes. For example, the canister holder 1500 may include end portions 1502 and 1504 that form a partially or fully enclosed cavity 1520. When force is applied to the end portions 1502 and 1504 (e.g., by a canister), the end portions 1502 and 1504 may bend or flex to accommodate the object providing the force.

In an embodiment, a coupling mechanism (e.g., a notch, a clasp, a hole, a clevis, etc.) may be coupled to the rear portion 1550 of the canister holder 1500 (illustrated in FIG. 15C) such that the canister holder 1500 can be coupled to the support 1300 via the flexible structure. In other embodiments, the coupling mechanism may be coupled to a top portion 1560 of the canister holder 1500 (illustrated in FIG. 15B), a side portion of the canister holder 1500, a bottom portion of the canister holder 1500 (e.g., the lip 1510), and/or any other portion of the canister holder 1500.

While the canister holder 1500 is depicted and described herein as having a cylindrical or nearly cylindrical shape, this is not meant to be limiting. For example, the canister holder 1500 can be any shape to accommodate any component used to collect and/or carry a substance.

A canister lid, not shown, may couple to a top portion (or bottom portion) of a body of a canister and allow substances to enter the canister via one or more openings in any shape or size. For example, if the canister lid includes multiple openings, the openings may be separated by a solid beam or other type of surface. The one or more openings may form a diaphragm or other similar structure that allows substances to enter the canister, but prevents substances from exiting the canister. The size (e.g., height, width, length, circumference, radius, etc.) of the one or more openings can be designed based on the type and/or size of substance that is to be collected. For example, the one or more openings may have a small size if liquid substances (and no solid objects) are desired, whereas the one or more openings may have a larger size if solid objects are desired.

In an embodiment, the canister lid comprises an inner ring and an outer ring. The inner ring may be positioned to prevent substances entering the canister via the one or more openings from exiting the canister via any unsealed gaps between the canister and the canister lid by providing a conduit for substances entering the one or more openings to be directed into a cavity of the canister. The outer ring may be a flange or similar component that allows the canister lid to interface with, and fasten to, to the canister. An inner and/or outer portion of the outer ring may have a flat surface; grooves, threads, and/or the like that allow the canister lid to fasten to the canister via a clockwise or counterclockwise motion; flanges, indentations, and/or the like that allow the canister lid to fasten to the canister; etc.

In some embodiments, the canister holder 1500 may be omitted. Rather, the flexible structure may couple directly with the canister lid. For example, the flexible structure may run through a first opening (from a position exterior to the canister lid to a position interior to the canister lid), abut, contact, and/or otherwise interface with a bottom portion of the solid surface separating the first opening from a second opening, and run through the second opening (from a position interior to the canister lid to a position exterior to the canister lid).

Figure 16:
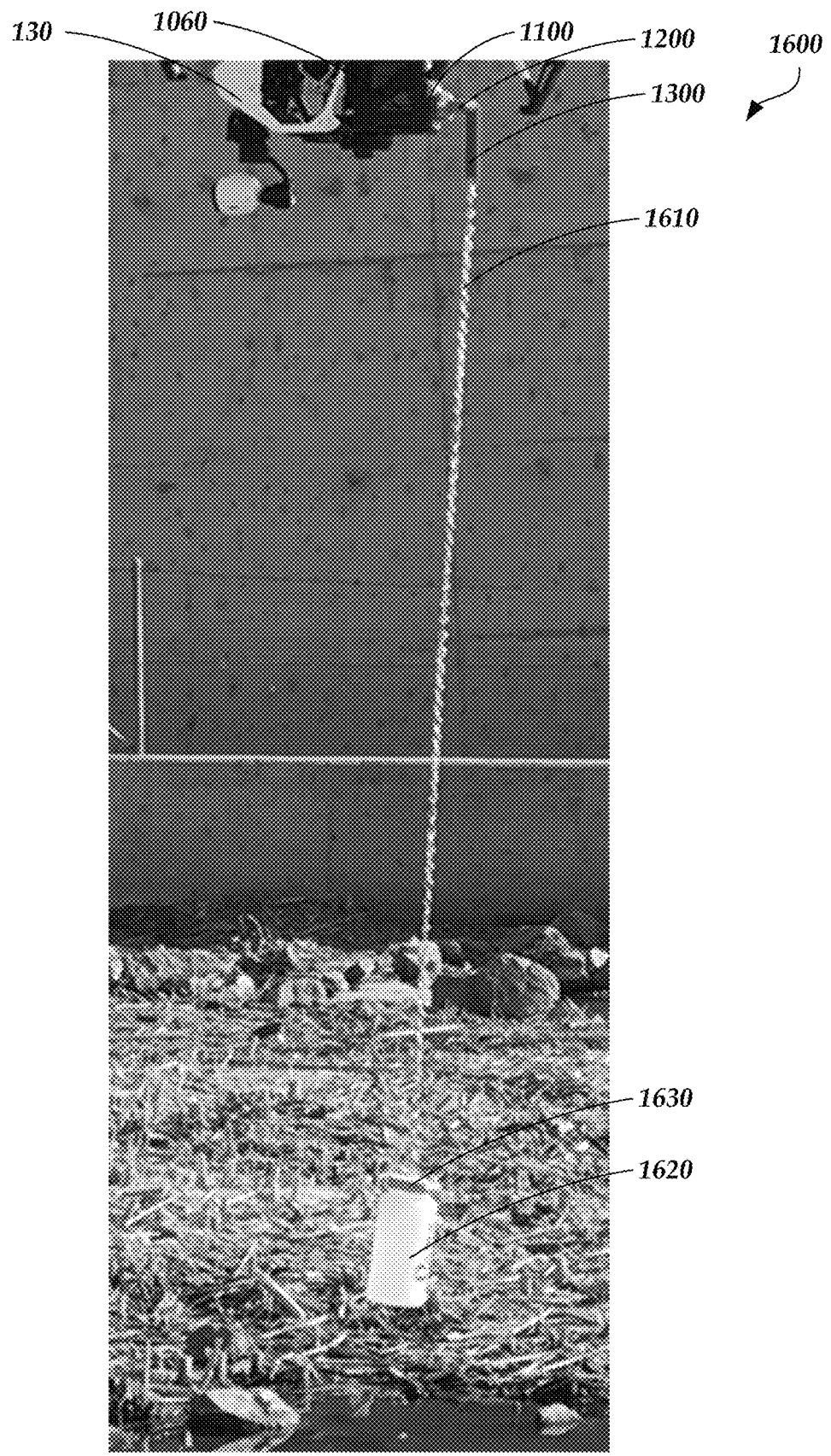
FIG. 16 illustrates an image depicting an exemplary configuration of components for collecting substances via an aerial vehicle.

FIG. 16 illustrates an image 1600 depicting an exemplary configuration of components for collecting substances via an aerial vehicle 130. As illustrated in FIG. 16, the aerial vehicle 130 is in an operational state, flying or hovering over a designated location. The rail mount 1100 is coupled to the rear of the aerial vehicle 130 (e.g., to the plate 1080). Furthermore, the rail attachment 1200 is coupled to the rail mount 1100. The support 1300 is also coupled to the rail attachment 1200, rotated downward such that the support 1300 is perpendicular or generally perpendicular to the ground below.

A flexible structure 1610 (e.g., a chain) is used to couple the support 1300 to a canister lid 1630, and the canister lid 1630 is fastened to a canister 1620. The flexible structure 1610 may allow the canister 1620 to move relative to the aerial vehicle 130 and within a certain distance of the aerial vehicle 130. In other embodiments, not shown, the canister lid 1630 is instead coupled to the support 1300 via a generally inflexible structure (e.g., a support, rod, or beam constructed of a solid material, such as plastic, steel, copper, aluminum, etc.) that does not allow the canister 1620 to move relative to the aerial vehicle 130.

In still other embodiments, the rail mount 1100, the rail attachment 1200, and/or the support 1300 may be coupled to a mechanical component (e.g., that includes gears, motors, shafts, cams, belts, chains, and/or the like) that can extend or retract a flexible or inflexible chain, cable, rope, string, and/or the like coupled to the canister lid 1630 and/or the canister 1620. The mechanical component may be directed to extend or retract the flexible or inflexible structure via an electrical signal or a mechanical signal (e.g., the release of a clasp that was restricting an extension or retraction of the flexible or inflexible structure, the engagement of a clasp that restricts an extension or retraction of the flexible or inflexible structure, a force that causes gears, motors, etc. to move in a direction that causes the extension or retraction of the flexible or inflexible structure, etc.) received from another component (e.g., the aerial vehicle 130, a remote system via a wireless connection, etc.). Thus, the canister 1620 can be positioned at different heights according to the coupled mechanical component.

In an embodiment, the canister lid 1630 includes an opening that allows a substance, such as water, to enter the canister 1620 via the opening. Thus, the aerial vehicle 130 may be instructed to fly to a designated geographic location, descend to a certain height or otherwise cause the canister 1620 to descend to a certain height such that the canister lid 1630 interfaces with the substance to collect (e.g., in the example of the desired substance being water, the aerial vehicle 130 may descend to a height such that the canister lid 1630 is submerged below the water level such that water may flow into the canister 1620), and remain in position for a threshold period of time such that a sufficient amount of the desired substance can be collected within the canister 1620. After the threshold period of time has passed, the aerial vehicle 130 may ascend (to the original height before the descent or to another height above the height to which the aerial vehicle 130 descended) or cause the canister 1620 to ascend to a height above the height to which the canister 1620 descended, and fly back to the original departure point (or a geographic location within a certain distance of the original departure point).

As depicted in the image 1600, the rail mount 1100, the rail attachment 1200, the support 1300, the flexible structure 1610, the canister lid 1630, and the canister 1620 are positioned such that none of these components interferes with the operation of the rotors 1050A-D or any other component of the aerial vehicle 130. These components may also be constructed of materials having a certain weight such that the extra weight applied to the rear of the aerial vehicle 130 via the coupling of these components does not significantly impact the weight distribution, and therefore the operation, of the aerial vehicle 130.

While the present disclosure is described herein with respect to an aerial vehicle 130 carrying a canister 1620 to collect a substance, this is not meant to be limiting. For example, the aerial vehicle 130 can carry other substance-collecting and/or substance-carrying components, such as a shovel, a box, a bag, a basket, an envelope, a sealed vacuum, etc. These substance-collecting and/or substance-carrying components can couple to the flexible structure 1610 and/or the support 1300 in a manner as described herein.

Animal or Wildlife Monitoring

As described herein, the aerial vehicle 130 can be controlled to monitor animals or wildlife that may be present in a specific geographic location. For example, some animal species may be tagged with collars that emit periodic signals associated with the specific animal on which the respective collar is applied. Biologists or other personnel can periodically visit a site and, using an RF or similar receiver, listen for the signals emitted by the collars. Reception of a signal may indicate that the specific animal is present within a certain distance of a location of the biologist.

However, often the receiver is required to be in a line-of-sight of the collar in order to capture the emitted signals. In relatively flat terrain, biologists may not have an issue reaching a position in which it is possible to be in the line-of-sight of the animals (and thus the collars). On the other hand, hilly or mountainous terrain can pose problems for biologists, often resulting in biologists having difficulty reaching a location or multiple locations in order to be in the line-of-sight of the signal-emitting collars. Thus, biologists may have difficulty identifying whether certain animal species are present at a site.

Some animal species may not be tagged with collars. Nonetheless, biologists or other personnel may identify the presence of such animal species based on calls, sounds, or other noises produced by such animal species. For example, a bird species may produce certain calls that are unique to that species. Thus, a biologist could listen for sounds at a site to determine whether certain animal species are present.

However, even if a biologist is able to successfully navigate the terrain of a site and access a desired area, listening for sounds produced at a site can result in imprecise and/or inaccurate assessments of the presence or absence of animal species. For example, certain animal species may produce sounds at certain frequencies imperceptible to the human ear or at volume levels inaudible to a human.

To alleviate these issues, the aerial vehicle 130 can be configured to include a microphone, a recording device, and/or an RF transceiver. As an illustrative example, the microphone, recording device, and/or RF transceiver can be carried by the aerial vehicle 130 via the rail mount 1100 and the rail attachment 1200. In particular, a support can couple to the rail attachment 1200, with the support used to hold the microphone, recording device, and/or RF transceiver. The aerial vehicle 130 can be directed to fly to a specific geographic location or fly along a route passing through a designated geographic region, with the microphone being configured to capture sounds produced in the environment, the record device being configured to record sounds captured by the microphone, and/or the RF transceiver being configured to receive signals emitted by collars (or other similar components) and repeat the signals to an external receiver (e.g., a receiver operated by a biologist or other user) located remote from the location of the aerial vehicle 130.

The aerial vehicle 130 may overcome the line-of-sight issue by being able to fly or remain stationary at an elevated height, thereby allowing the RF transceiver to receive signals emitted by collars no matter the type of terrain located below the in-flight aerial vehicle 130. The received signals can then be forwarded by the RF transceiver to a receiver operated by a biologist who may be stationed in a more accessible area of the site that may or may not be in the line-of-sight of signal-emitting collars. Thus, the RF transceiver may function as a signal repeater. A computing device can then process the received signals to determine whether a certain animal or animal species is present at the site (e.g., by comparing a data payload of a received signal to one or more data payloads associated with various animals or animal species). In addition, the aerial vehicle 130 may overcome the deficiencies of humans in perceiving certain sounds by using a microphone and recording device to capture and record sounds that otherwise may be inaudible to a human. The audio signals recorded by the recording device can then be compared with pre-generated animal species audio signatures (e.g., signatures that define sounds produced by specific animal species) by the plant growth prediction system 120 or another computing system comprising hardware components (e.g., one or more processors, memory, a network interface, etc.) to identify which animal species produced the recorded sounds (and therefore which animal species were present at the location at which the aerial vehicle 130 captured the sounds). In particular, the plant growth prediction system 120 or other computing system can compare the characteristics of the recorded audio signals (e.g., pitch, frequency, tone, period, amplitude, etc.) with the characteristics of various animal species audio signatures to identify one or more signatures that has characteristics the same as or similar to the characteristics of the recorded audio signals (e.g., one or more of the pitch, frequency, tone, period, amplitude, etc. match within a threshold value).

Figure 17A:
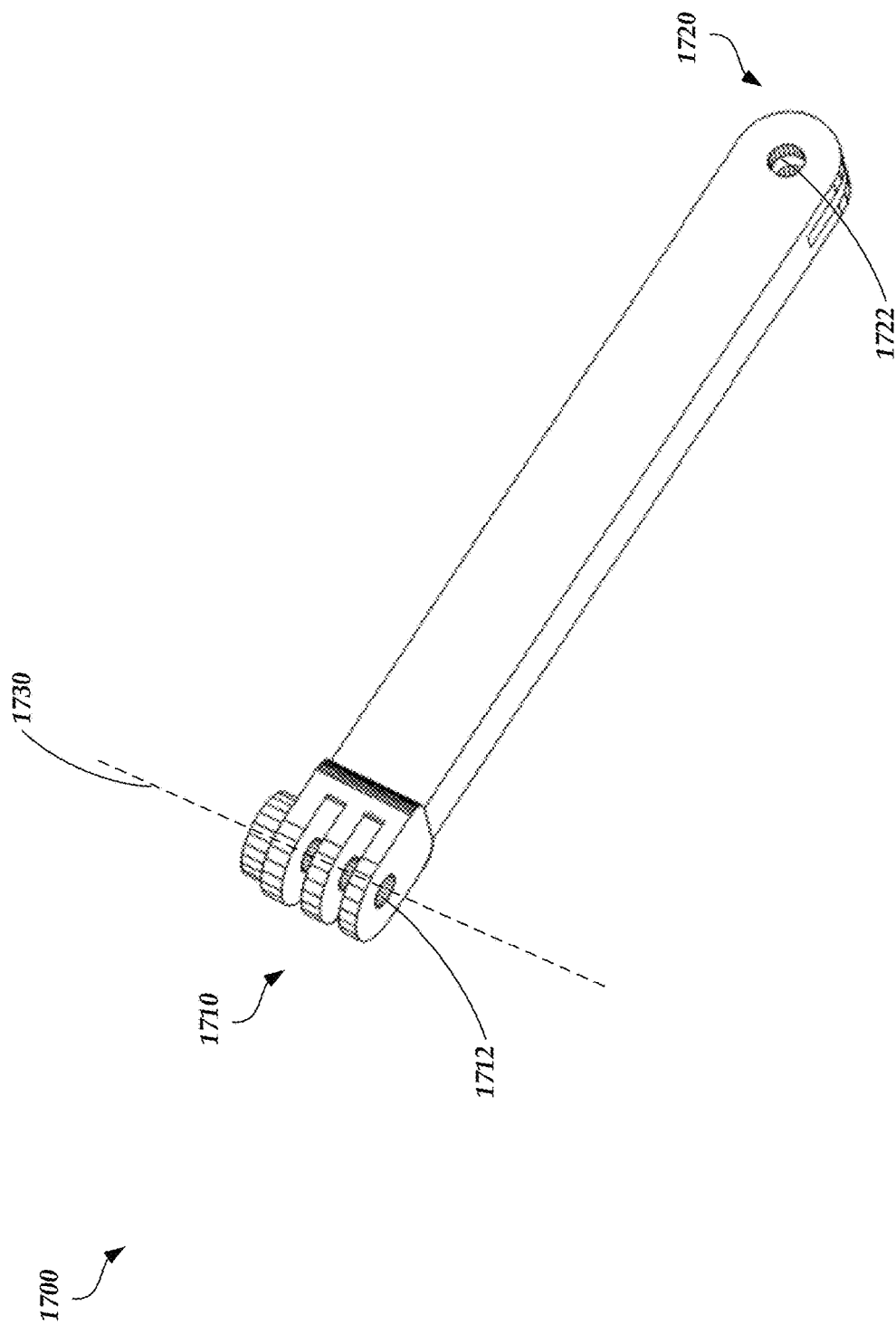
FIGS. 17A-17C illustrate an exemplary support for use in monitoring animals.
Figure 17B:
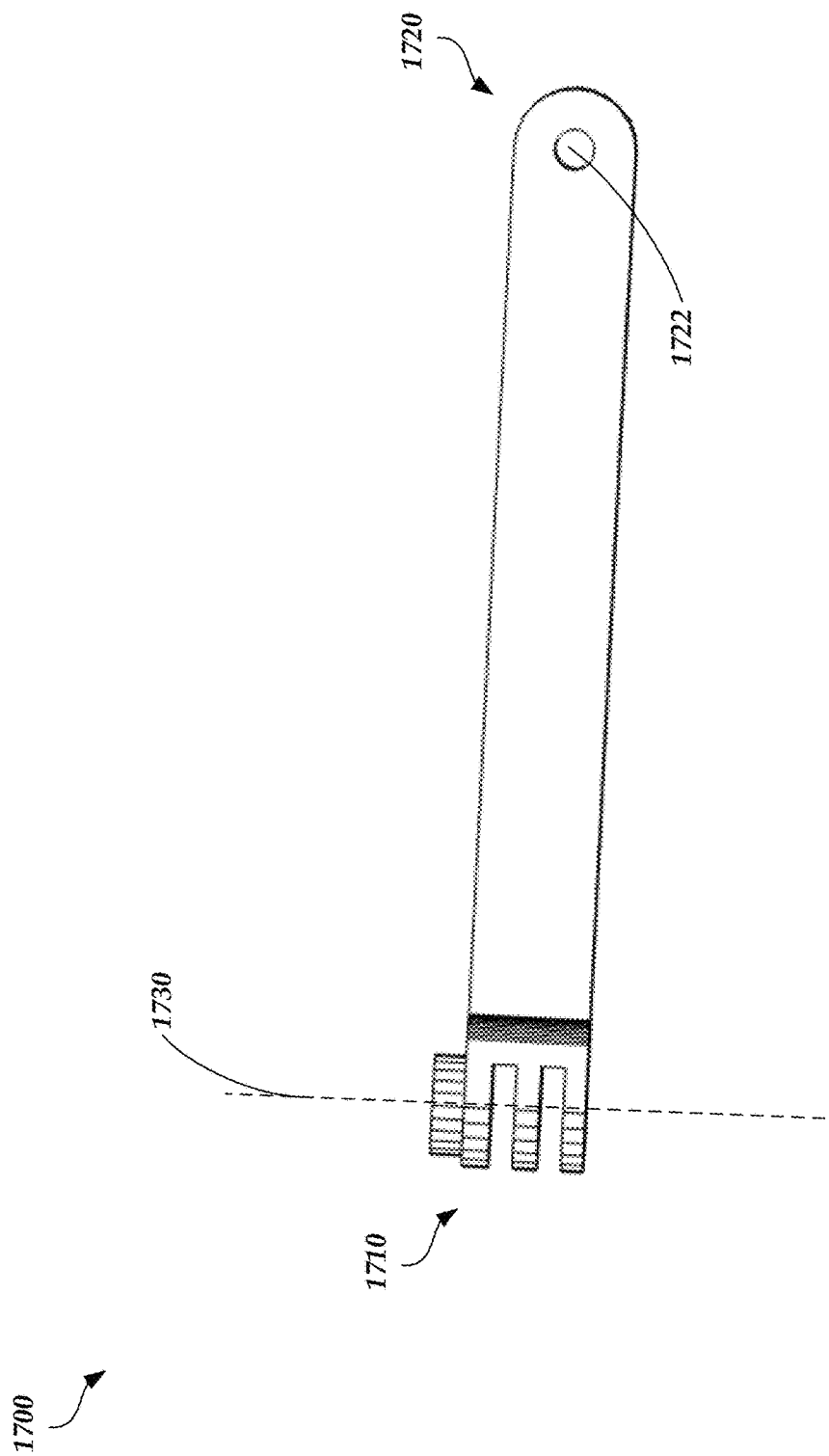
Figure 17C:
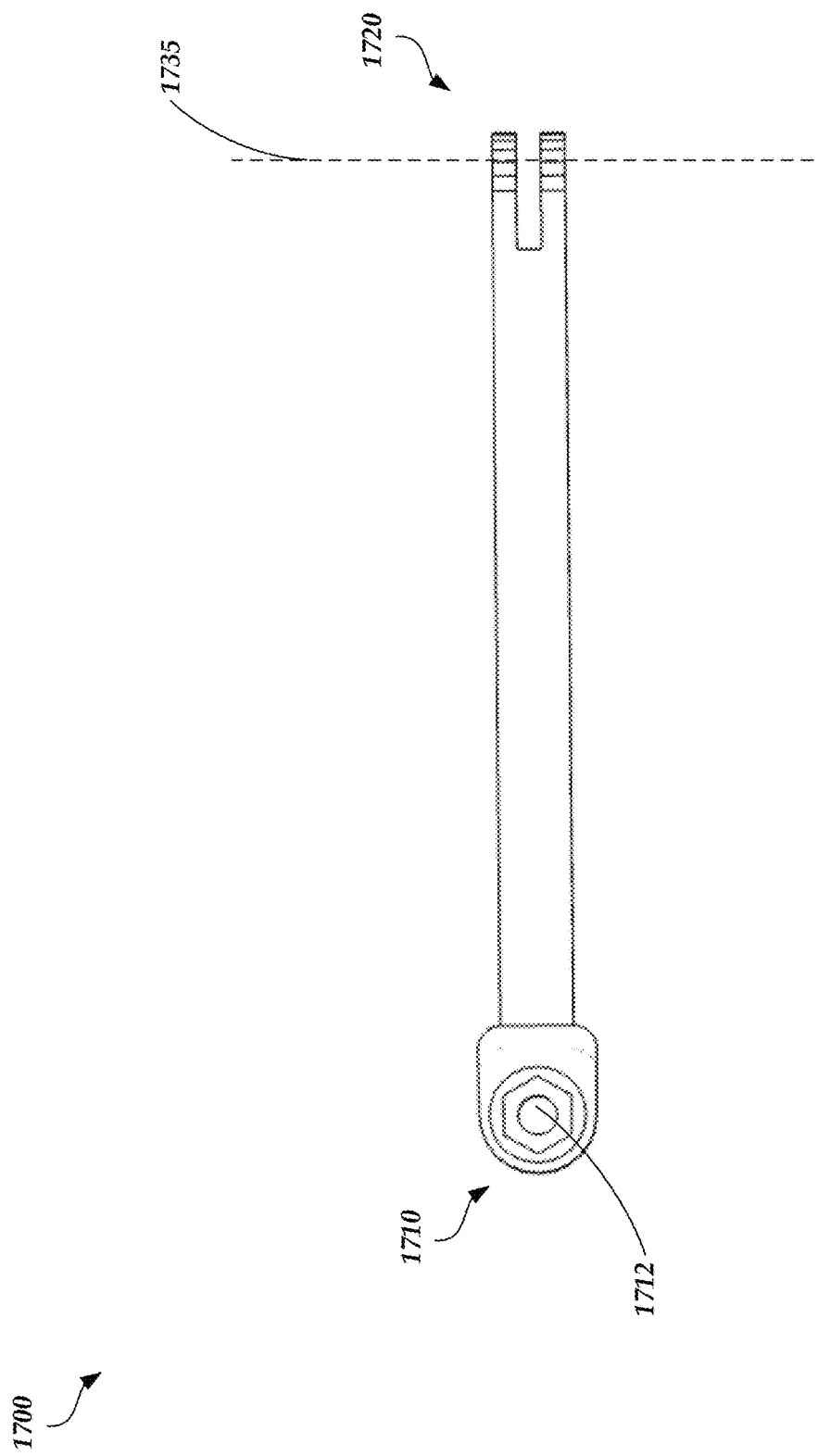

FIGS. 17A-17C illustrate an exemplary support 1700 for use in monitoring animals. In particular, FIG. 17A illustrates a top, side view of the support 1700, FIG. 17B illustrates a top view of the support 1700, and FIG. 17C illustrates a side view of the support 1700.

As illustrated in FIG. 17A, the support 1700 includes a three-pronged clevis 1710 and a two-pronged clevis 1720. In one embodiment, the three-pronged clevis 1710 couples to the three-pronged clevis 1210 via a screw, bolt, pin, snap, or other type of fastener that runs through holes 1212 and 1712 such that the support 1700 can rotate about axis 1730 passing through hole 1712. In another embodiment, the two-pronged clevis 1720 couples to the three-pronged clevis 1210 via a screw, bolt, pin, snap, or other type of fastener that runs through holes 1212 and 1722 such that the support 1700 can rotate about axis 1735 passing through hole 1722. In either embodiment, the support 1700 may rotate counterclockwise until touching the aerial vehicle 130 or clockwise until touching the aerial vehicle 130 without interfering with the operation of the rotors 1050B or 1050D because the width of the widest portion of the support 1700 in the transverse direction (e.g., the three-pronged clevis 1710) may not exceed the distance between (1) an edge of the radius of the rotor 1050B that is closest to the rotor 1050D and (2) an edge of the radius of the rotor 1050D that is closest to the rotor 1050B. In other words, if the distance between the center of rotation of the rotor 1050B and the center of rotation of the rotor 1050D is equal to the addition of the radius of rotor 1050B, a distance d, and the radius of rotor 1050D, then the widest portion of the support 1700 may not exceed the distance d.

In embodiments in which the three-pronged clevis 1710 couples to the three-pronged clevis 1210, a microphone holder, a recording device holder, and/or an RF transceiver holder (or the individual components themselves) can couple to the clevis 1720 via the hole 1722. In embodiments in which the two-pronged clevis 1720 couples to the three-pronged clevis 1210, a microphone holder, a recording device holder, and/or an RF transceiver holder (or the individual components themselves) can couple to the clevis 1710 via the hole 1712.

In other embodiments, the support 1300 rather than the support 1700 may be used to support the microphone, recording device, and/or RF transceiver. For example, the support 1300 may couple to the microphone holder, the recording device holder, and/or the RF transceiver holder (or the individual components themselves).

Figure 18A:
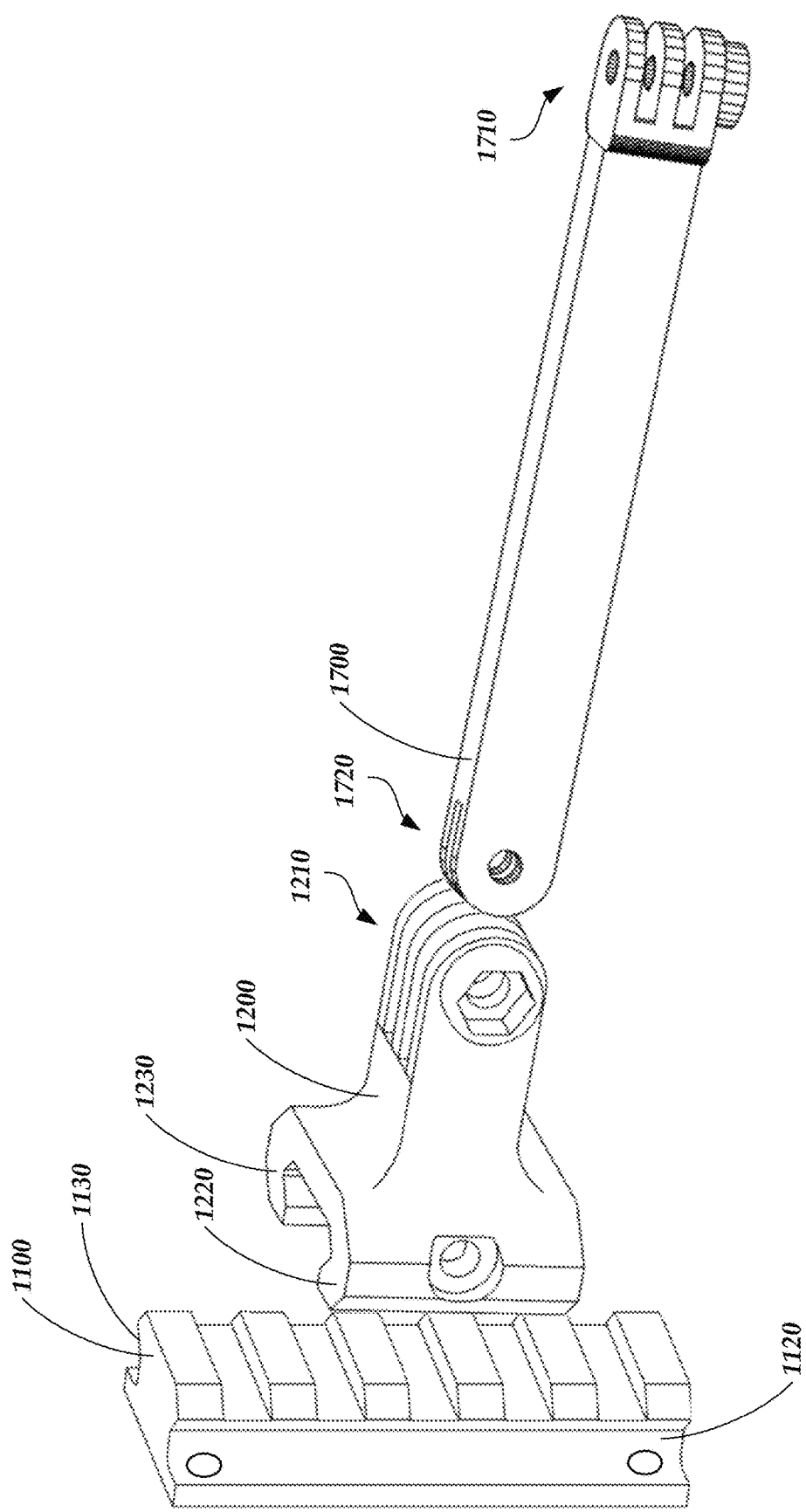
FIGS. 18A-18B illustrate an exploded view of the rail mount of FIGS. 11A-11C, the rail attachment of FIGS. 12A-12D, and the support of FIGS. 17A-17C.
Figure 18B:
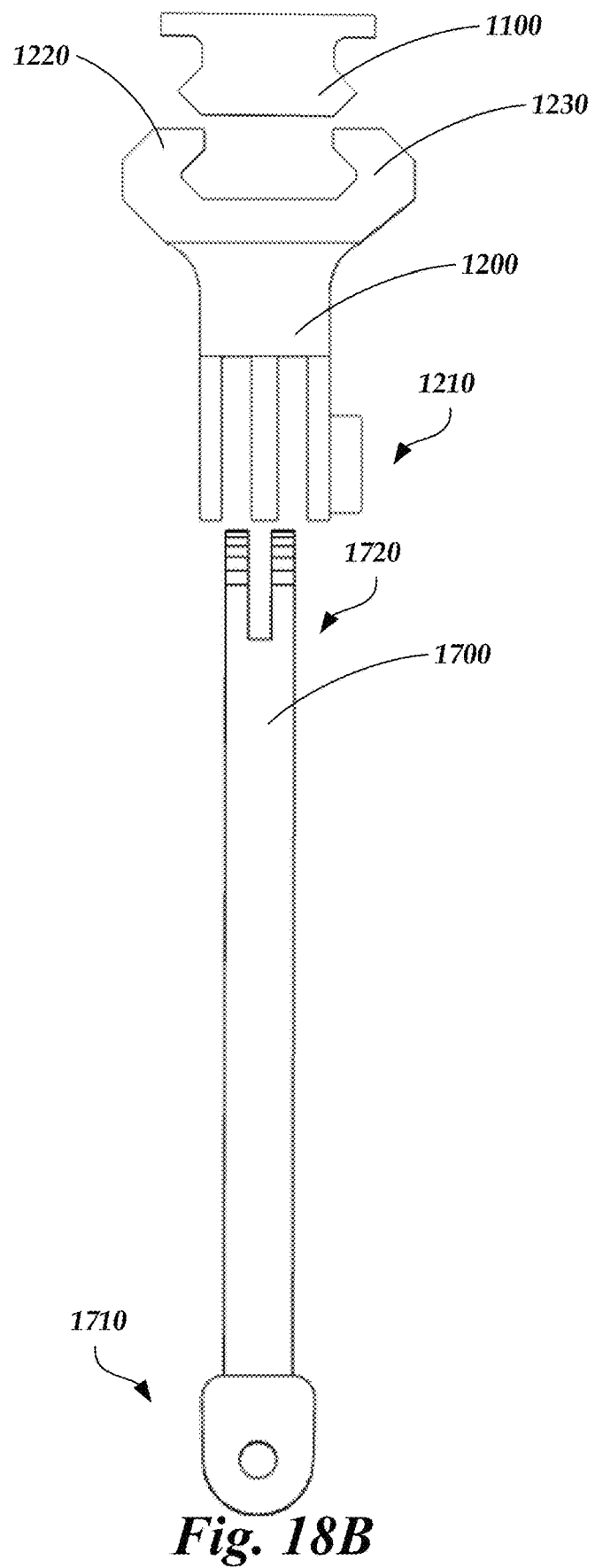

FIGS. 18A-18B illustrate an exploded view of the rail mount 1100, the rail attachment 1200, and the support 1700. In particular, FIG. 18A illustrates a side, exploded view of the rail mount 1100, the rail attachment 1200, and the support 1700, and FIG. 18B illustrates a top, exploded view of the rail mount 1100, the rail attachment 1200, and the support 1700.

As illustrated in FIGS. 18A-18B, the rail attachment 1200 couples to the rail mount 1100, and the support 1700 couples to the rail attachment 1200. For example, the protrusions 1220 and 1230 of the rail attachment 1200 can couple to the rails 1120 and 1130 of the rail mount 1100. The clevis 1720 (or the clevis 1710) of the support 1700 can also couple to the clevis 1210 of the rail attachment 1200. The flat surface 1110 of the rail mount 1100 can couple to a surface of the plate 1080.

Figure 19A:
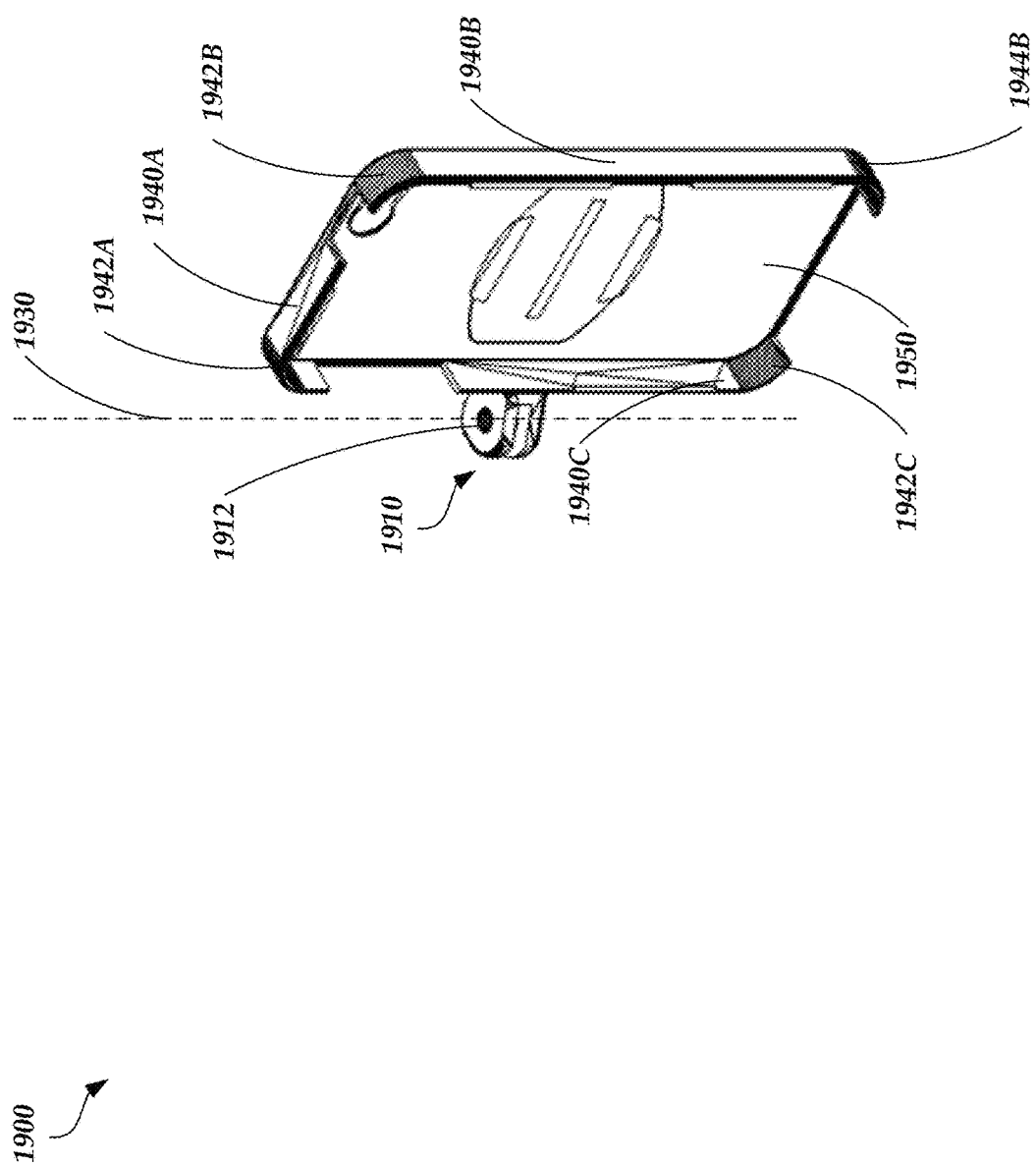
Figure 19B:
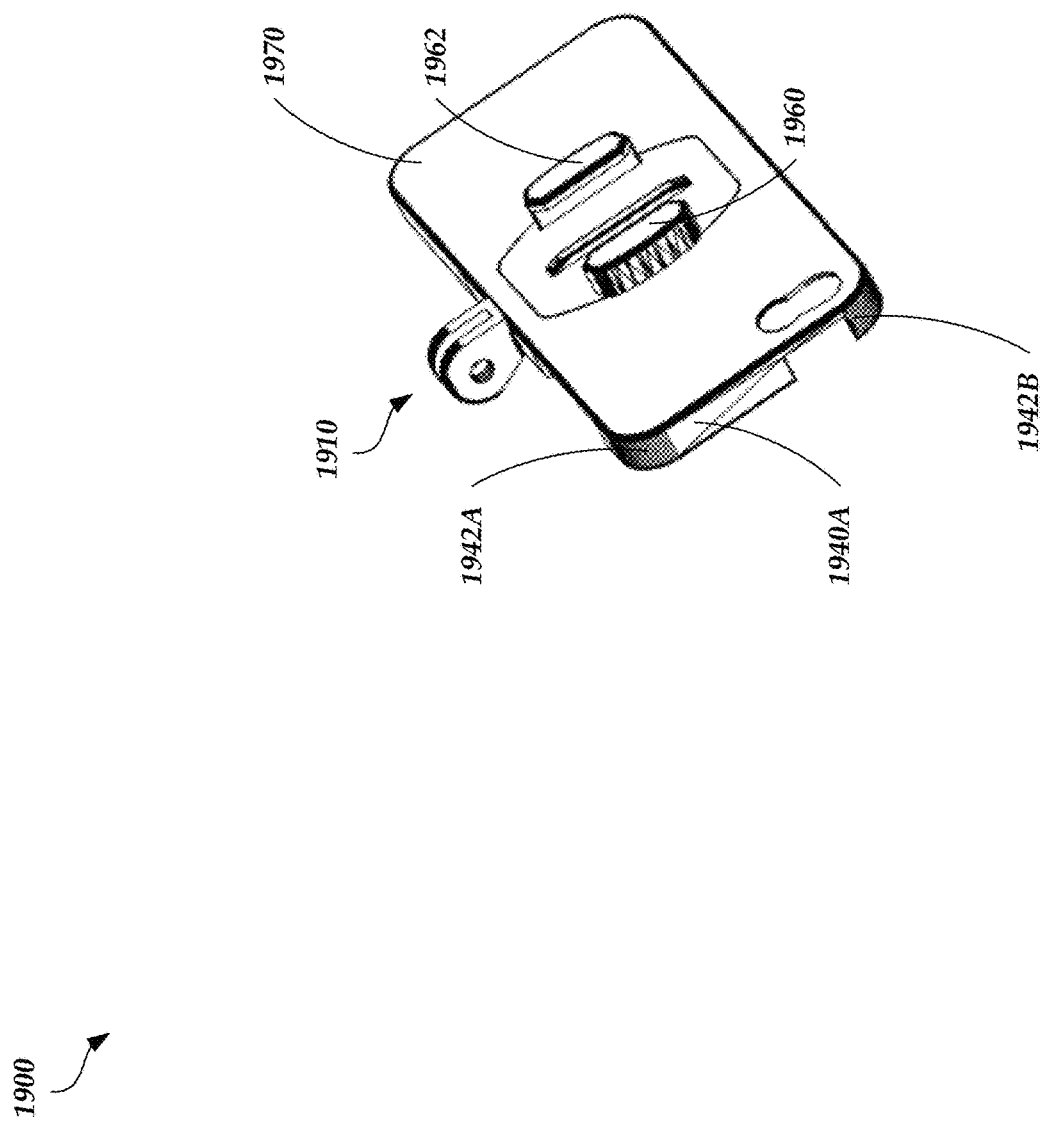

FIGS. 19A-19C illustrate an exemplary recording device holder 1900. In particular, FIG. 19A illustrates a front, side view of the recording device holder 1900, FIG. 19B illustrates a rear, side view of the recording device holder 1900, and FIG. 19C illustrates a side view of the recording device holder 1900.

As illustrated in FIGS. 19A-19C, the recording device holder 1900 includes a clevis 1910 at a side portion of the recording device holder 1900 that can couple to the clevis 1710 or 1720 (or clevis 1310 or 1320) via a screw, bolt, pin, snap, or other type of fastener that runs through holes 1710 or 1722 and 1912 such that the recording device holder 1900 can rotate about axis 1930. Alternatively, the clevis 1910 can be located on a bottom, top, front, and/or rear portion of the recording device holder 1900.

The recording device holder 1900 may further include edges 1940A-C that extend outward from base 1950. The edge 1940A may include a curved end 1942A, the edge 1940B may include a first curved end 1942B and a second curved end 1944B, and the edge 1940C may include a curved end 1942C. The edges 1940A-C and base 1950 may be sized such that the recording device holder 1900 at least partially encloses a recording device. For example, the base 1950 may abut, contact, or otherwise mate with a rear face of the recording device, and the edges 1940A-C may abut, contact, or otherwise mate with side portions of the recording device. Furthermore, the edges 1940A-C and/or base 1950 may be constructed such that the edges 1940A-C and/or base 1950 exert force on a recording device when the recording device is coupled to the recording device holder 1900, thereby reducing the likelihood that the recording device becomes decoupled from the recording device holder 1900 during operation of the aerial vehicle 130.

As illustrated in FIG. 19B, a rear portion 1970 of the recording device holder 1900 may optionally include a first end 1960 and a second end 1962 protruding from the rear portion 1970. The ends 1960 and 1962 may be configured to slide onto rails, such as rails 1120 and/or 1130, and be secured to the rails via lips 1964 and 1966. Thus, in some embodiments, the recording device holder 1900 can be coupled to the aerial vehicle 130 without use of the support 1700. Alternatively, the ends 1960 and 1962 may be used to couple the recording device holder 1900 to another component, such as a microphone and/or an RF transceiver (not shown).

While the recording device holder 1900 is illustrated as having a certain shape, this is not meant to be limiting. For example, the recording device holder 1900 may be structured to couple to the exterior of a mobile device that serves as a recording device. However, the recording device holder 1900 can be structured to couple to the exterior of any type of recording device, such as a handheld recording device, a tablet, a laptop, etc.

Similar to the recording device holder 1900, a microphone holder and/or a RF transceiver holder may be present and couple to the clevis 1710 or 1720 (or clevis 1310 or 1320) via a screw, bolt, pin, snap, or other type of fastener. Alternatively or in addition, a microphone and/or RF transceiver may couple to the clevis 1710 or 1720 (or clevis 1310 or 1320) via a screw, bolt, pin, snap, or other type of fastener or to another component of the support 1700, the rail attachment 1200, the rail mount 1100, and/or the aerial vehicle 130.

Figure 20:
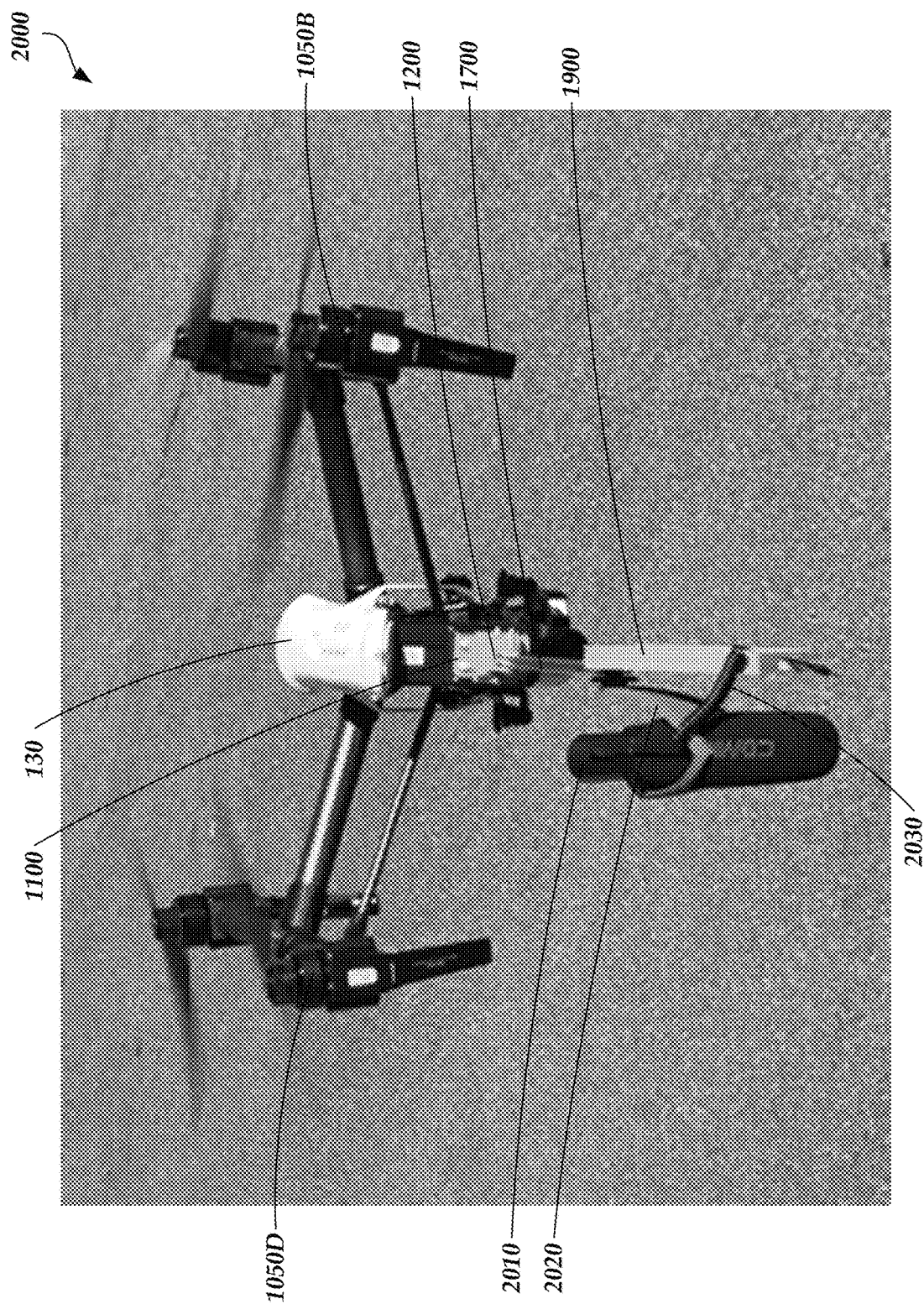
FIG. 20 illustrates an image depicting an exemplary configuration of components for monitoring animals or wildlife via an aerial vehicle.

FIG. 20 illustrates an image 2000 depicting an exemplary configuration of components for monitoring animals or wildlife via an aerial vehicle 130. As illustrated in FIG. 20, the aerial vehicle 130 is in an operational state, flying or hovering over a designated location. The rail mount 1100 is coupled to the rear of the aerial vehicle 130 (e.g., to the plate 1080). Furthermore, the rail attachment 1200 is coupled to the rail mount 1100. The support 1700 is also coupled to the rail attachment 1200, rotated such that the support 1700 is parallel or generally parallel to the ground below.

In an embodiment, a microphone 2010 and a recording device (not shown) are both coupled to the support 1700. For example, a microphone holder 2020 may be configured to interface with the microphone 2010, exerting force on the microphone 2010 to secure the microphone 2010 in place and reduce the likelihood that the microphone 2010 decouples from the aerial vehicle 130.

In some embodiments, the microphone holder 2020 couples to the recording device holder 1900 (which at least partially encloses the recording device, not shown), and either the microphone holder 2020 or the recording device holder 1900 couples to the support 1700 via the clevis 1710 or 1720. In other embodiments, the microphone holder 2020 and the recording device holder 1900 jointly couple to the support 1700 via the clevis 1710 or 1720. For example, the microphone holder 2020 may include an opening or hole into which a screw, bolt, pin, snap, or other type of fastener can run. This fastener may run through the microphone holder 2020 opening, the opening 1912 of the recording device holder 1900, and the opening 1712 or 1722 to couple the microphone holder 2020, the recording device holder 1900, and the support 1700 to each other.

In an embodiment, the clevis 1710 or 1720 allows the microphone holder 2020 and/or the recording device holder 1900 to freely rotate. Thus, the microphone 2010 can be positioned in a manner that optimizes audio detection capabilities. Rotation of the microphone holder 2020 and/or the recording device holder 1900, however, may not interfere with the operation of the aerial vehicle 130 (e.g., the operation of the rotors 1050B or 1050D) because the length of the support 1700 along a longitudinal axis may result in the microphone holder 2020, the microphone 2010, the recording device, and/or the recording device holder 1900 being located at a position that is outside the radius of the rotors 1050B and 1050D no matter how the microphone holder 2020, the microphone 2010, the recording device, and/or the recording device holder 1900 are rotated.

Optionally, the recording device can provide electrical power to the microphone 2010 via cord 2030. For example, the recording device may have one or more internal and/or external batteries. The one or more batteries may be used to supply electrical power to the components of the recording device that allow the recording device to record audio signals. In addition, the one or more batteries can be used to supply electrical power to an external component, such as the microphone 2010, an RF transceiver, and/or any other component that otherwise does not include an independent power source. By configuring the recording device to supply electrical power to the microphone 2010 instead of configuring the aerial vehicle 130 to supply electrical power to the microphone 2010 via the battery 1060, the life of the battery 1060 used to power the aerial vehicle 130 can be extended. Thus, the aerial vehicle 130 may be able to fly for a greater period of time and/or across further distances.

In addition, the recording device may be configured to receive audio signals captured by the microphone 2010 via the cord 2030 or a separate cable (not shown). The recording device may have a microphone of a limited size. However, the microphone 2010 may be larger than the microphone of the recording device and/or larger than the recording device itself, and include components that allow the microphone 2010 to capture audio signals originating from farther distances and/or including a wider variety of frequencies, tones, pitch, etc. Thus, the microphone 2010 can supplant the microphone of the recording device, thereby enhancing the capabilities of the recording device to capture audio signals.

The recording device can store captured audio signals in internal and/or external memory for later retrieval once the aerial vehicle 130 completes a flight. The captured audio signals can be stored in association with a location at which the audio signals are captured (e.g., as determined by the recording device if the recording device includes location detection capabilities, such as via a global positioning system (GPS), and/or as determined by the aerial vehicle 130, which can be in communication with the recording device via a wireless connection). Alternatively, the recording device can not only store captured audio signals in internal and/or external memory, but also transmit the captured audio signals and the corresponding location data via a wireless connection (e.g., WiFi, Bluetooth, cellular, etc.) to a remote computing system (e.g., the plant growth prediction system 120 and/or another similar computing system).

The remote computing system can then process the captured audio signals and the corresponding location data to identify animal species that may be present. For example, the remote computing system can compare a captured audio signal with one or more pre-generated animal species audio signatures (e.g., signatures that define sounds produced by specific animal species) to identify which animal species produced a sound resulting in the captured audio signal. In particular, the remote computing system can compare the characteristics of the captured audio signal (e.g., pitch, frequency, tone, period, amplitude, etc.) with the characteristics of one or more animal species audio signatures to identify one or more signatures that has one or more characteristics the same as or similar to the characteristics of the captured audio signal (e.g., one or more of the pitch, frequency, tone, period, amplitude, etc. match within a threshold value). If a match is detected, the remote computing system can associate an indication of the animal species corresponding to the matching animal species audio signature with the geographic location at which the audio signal was captured. The remote computing system can store this association in a data store, display the association in a user interface (e.g., a user interface that displays a map, such as one or more of user interfaces 500, 560, 600, 650, 700, 800, etc.) or cause another device to display the association in a user interface, transmit a notification to a user device indicating that the animal species was detected at the geographic location, and/or the like.

In some embodiments, not shown, an RF transceiver and/or an RF transceiver holder couple to the support 1700 via clevis 1710 or 1720. The RF transceiver and/or RF transceiver may couple to the support 1700 instead of the microphone holder 2020 and/or the recording device holder 1900. Alternatively, the RF transceiver and/or RF transceiver may couple to the support 1700 with the microphone holder 2020 and/or the recording device holder 1900. For example, the RF transceiver and/or RF transceiver holder may couple to one or both of the microphone holder 2020 and the recording device holder 1900, and one or both of the microphone holder 2020 and the recording device holder 1900 may couple to the support 1700. As another example, the RF transceiver and/or RF transceiver holder, the microphone holder 2020, and/or the recording device holder 1900 may jointly couple to the support 1700. As another example, the microphone holder 2020 and/or the recording device holder 1900 may couple to the RF transceiver and/or the RF transceiver holder, and the RF transceiver and/or RF transceiver holder may couple to the support 1700.

The RF transceiver and/or RF transceiver holder may also be coupled to one or more of these components in a manner such that the RF transceiver and/or RF transceiver holder does not interfere with the operation of the rotors 1050B and 1050D for the reasons discussed above. In addition, like with the microphone 2010, the recording device (if present) can optionally supply electrical power to the RF transceiver, thereby allowing the battery 1060 to devote all electrical power to the operation of the aerial vehicle 130.

Additional Embodiments

Various example user devices 102 are shown in FIG. 1, including a desktop computer, laptop, and a mobile phone, each provided by way of illustration. In general, the user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. A user device 102 may execute an application (e.g., a browser, a stand-alone application, etc.) that allows a user to view captured images, set flight path parameters, modify a flight path during flight, and/or view predictions and associated annotated orthomosaic images.

The network 110 may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    an unmanned aerial vehicle comprising a battery, a housing that at least partially encloses the battery, and a plate affixed to an exterior of the housing;
    a rail mount configured to couple to the plate;
    a rail attachment comprising a first portion and a second portion, wherein the first portion of the rail attachment is configured to couple to the rail mount;
    a support comprising a first end and a second end, wherein the first end of the support is configured to couple to the second portion of the rail attachment to allow the support to rotate about an axis passing through a hole in the second portion;
    a microphone configured to couple to the support;
    a recording device configured to couple to the support, wherein the recording device is configured to supply electrical power to the microphone and receive audio signals captured by the microphone; and
    a computing system comprising one or more computing devices, wherein the computing system is configured to communicate with the unmanned aerial vehicle and configured with specific computer-executable instructions to instruct the unmanned aerial vehicle to fly along a flight path such that the recording device can record the audio signals captured by the microphone along the flight path.

2. The system of claim 1, wherein the rail mount comprises a first rail and a second rail, wherein the first portion of the rail attachment comprises a first protrusion and a second protrusion, and wherein the first protrusion is configured to interface with the first rail and the second protrusion is configured to interface with the second rail.

3. The system of claim 1, wherein the second portion of the rail attachment comprises a first clevis, and wherein the first end of the support comprises a second clevis.

4. The system of claim 3, wherein the first clevis is configured to couple to the second clevis via one of a screw, a bolt, a pin, or a snap.

5. The system of claim 4, wherein the first clevis, when coupled to the second clevis, allows the support to rotate about an axis passing through a hole in the second clevis.

6. The system of claim 1, further comprising a recording device holder configured to at least partially enclose the recording device.

7. The system of claim 6, wherein the second end of the support comprises a first clevis, wherein the recording device holder comprises a second clevis, and wherein the first clevis is configured to couple with the second clevis via one of a screw, a bolt, a pin, or a snap.

8. The system of claim 1, wherein the unmanned aerial vehicle comprises a first rotor and a second rotor, and wherein the plate is positioned in a horizontal plane between the first rotor and the second rotor.

9. The system of claim 8, wherein an edge of a radius of the first rotor closest to the second rotor is a first distance from an edge of a radius of the second rotor closest to the first rotor.

10. The system of claim 9, wherein a width of a combination of the rail mount and the rail attachment in a transverse direction, when the rail mount is coupled to the plate and the rail attachment is coupled to the rail mount, is less than the first distance.

11. The system of claim 1, wherein the computing system is further configured with computer-executable instructions to:
obtain a first audio signal recorded by the recording device and an indication of a geographic location at which the first audio signal is captured by the microphone;
compare the first audio signal to one or more animal species audio signatures;
determine that the first audio signal corresponds to a first animal species based on the comparison; and
cause a user device to display a user interface indicating that the first animal species is present at the geographic location.

12. An unmanned aerial vehicle comprising:
a battery;
a housing that at least partially encloses the battery;
a plate affixed to an exterior of the housing;
a rail mount configured to couple to the plate;
a rail attachment comprising a first portion and a second portion, wherein the first portion of the rail attachment is configured to couple to the rail mount;
a support comprising a first end and a second end, wherein the first end of the support is configured to couple to the second portion of the rail attachment to allow the support to rotate about an axis passing through a hole in the second portion;
a microphone configured to couple to the support; and
a recording device configured to couple to the support, wherein the recording device is configured to supply electrical power to the microphone and receive audio signals captured by the microphone.

13. The unmanned aerial vehicle of claim 12, wherein the rail mount comprises a first rail and a second rail, wherein the first portion of the rail attachment comprises a first protrusion and a second protrusion, and wherein the first protrusion is configured to interface with the first rail and the second protrusion is configured to interface with the second rail.

14. The unmanned aerial vehicle of claim 12, wherein the second portion of the rail attachment comprises a first clevis, and wherein the first end of the support comprises a second clevis.

15. The unmanned aerial vehicle of claim 14, wherein the first clevis is configured to couple to the second clevis via one of a screw, a bolt, a pin, or a snap.

16. The unmanned aerial vehicle of claim 12, further comprising a microphone holder configured to interface with the microphone.

17. The unmanned aerial vehicle of claim 16, wherein the second end of the support comprises a first clevis, and wherein the microphone holder comprises an opening through which one of a screw, a bolt, a pin, or a snap can couple the microphone holder to the first clevis.

18. The unmanned aerial vehicle of claim 12, further comprising a first rotor and a second rotor, wherein the plate is positioned in a horizontal plane between the first rotor and the second rotor, wherein an edge of a radius of the first rotor closest to the second rotor is a first distance from an edge of a radius of the second rotor closest to the first rotor, and wherein a width of a combination of the rail mount and the rail attachment in a transverse direction, when the rail mount is coupled to the plate and the rail attachment is coupled to the rail mount, is less than the first distance.

19. An unmanned aerial vehicle comprising:
a battery;
a housing that at least partially encloses the battery;
a plate affixed to an exterior of the housing;
a rail mount configured to couple to the plate;
a rail attachment comprising a first portion and a second portion, wherein the first portion of the rail attachment is configured to couple to the rail mount;
a support comprising a first end and a second end, wherein the first end of the support is configured to couple to the second portion of the rail attachment to allow the support to rotate about an axis passing through a hole in the second portion; and
a radio frequency (RF) transceiver configured to couple to the support, wherein the RF transceiver is further configured to receive a signal emitted by a collar coupled to an animal species and transmit the signal to a remote receiver.

20. The unmanned aerial vehicle of claim 19, further comprising a first rotor and a second rotor, wherein the plate is positioned in a horizontal plane between the first rotor and the second rotor, wherein an edge of a radius of the first rotor closest to the second rotor is a first distance from an edge of a radius of the second rotor closest to the first rotor, and wherein a width of a combination of the rail mount and the rail attachment in a transverse direction, when the rail mount is coupled to the plate and the rail attachment is coupled to the rail mount, is less than the first distance.

21. A system comprising:
an unmanned aerial vehicle comprising a battery, a housing that at least partially encloses the battery, and a plate affixed to an exterior of the housing, wherein the unmanned aerial vehicle comprises a first rotor and a second rotor, and wherein the plate is positioned in a horizontal plane between the first rotor and the second rotor, and wherein an edge of a radius of the first rotor closest to the second rotor is a first distance from an edge of a radius of the second rotor closest to the first rotor;
a rail mount configured to couple to the plate;
a rail attachment comprising a first portion and a second portion, wherein the first portion of the rail attachment is configured to couple to the rail mount, and wherein a width of a combination of the rail mount and the rail attachment in a transverse direction, when the rail mount is coupled to the plate and the rail attachment is coupled to the rail mount, is less than the first distance;
a support comprising a first end and a second end, wherein the first end of the support is configured to couple to the second portion of the rail attachment;
a microphone configured to couple to the support;
a recording device configured to couple to the support, wherein the recording device is configured to supply electrical power to the microphone and receive audio signals captured by the microphone; and
a computing system comprising one or more computing devices, wherein the computing system is configured to communicate with the unmanned aerial vehicle and configured with specific computer-executable instructions to instruct the unmanned aerial vehicle to fly along a flight path such that the recording device can record the audio signals captured by the microphone along the flight path.

22. An unmanned aerial vehicle comprising:
a battery;
a housing that at least partially encloses the battery;
a plate affixed to an exterior of the housing;
a rail mount configured to couple to the plate;
a rail attachment comprising a first portion and a second portion, wherein the first portion of the rail attachment is configured to couple to the rail mount;
a support comprising a first end and a second end, wherein the first end of the support is configured to couple to the second portion of the rail attachment;
a microphone configured to couple to the support;
a recording device configured to couple to the support, wherein the recording device is configured to supply electrical power to the microphone and receive audio signals captured by the microphone; and
a first rotor and a second rotor, wherein the plate is positioned in a horizontal plane between the first rotor and the second rotor, wherein an edge of a radius of the first rotor closest to the second rotor is a first distance from an edge of a radius of the second rotor closest to the first rotor, and wherein a width of a combination of the rail mount and the rail attachment in a transverse direction, when the rail mount is coupled to the plate and the rail attachment is coupled to the rail mount, is less than the first distance.

23. An unmanned aerial vehicle comprising:
a battery;
a housing that at least partially encloses the battery;
a plate affixed to an exterior of the housing;
a rail mount configured to couple to the plate;
a rail attachment comprising a first portion and a second portion, wherein the first portion of the rail attachment is configured to couple to the rail mount;
a support comprising a first end and a second end, wherein the first end of the support is configured to couple to the second portion of the rail attachment;
a radio frequency (RF) transceiver configured to couple to the support, wherein the RF transceiver is further configured to receive a signal emitted by a collar coupled to an animal species and transmit the signal to a remote receiver; and
a first rotor and a second rotor, wherein the plate is positioned in a horizontal plane between the first rotor and the second rotor, wherein an edge of a radius of the first rotor closest to the second rotor is a first distance from an edge of a radius of the second rotor closest to the first rotor, and wherein a width of a combination of the rail mount and the rail attachment in a transverse direction, when the rail mount is coupled to the plate and the rail attachment is coupled to the rail mount, is less than the first distance.

* * * * *